(12) United States Patent
Schierz et al.

(10) Patent No.: US 11,386,075 B2
(45) Date of Patent: Jul. 12, 2022

(54) METHODS FOR DETECTING AND INTERPRETING DATA ANOMALIES, AND RELATED SYSTEMS AND DEVICES

(71) Applicant: DataRobot, Inc., Boston, MA (US)

(72) Inventors: Amanda Claire Schierz, Hampshire (GB); Jeremy Achin, Boston, MA (US); Zachary Albert Mayer, Boston, MA (US)

(73) Assignee: DataRobot, Inc., Boston, MA (US)

( * ) Notice: Subject to any disclaimer, the term of this patent is extended or adjusted under 35 U.S.C. 154(b) by 0 days.

(21) Appl. No.: 17/091,671

(22) Filed: Nov. 6, 2020

(65) Prior Publication Data

US 2021/0103580 A1  Apr. 8, 2021

Related U.S. Application Data

(63) Continuation of application No. PCT/US2019/066381, filed on Dec. 13, 2019.

(60) Provisional application No. 62/779,172, filed on Dec. 13, 2018.

(51) Int. Cl.
*G06F 7/00* (2006.01)
*G06F 16/23* (2019.01)
*G06N 20/00* (2019.01)

(52) U.S. Cl.
CPC ...... *G06F 16/2365* (2019.01); *G06F 16/2379* (2019.01); *G06N 20/00* (2019.01)

(58) Field of Classification Search
CPC .. G06F 16/2365; G06F 16/2379; G06N 20/00
USPC .................................................. 707/600–899
See application file for complete search history.

(56) References Cited

U.S. PATENT DOCUMENTS

| 8,887,281 | B2 * | 11/2014 | Honig ............ H04L 63/14 726/23 |
|---|---|---|---|
| 2006/0161592 | A1 | 7/2006 | Ertoz et al. |
| 2016/0042287 | A1 | 2/2016 | Eldardiry et al. |
| 2017/0206466 | A1 | 7/2017 | Zoldi et al. |
| 2018/0293462 | A1 | 10/2018 | Ambati et al. |
| 2018/0293501 | A1 | 10/2018 | Ambati et al. |
| 2019/0295000 | A1 | 9/2019 | Candel et al. |
| 2019/0325333 | A1 | 10/2019 | Chan et al. |
| 2019/0325335 | A1 | 10/2019 | Chan et al. |

OTHER PUBLICATIONS

International Search Report and Written Opinion of PCT/US2019/066381 dated Feb. 20, 2020, 15 pages.
International Preliminary Report on Patentability on PCT Appl. Ser. No. PCT/US2019/066381 dated Jun. 8, 2021 (8 pages).
Using Driverless AI, Release 1.0.19 local.5f40d17c, H2O.ai, Jan. 29, 2018 (105 pages).

\* cited by examiner

*Primary Examiner* — Isaac M Woo
(74) *Attorney, Agent, or Firm* — Foley & Lardner LLP

(57) ABSTRACT

Methods for detection of anomalous data samples from a plurality of data samples are provided. In some embodiments, an anomaly detection procedure that includes a plurality of tasks is executed to identify the anomalous data samples from the plurality of data samples.

21 Claims, 37 Drawing Sheets

Prediction Model Parameters

Anomaly Detection Blender
blend_type:

| mean ≫ |

700

Enter value:

| maximum |

Or choose:

Acceptable Values | Searched | Best of Searched
One of the following values: | mean | mean
minimum
maximum
mean Documentation

FIG. 7

≡ Menu  Q Search   Feature List  All Features ∨   ⊞ View Raw Data | Read More »   < 1-46 of 46

| ☐ Feature Name | Index ∨ | Var Type | Unique | Missing | Mean | Std Dev |
|---|---|---|---|---|---|---|
| [Reference ID] ID | 1 | Numeric | 10,746 | 0 | 5,374 | 3,102 |
| FRAUD | 2 | Numeric | 2 | 0 | 0.16 | 0.37 |
| DATE | 3 | Date | 13 | 4,246 | 20/12/2013 | 196 |
| ┆ DATE (Day of Week) | 3 | Categorical | 7 | 4,246 | | |
| POLICY_LENGTH | 4 | Categorical | 3 | 0 | | |
| LOCALITY | 5 | Categorical | 2,217 | 8 | | |
| REGION | 6 | Categorical | 129 | 8 | | |
| GENDER | 7 | Numeric | 2 | 0 | 0.45 | 0.50 |
| CLAIM_POLICY_DIFF_A | 8 | Numeric | 2 | 0 | 0.12 | 0.33 |
| CLAIM_POLICY_DIFF_B | 9 | Numeric | 2 | 0 | 0.09 | 0.29 |

FIG. 14B

| | Model Name & Description | Actions |
|---|---|---|
| ☐ | ⊛ Isolation Forest Anomaly Detection | |
| ☐ | Category Count \| Matrix of word-grams occurrences \| Truncated Singular Value Decomposition \| Missing Values Imputed \| Isolation Forest Anomaly Detection <br> BP44 | Preview  Add |
| ☐ | ⊛ Local Outlier Factor Anomaly Detection | |
| ☐ | Category Count \| Matrix of word-grams occurrences \| Truncated Singular Value Decomposition \| Missing Values Imputed \| Local Outlier Factor Anomaly Detection <br> BP42 | Preview  Add |
| ☐ | ⊛ Mahalanobis Distance Ranked Anomaly Detection with PCA | |
| ☐ | Category Count \| Matrix of word-grams occurrences \| Truncated Singular Value Decomposition \| Missing Values Imputed \| Mahalanobis Distance Ranked Anomaly Detection with PCA <br> BP46 | Preview  Add |

FIG. 14D

| ≡ Menu  🔍 Search  + Add New Model  ▽ Filter Models | | | | |
|---|---|---|---|---|
| | | | Metric AUC ▽ | |
| ☐ Model Name & Description | Feature List & Sample Size | Validation | Cross Validation | Holdout |
| ⊕ Double Median Absolute Deviation Anomaly Detection<br>Category Count | Matrix of word-grams occurrences | Truncated Singular Value Decomposition | Missing Values Imputed | Double Median Absolute Deviation Anomaly Detection<br>[M11 BP41] | Informative Features ⚙<br>100.0 % ✢ | 0.8692* | 0.8578* | 0.8716* |
| ⊕ Anomaly Detection with Supervised Learning (XGB)<br>Category Count | Matrix of word-grams occurrences | Truncated Singular Value Decomposition | Missing Values Imputed | Anomaly Detection with Supervised Learning (XGB)<br>[M12 BP43] | Informative Features ⚙<br>100.0 % ✢ | 0.8674* | 0.8538* | 0.8699* |
| ☐ ⊕ Anomaly Detection Blender<br>Category Count | Matrix of word-grams occurrences | Truncated Singular Value Decomposition | Missing Values Imputed | Double Median Absolute Deviation Anomaly Detection | Isolation Forest | Anomaly Detection | Anomaly Detection Blender<br>[M9 BP45] ☆ | Informative Features ⚙<br>100.0 % ✢ | 0.8606* | 0.8507* | 0.8673* |

FIG. 14E

Validation Predictions

Preview of explanations for predictions from validation data within highlighted area(s):

| ID | PREDICTION | EXPLANATIONS | | | |
|---|---|---|---|---|---|
| 9576 | 0.944 | --- NOTIFY_DELAY = 0 | --- ACCIDENT_NIGHT = 0 | --- NOTIF_AFT_RENEWAL = 0 | |
| 6398 | 0.889 | +++ federal_TEL_MATCH = 1 | +++ LOCAL_NON_CLM_PE... = 1 | +++ LOCAL_TEL_MATCH = 1 | |
| 7642 | 0.833 | +++ federal_CLM_ADD_MA... = 1 | +++ LOCAL_NON_CLM_AD... = 1 | +++ NEW_VEHICLE_BEFO... = 1 | |
| 2806 | 0.056 | +++ GENDER = 1 | --- CLAIM_POLICY_DIFF_D = 1 | --- RULE_MATCHES = 0 | |
| 8428 | 0.000 | --- GENDER = 0 | --- CLAIM_POLICY_DIFF_D = 1 | --- RULE_MATCHES = 0 | |

FIG. 14J

| | A | B | C | D | E | F | G | H | I | J | K |
|---|---|---|---|---|---|---|---|---|---|---|---|
| 1 | row_id | Prediction | Explanation 1 | Explanation 1 Feature | Explanation 2 | Explanation 2 Feature | | Explanation 3 | Explanation 3 Feature | | |
| 2 | 2135 | 1 | ++ | LOCAL_NON_CLM_PERS_MATCH | ++ | federal_CLM_ADD_MATCH | | ++ | federal_CLM_PERS_MATCH | | Explanation 3 |
| 3 | 2690 | 1 | ++ | LOCALITY | ++ | LOCAL_TEL_MATCH | | ++ | federal_CLM_ADD_MATCH | | ++ |
| 4 | 9576 | 0.94444444 | -- | NOTIF_DELAY | PR2 | ACCIDENT_NIGHT | | -- | NOTIF_AFT_RENEWAL | | 0 |
| 5 | 1604 | 0.88888889 | ++ | LOCAL_NON_CLM_PERS_MATCH | ++ | LOCAL_TEL_MATCH | | ++ | federal_NON_CLM_PERS_MATCH | | ++ |
| 6 | 2164 | 0.88888889 | ++ | federal_CLM_ADD_MATCH | ++ | federal_CLM_PERS_MATCH | | ++ | federal_NON_CLM_ADD_MATCH | | ++ |
| 7 | 2196 | 0.88888889 | ++ | LOCAL_TEL_MATCH | ++ | federal_NON_CLM_PERS_MATCH | | ++ | LOCAL_NON_CLM_ADD_MATCH | | ++ |
| 8 | 3475 | 0.88888889 | ++ | LOCAL_TEL_MATCH | ++ | LOCAL_TEL_MATCH | | ++ | federal_NON_CLM_PERS_MATCH | | ++ |
| 9 | 4312 | 0.88888889 | ++ | LOCAL_TEL_MATCH | ++ | federal_CLM_ADD_MATCH | | ++ | federal_NON_CLM_PERS_MATCH | | ++ |
| 10 | 5398 | 0.88888889 | ++ | LOCAL_TEL_MATCH | ++ | federal_CLM_ADD_MATCH | | ++ | federal_NON_CLM_ADD_MATCH | | ++ |
| 11 | 6398 | 0.88888889 | ++ | federal_TEL_MATCH | ++ | LOCAL_NON_CLM_PERS_MATCH | | ++ | LOCAL_TEL_MATCH | | ++ |
| 12 | 7843 | 0.88888889 | ++ | federal_CLM_ADD_MATCH | ++ | federal_NON_CLM_PERS_MATCH | | ++ | federal_NON_CLM_ADD_MATCH | | ++ |

FIG. 14K

Isolation Forest Anomaly Detection
M10 BP44 | Informative Features

Columns (45) Export

8 models available

| anomalyScore | FRAUD | DATE | POLICY_LENGTH | LOCALITY | REGION |
|---|---|---|---|---|---|
| 1 | 1 | | | | |
| 0.8943 | 1 | 31/01/2013 | 12 month | NG3 | NG |
| 0.8868 | 1 | | 12 month | B30 | B |
| 0.8864 | 1 | 31/01/2014 | 12 month | DA8 | DA |
| 0.8844 | 1 | 31/03/2013 | 6 month | SS9 | SS |
| 0.8653 | 1 | | 12 month | IV2 | IV |
| | | | 9 month | PR2 | PR |

Project Data Feature Lists

≡ Menu  Q Search  Feature List All Features ⌄  ▦ View Raw Data  + Create Feature List  < 1-31 of 31 >

| Feature Name | Index ⌄ | Var Type | Unique | Missing | Mean | Std Dev | Med |
|---|---|---|---|---|---|---|---|
| [Few values] ALERT | 1 | Categorical | 1 | 0 | 1 | 0 | 1 |
| SAR | 2 | Numeric | 2 | 0 | 0.10 | 0.30 | 0 |
| kycRiskScore | 3 | Numeric | 7 | 0 | 1.41 | 1.06 | 1 |
| income | 4 | Numeric | 1,594 | 200 | 51,471 | 39,799 | 41,60 |
| tenureMonths | 5 | Numeric | 142 | 0 | 20.32 | 20.68 | 14 |
| creditScore | 6 | Numeric | 218 | 0 | 713 | 38.31 | 714 |

FIG. 15A

| Model Name & Description | Actions |
|---|---|
| ☐ | |
| ☐ Isolation Forest Anomaly Detection<br>Category Count \| Matrix of word-grams occurrences \| Truncated Singular Value Decomposition \| Missing Values Imputed \| Isolation Forest Anomaly Detection<br>BP44 | Preview  Add |
| ☐ Local Outlier Factor Anomaly Detection<br>Category Count \| Matrix of word-grams occurrences \| Truncated Singular Value Decomposition \| Missing Values Imputed \| Local Outlier Factor Anomaly Detection<br>BP42 | Preview  Add |
| ☐ Mahalanobis Distance Ranked anomaly Detection with PCA<br>Category Count \| Matrix of word-grams occurrences \| Truncated Singular Value Decomposition \| Missing Values Imputed \| Mahalanobis Distance Ranked Anomaly Detection with PCA<br>BP46 | Preview  Add |

FIG. 15C

| Model Name & Description | Feature List & Sample Size | Validation | Cross Validation | Holdout |
|---|---|---|---|---|
| ⊛ Anomaly Detection with Supervised Learning (XGB)<br>Category Count \| Matrix of word-grams occurrences \| Truncated Singular Value Decomposition \| Missing Values Imputed \| Anomaly Detection with Supervised Learning (XGB)<br>M12 BP43 | Informative Features ⚭ ✥<br>100.0 % | 0.8588 * | 0.8503 * | 0.8776 * |
| ⊛ Isolation Forest Anomaly Detection<br>Category Count \| Matrix of word-grams occurrences \| Truncated Singular Value Decomposition \| Missing Values Imputed \| Isolation Forest Anomaly Detection<br>M10 BP44 | Informative Features ⚭ ✥<br>100.0 % | 0.8539 * | 0.8494 * | 0.8655 * |
| ⊛ Anomaly Detection Blender<br>Category Count \| Matrix of word-grams occurrences \| Truncated Singular Value Decomposition \| Missing Values Imputed \| Double Median Absolute Deviation \| Anomaly Detection \| Isolation Forest Anomaly Detection \| Anomaly Detection Blender<br>M9 BP45 | Informative Features ⚭ ✥<br>100.0 % | 0.8491 * | 0.8443 * | 0.8654 * |

FIG. 15D

Live Chart  ROC Curve  Feature Fit  Advanced Tuning

Selection Summary  Export

○ Maximizes F1 Score - NOT(1) +1

| F1 Score | True Positive Rate (Sensitivity) | False Positive Rate (Fallout) | True Negative Rate (Specificity) | Positive Predictive Value (Precision) | Negative Predictive Value | Accuracy | Matthews Correlation Coefficient |
|---|---|---|---|---|---|---|---|
| 0.4807 | 0.665 | 0.1265 | 0.8735 | 0.3764 | 0.9578 | 0.852 | 0.4242 |

|  | − | + |  |
|---|---|---|---|
| − | 1567 (TN) | 227 (FP) | 1794 |
| + | 69 (FN) | 137 (TP) | 206 |
|  | 1636 | 364 | 2000 |

Actual / Predicted

FIG. 15E

| Model Name & Description | Feature List & Sample Size | Validation | Cross Validation | Holdout |
|---|---|---|---|---|
| ☐ ⊛ Anomaly Detection Blender<br>Category Count \| Matrix of word-grams occurrences \| Truncated Singular Value Decomposition \| Missing Values Imputed \| Double Median Absolute Deviation Anomaly Detection \| Isolation Forest Anomaly Detection \| Anomaly Detection Blender<br>Tuned from M9 with blend_type=minimum<br>[M18 BP45 TUNED] | Informative Features<br>100.0% ⁂ ⊕ | 0.8596 * | 0.8556 * | 0.8689 * |
| ☐ ⊛ Anomaly Detection with Supervised Learning (XGB)<br>Category Count \| Matrix of word-grams occurrences \| Truncated Singular Value Decomposition \| Missing Values Imputed \| Anomaly Detection with Supervised Learning (XGB)<br>[M12 BP43] ☆ | Informative Features<br>100.0% ⁂ ⊕ | 0.8588 * | 0.8503 * | 0.8776 * |
| ⊛ Isolation Forest Anomaly Detection<br>Category Count \| Matrix of word-grams occurrences \| Truncated Singular Value Decomposition \| Missing Values Imputed \| Isolation Forest Anomaly Detection<br>[M10 BP44] | Informative Features<br>100.0% ⁂ | 0.8539 * | 0.8494 * | 0.8655 * |
| ⊛ Anomaly Detection Blender<br>Category Count \| Matrix of word-grams occurrences \| Truncated Singular Value Decomposition \| Missing Values Imputed \| Double Median Absolute Deviation Anomaly Detection \| Isolation Forest | Informative Features | 0.8491 * | 0.8443 * | 0.8654 * |

FIG. 15F

Validation Predictions

Preview of explanations for predictions from validation data within highlighted area(s):

| ID | PREDICTION | EXPLANATIONS | | | |
|------|-------|---|---|---|---|
| 5838 | 1.000 | +++ cstNotes = "change request cus... | +++ totalRefundsToCust90d = 29253.16 | +++ nbrMerchCredits |
| 1031 | 1.000 | +++ totalRefundsToCust90d = 2876.82 | +++ nbrMerchCreditsWoOf... = 8 | +++ totalMerchCre |
| 6409 | 1.000 | +++ nbrMerchCredits90d = 21 | +++ nbrDistinctMerch90d = 75 | +++ totalMerchCredC |
| 391 | 0.000 | --- csrNotes = MISSING | --- totalMerchCred90d = 0 | --- totalPaymentAm |
| 9153 | 0.000 | --- csrNotes = MISSING | --- nbrCustReqRefunds90d = 1 | --- income = 58000 |
| 7797 | 0.000 | --- csrNotes = MISSING | --- nbrCustReqRefunds90d = 1 | --- totalMerchCredC |

FIG. 15I

Isolation Forest Anomaly Detection
M10 BP44 | Informative Features 10 models available

Columns (29) Export

| anomalyScore | SAR | kycRiskScore | income | tenureMonths | creditScore |
|---|---|---|---|---|---|
| 1 | 1 | 1 | 149100 | 12 | 693 |
| 0.9604 | 0 | 1 | 151500 | 18 | 677 |
| 0.9428 | 1 | 3 | 195000 | 21 | 679 |
| 0.9317 | 1 | 2 | 160000 | 15 | 731 |
| 0.9104 | 1 | 1 | 198400 | 34 | 702 |
| 0.9096 | 1 | 1 | 182700 | 9 | 692 |

FIG. 15J

FIG. 15K

METHODS FOR DETECTING AND INTERPRETING DATA ANOMALIES, AND RELATED SYSTEMS AND DEVICES

CROSS-REFERENCE TO RELATED APPLICATIONS

This application claims priority and benefit under 35 U.S.C. §§ 120 and 365(c) as a continuation of International (PCT) Patent Application No. PCT/US2019/066381, titled "Methods for Detecting and Interpreting Data Anomalies, and Related Systems and Devices" and filed on Dec. 13, 2019, which claims priority to and benefit of U.S. Provisional Patent Application No. 62/779,172, titled "Methods for Detecting and Interpreting Data Anomalies, and Related Systems and Devices" and filed on Dec. 13, 2018, each of which is hereby incorporated by reference herein in its entirety.

FIELD OF THE DISCLOSURE

The present disclosure relates generally to systems and methods for data analysis. Some embodiments relate specifically to systems and methods for using machine learning to predict and/or explain data anomalies.

BACKGROUND

Many organizations and individuals use electronic data to improve their operations and/or aid their decision-making. For example, many business enterprises use data management technologies to enhance the efficiency of various business processes, such as executing transactions, tracking inputs and outputs, or marketing products. As another example, many businesses use operational data to evaluate performance of business processes, to measure the effectiveness of efforts to improve processes, or to decide how to adjust processes.

In some cases, electronic data can be used to anticipate problems or opportunities. Specifically, some organizations use operations data describing what happened in the past to build predictive models. Based on the outcomes predicted by the predictive models, organizations can make decisions, adjust processes, or take other actions. For example, an insurance company might seek to build a predictive model that more accurately forecasts future claims, or a predictive model that predicts when policyholders are considering switching to competing insurers. An automobile manufacturer might seek to build a predictive model that more accurately forecasts demand for new car models. A fire department might seek to build a predictive model that forecasts days with high fire danger, or predicts which structures are endangered by a fire.

In predictive modeling, patterns identified in observed data are used to predict new or unknown outcomes. Some predictive models rely upon "supervised learning," in which predictive models are trained to make predictions based on known outcomes for observed data. However, sometimes outcomes are unknown and the goal of the predictive modeling is to identify patterns in the data. This process is known as "unsupervised learning."

Anomaly detection generally refers to the process of identifying items or events in data which differ significantly from the dataset norm (e.g., rare or unexpected items or events). Anomaly detection techniques generally attempt to identify items or events that are not conforming to an expected pattern. In many cases, anomalies can be translated into distinct tangible problems such as manufacturing defects, data quality errors or fraudulent behavior.

SUMMARY

Many organizations rely on predictive models as the first line of defense to flag instances of anomalous data (representing, for example, anomalous events or activities) that merit further review and/or processing. For example, predictive models can be used to identify anomalous insurance claims for further review to determine whether the anomalous claims are fraudulent and should be denied. As another example, predictive models can be used to identify anomalous credit card charges for further review to determine whether the charges are fraudulent and whether credit card activity should be suspended to prevent further fraudulent charges. As yet another example, predictive models can be used to identify anomalous occurrences of network access (or other computer-based activity) for further review to determine whether the access (or activity) is a security threat and whether an alert should be raised.

However, relative to many predictive modeling applications, anomaly detection is nuanced, and as such tends to warrant special considerations for implementation. For instance, not only can the optimal process for anomaly detection can vary significantly by use case, but it can be difficult to identify a suitable anomaly detection process (e.g., the best anomaly detection process) even with awareness of the use case. Even further, identification of a suitable anomaly detection process can be time consuming and historically has relied heavily on the expertise of trained data scientists. As another example, many datasets from which anomalous data samples are to be predicted include multivariate data types, including free text data. Processing of such free text data can not only be time consuming and reliant on the expertise of trained data scientists as described above, but can be computationally costly as well. Furthermore, in addition to merely identifying anomalous data samples, it may be desirable for anomaly detection processes to provide rationale as to why the particular data samples were identified as anomalous so that system improvements can be implemented. For example, in some cases, data samples can be identified as anomalous based on faulty rationale (e.g., data drift). Without identifying rationale for anomaly detection, inaccurate anomaly detection can continue unchecked.

As yet another example, many current anomaly detection processes rely upon supervised machine learning, which can be unsuitable for anomaly detection in a variety of use cases such as, for example:

Use cases in which there are large number of transactions and only a small minority require investigation, making training data highly imbalanced.

Use cases in which there is no ground truth available and therefore no outcomes on which to train.

Use cases in which there are large volumes of data that require humans to label them appropriately. Such labeling is both expensive and time consuming.

Use cases in which training data quality is low, requiring the removal of outliers before building predictive models.

Use cases in which system operators need to be alerted prior to the system's failure so that they can take preventive action.

Use cases in which user behavior changes over time, for example due to influence from advertising campaigns or shift to malicious intent.

In summary, the challenges posed by anomaly detection necessitate particular solutions. However, current solutions for anomaly detection have not sufficiently considered the above challenges, and as such, have failed to incorporate strategies to address these challenges. To alleviate this shortcoming, this disclosure provides a suite of anomaly detection techniques that enable accurate and efficient detection of anomalous data samples.

As discussed above, current solutions for anomaly detection do not sufficiently address the various unique challenges of anomaly detection. Therefore, this disclosure provides improved methods for anomaly detection. One method disclosed herein provides for automatically predicting anomalous data samples from a plurality of data samples. Another method disclosed herein provides for predicting anomalous data samples from a plurality of data samples, where each data sample is associated with one or more features having a free text data type and one or more features having a non-text data type. Another method disclosed herein provides for predicting anomalous data samples from a plurality of data samples, using multiple different anomaly detection techniques. Another method disclosed herein provides for identifying features of data samples that contribute most to identification of the data samples as anomalous. Another method disclosed herein provides for generating a data set for a supervised machine learning model. Another method disclosed herein provides for refining a training dataset for training a supervised machine learning model.

In general, one innovative aspect of the subject matter described in this specification can be embodied in an anomaly detection method comprising obtaining a data set comprising plurality of data samples. Each of the plurality of data samples is associated with respective values for a set of features. The method further comprises optionally identifying a size of the data set, identifying a respective data type of each of the features, and automatically generating an anomaly detection blueprint based on the respective data types of one or more of the features, and optionally based on the identified size of the data set. The anomaly detection blueprint comprises a machine-executable module encoding an anomaly detection procedure. The anomaly detection procedure includes a plurality of tasks. One or more of the tasks are selected based on the respective data types of the one or more features, and optionally based on the identified size of the data set. The method further comprises executing the machine-executable module, thereby performing the anomaly detection procedure. Performing the anomaly detection procedure includes identifying a subset of the plurality of data samples as a set of anomalous data samples.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the one or more features include a particular feature. The identified data type of the particular feature can be a numerical data type. In such embodiments, the anomaly detection procedure corresponding to the anomaly detection blueprint may not include a task of performing normalization, standardization, or ridit transformation of the respective values of the plurality of data samples for the particular feature having the numerical data type.

In some embodiments, the one or more features include a particular feature. The data type of the particular feature can be a numerical data type. In such embodiments, the plurality of data samples can include one or more first data samples and one or more second data samples, where the respective value of the particular feature for each of the first data samples is missing and where the respective value of the particular feature for each of the second data samples is non-missing. The tasks of the anomaly detection procedure corresponding to the anomaly detection blueprint can include a missing value imputation task comprising replacing the respective missing value of the particular feature of each of the first data samples with a median of the non-missing values of the particular feature for the second data samples.

In some embodiments, the one or more features include a particular feature. The plurality of data samples can include one or more data samples where the respective value for the particular feature is missing. In such embodiments, the tasks of the anomaly detection procedure corresponding to the anomaly detection blueprint can include a feature engineering task comprising adding a new feature to the set of features and determining the respective value of the new feature for each of the plurality of data samples. The respective value of the new feature for each of the plurality of data samples can indicate whether the respective data sample is missing a value for the particular feature.

In certain embodiments in which the plurality of data samples include one or more data samples where the respective value for the particular feature is missing and in which the feature engineering task is performed, each of the plurality of data samples can be further associated with a respective value of a label. The respective value of the label for each of the plurality of data samples indicates a known anomalousness of the data sample. Furthermore, the tasks of the anomaly detection procedure corresponding to the anomaly detection blueprint can further include obtaining a respective anomaly score for each of the plurality of data samples and identifying, based on the anomaly scores, the set of anomalous data samples from the plurality of data samples. The respective anomaly score for each data sample indicates a predicted extent to which the data sample is anomalous. The actions of the anomaly detection method can further include determining a correlation between the respective anomaly score or the respective anomaly classification and the respective value of the label for each of the plurality of data samples. Responsive to the correlation being less than a threshold correlation, the actions of the method can further include removing the set of anomalous data samples from the plurality of data samples. Otherwise, responsive to the correlation being at least the threshold correlation, the actions of the method can further include retaining the set of anomalous data samples in the plurality of data samples.

In some embodiments, the one or more features include a particular feature. The data type of the particular feature can be a categorical data type. In such embodiments, the tasks of the anomaly detection procedure corresponding to the anomaly detection blueprint can include a feature engineering task comprising for each of the plurality of data samples, replacing the respective value of the particular feature having the categorical data type with a respective frequency of occurrence of the respective value of the particular feature in the plurality of data samples.

In some embodiments, the one or more features include one or more particular features. The data type of the one or more particular features can be a free text data type. In such embodiments, the tasks of the anomaly detection procedure corresponding to the anomaly detection blueprint can include a feature engineering task comprising identifying a plurality of terms that occur most frequently within a combined free text corpus comprising the values for the one or more particular features having the free text data type for the plurality of data samples. Then, the feature engineering task can further comprise generating a sample-term matrix. Each row of the sample-term matrix corresponds to a respective data sample in the plurality of data samples. Each column of the sample-term matrix corresponds to a respective term in the plurality of terms that occur most frequently. Each element of the sample-term matrix indicates whether the term corresponding to the column of the element occurs in the data sample corresponding to the row of the element, within the values of the one or more particular features having the free text data type.

In certain embodiments in which the sample-term matrix is generated for the one or more particular features having the free text data type, the feature engineering task can further comprise replacing the one or more particular features in the set of features with an engineered feature. Then, the feature engineering task can further comprise, for each of the plurality of data samples, setting a respective value of the engineered feature to the row of the sample-term matrix corresponding to the respective data sample.

In certain embodiments in which the one or more particular features in the set of features are replaced with the engineered feature, a number of unique terms in the combined free text corpus can be greater than 5,000, a number of unique terms in the plurality of terms that occur most frequently within the combined free text corpus can be 5,000, and a number of columns of the sample-term matrix can be 5,000.

In certain embodiments in which the sample-term matrix is generated, rather than replacing the one or more particular features in the set of features with the engineered value having values set to the rows of the sample-term matrix, the feature engineering task can further comprise generating a compact matrix by performing Singular-Value Decomposition (SVD) on the sample-term matrix. In such embodiments, a quantity of columns in the compact matrix is less than a quantity of columns in the sample-term matrix, and each row of the compact matrix corresponds to a respective data sample in the plurality of data samples. Then, the feature engineering task can further comprise replacing the one or more particular features in the set of features with an engineered feature and, for each of the plurality of data samples, setting a respective value of the engineered feature to the row of the compact matrix corresponding to the respective data sample.

In some embodiments, the one or more features include one or more particular features. The data type of each of the one or more particular features can be a free text data type. In such embodiments, the tasks of the anomaly detection procedure corresponding to the anomaly detection blueprint can include a feature engineering task comprising, for each of the one or more particular features having the free text data type, identifying a plurality of terms that occur most frequently within a combined free text corpus comprising the values for the respective particular feature for the plurality of data samples, and generating a sample-term matrix. Each row of the sample-term matrix corresponds to a respective data sample in the plurality of data samples. Each column of the sample-term matrix corresponds to a respective term in the plurality of terms that occur most frequently. Each element of the sample-term matrix indicates whether the term corresponding to the column of the element occurs in the data sample corresponding to the row of the element, within the values of the respective particular feature.

In certain embodiments in which the sample-term matrix is generated for each of the one or more particular features having the free text data type, the feature engineering task can further comprise, for each sample-term matrix corresponding to each of the one or more particular features having the free text data type, generating a compact matrix by performing Singular-Value Decomposition (SVD) on the sample-term matrix. In such embodiments, a quantity of columns in the compact matrix is less than a quantity of columns in the sample-term matrix, and each row of the compact matrix corresponds to a respective data sample in the plurality of data samples. Then, the feature engineering task can further comprise, for each sample-term matrix corresponding to each of the one or more particular features having the free text data type, replacing the respective particular feature in the set of features with a respective engineered feature and, for each of the plurality of data samples, setting a respective value of the respective engineered feature to the row of the compact matrix corresponding to the respective data sample.

In some embodiments, the set of anomalous data samples is identified using an anomaly detection process selected from a group of anomaly selection processes based, at least in part, on a number of data samples in the data set and/or on a storage size of the data set. The number of data samples in the data set can be less than a first sample number threshold and the storage size of the data set can be less than a storage size threshold. In such embodiments, the group of anomaly selection processes can consist of an isolation forest process, a double median absolute deviance (MAD) process, a one class support vector machine (SVM) process, a local outlier factor (LOF) process, and a Mahalanobis distance process. In alternative embodiments, the number of data samples in the data set can be greater than a first sample number threshold and less than a second sample number threshold and the storage size of the data set can be less than a storage size threshold. In such embodiments, the group of anomaly selection processes can consist of an isolation forest process, a double median absolute deviance (MAD) process, and a Mahalanobis distance process. In alternative embodiments, the number of data samples in the data set can be greater than a first sample number threshold and a second sample number threshold, or the storage size of the data set can be greater than a storage size threshold. In such embodiments, the group of anomaly selection processes can consist of a double median absolute deviance (MAD) process and a Mahalanobis distance process.

In some embodiments, the step of identifying the set of anomalous data samples can comprise determining, by an unsupervised anomaly detection process, for each of the plurality of data samples, a respective anomaly score indicating an extent to which the respective data sample is anomalous. Then, the step of identifying the set of anomalous data samples can comprise adding the anomaly scores to the data set as respective values of a label of the plurality of data samples, thereby generating a labeled data set, and applying a supervised anomaly detection model to the labeled data set to identify the set of anomalous data samples.

In some embodiments, the step of identifying the set of anomalous data samples can comprise determining, by an unsupervised anomaly detection process, for each of the plurality of data samples, a respective anomaly score indicating an extent to which the respective data sample is anomalous. The set of anomalous data samples can comprise a fraction of the plurality of data samples having greatest anomaly scores. In some such embodiments, the tasks of the anomaly detection procedure corresponding to the anomaly detection blueprint can further include assigning a respective value of a label to each of the plurality of data samples based on the identified set of anomalous data samples. The respective value of the label assigned to each data sample indicates whether the respective data sample is anomalous. Then, the tasks of the anomaly detection procedure corresponding to the anomaly detection blueprint can further include using the labeled data samples as training data to train a supervised anomaly detection model to infer whether data samples are anomalous based on the values of the features associated with the data samples.

In general, another innovative aspect of the subject matter described in this specification can be embodied in an anomaly detection method comprising obtaining a data set comprising a plurality of data samples. Each of the plurality of data samples is associated with respective values for a set of features. The set of features comprises at least a first feature having a free text data type and a second feature having a non-text data type. The method further comprises identifying a subset of the plurality of data samples as a set of anomalous data samples based, at least in part, on the respective values for the first and second features of each of the plurality of data samples.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the actions of the method further comprise identifying a plurality of terms that occur most frequently within a combined free text corpus comprising the values for the at least first feature having the free text data type for the plurality of data samples, and generating a sample-term matrix. Each row of the sample-term matrix corresponds to a respective data sample in the plurality of data samples. Each column of the sample-term matrix corresponds to a respective term in the plurality of terms that occur most frequently. Each element of the sample-term matrix indicates whether the term corresponding to the column of the element occurs in the data sample corresponding to the row of the element, within the values of the at least first feature having the free text data type.

In certain embodiments in which the sample-term matrix is generated for the at least first feature having the free text data type, the feature engineering task can further comprise replacing the at least first feature in the set of features with an engineered feature. Then, the feature engineering task can further comprise, for each of the plurality of data samples, setting a respective value of the engineered feature to the row of the sample-term matrix corresponding to the respective data sample.

In certain embodiments in which the at least first feature in the set of features is replaced with the engineered feature, a number of unique terms in the combined free text corpus can be greater than 5,000, a number of unique terms in the plurality of terms that occur most frequently within the combined free text corpus can be 5,000, and a number of columns of the sample-term matrix can be 5,000.

In certain embodiments in which the sample-term matrix is generated, rather than replacing the at least first feature in the set of features with the engineered value having values set to the rows of the sample-term matrix, the feature engineering task can further comprise generating a compact matrix by performing Singular-Value Decomposition (SVD) on the sample-term matrix. In such embodiments, a quantity of columns in the compact matrix is less than a quantity of columns in the sample-term matrix, and each row of the compact matrix corresponds to a respective data sample in the plurality of data samples. Then, the feature engineering task can further comprise replacing the at least first feature in the set of features with an engineered feature and, for each of the plurality of data samples, setting a respective value of the engineered feature to the row of the compact matrix corresponding to the respective data sample.

In some embodiments, the actions of the method further comprise, for each of the at least first feature having the free text data type, identifying a plurality of terms that occur most frequently within a combined free text corpus comprising the values for the respective at least first feature for the plurality of data samples, and generating a sample-term matrix. Each row of the sample-term matrix corresponds to a respective data sample in the plurality of data samples. Each column of the sample-term matrix corresponds to a respective term in the plurality of terms that occur most frequently. Each element of the sample-term matrix indicates whether the term corresponding to the column of the element occurs in the data sample corresponding to the row of the element, within the values of the respective at least first feature.

In certain embodiments in which the sample-term matrix is generated for each of the at least first feature having the free text data type, the feature engineering task can further comprise, for each sample-term matrix corresponding to each of the at least first feature having the free text data type, generating a compact matrix by performing Singular-Value Decomposition (SVD) on the sample-term matrix. In such embodiments, a quantity of columns in the compact matrix is less than a quantity of columns in the sample-term matrix, and each row of the compact matrix corresponds to a respective data sample in the plurality of data samples. Then, the feature engineering task can further comprise, for each sample-term matrix corresponding to each of the at least first feature having the free text data type, replacing the respective at least first feature in the set of features with an engineered feature and, for each of the plurality of data samples, setting a respective value of the engineered feature to the row of the compact matrix corresponding to the respective data sample.

In some embodiments, the step of identifying a subset of the plurality of data samples as a set of anomalous data samples comprises determining, by an unsupervised anomaly detection process, for each of the plurality of data samples, a respective anomaly score indicating an extent to which the respective data sample is anomalous. Then, the step of identifying a subset of the plurality of data samples as a set of anomalous data samples further comprises adding the anomaly scores to the data set as respective values of a label of the plurality of data samples, thereby generating a labeled data set, and applying a supervised anomaly detection model to the labeled data set to identify the set of anomalous data samples.

In some embodiments, the step of identifying a subset of the plurality of data samples as a set of anomalous data samples comprises determining, by an unsupervised anomaly detection process, for each of the plurality of data samples, a respective anomaly score indicating an extent to which the respective data sample is anomalous. The set of anomalous data samples comprises a fraction of the plurality of data samples having greatest anomaly scores. In such embodiments, the actions of the anomaly detection method further comprise assigning a respective value of a label to each of the plurality of data samples based on the identified set of anomalous data samples. The respective value of the label assigned to each data sample indicates whether the respective data sample is anomalous. The actions of the anomaly detection method can further comprise using the labeled data samples as training data to train a supervised anomaly detection model to infer whether data samples are anomalous based on the values of the features associated with the data samples.

In general, another innovative aspect of the subject matter described in this specification can be embodied in an anomaly detection method comprising obtaining, from multiple different sources, respective anomaly scores for a data sample. Each of the anomaly scores indicates a respective extent to which the data sample is predicted to be anomalous by the respective source. The method further comprises identifying a level of anomaly detection rigor for identification of anomalousness of the data sample. The level of anomaly detection rigor comprises maximum rigor or minimum rigor. Responsive to the identified level of anomaly detection rigor being minimum rigor and responsive to at least one of the anomaly scores being greater than a first threshold anomaly score, the method further comprises identifying the data sample as an anomalous data sample. Responsive to the identified level of anomaly detection rigor being minimum rigor and responsive to none of the anomaly scores being greater than the first threshold anomaly score, the method further comprises identifying the data sample as a non-anomalous data sample. Responsive to the identified level of anomaly detection rigor being maximum rigor and responsive to at least one of the anomaly scores being less than a second threshold anomaly score, the method further comprises identifying the data sample as a non-anomalous data sample. Responsive to the identified level of anomaly detection rigor being maximum rigor and responsive to all of the anomaly scores being greater than the second threshold anomaly score, the method further comprises identifying the data sample as an anomalous data sample.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, identifying the level of anomaly detection rigor comprises receiving an indication of the level of anomaly detection rigor from a user. In some embodiments, each of the multiple different sources is a respective anomaly detection process or anomaly detection model.

In general, another innovative aspect of the subject matter described in this specification can be embodied in an anomaly analysis method comprising obtaining respective anomaly scores for each of a plurality of data samples. Each of the plurality of data samples is associated with respective values for a set of features. The respective anomaly score for each data sample indicates an extent to which the data sample is anomalous. The analysis method further comprises identifying, based on the anomaly scores, a set of anomalous data samples from the plurality of data samples, and determining a sum of the anomaly scores for the set of anomalous data samples. The determined sum is a base sum. The analysis method further comprises, for each feature in the set of features, adjusting the respective value of the feature for each of the anomalous data samples to neutralize the feature's impact on assessment of the data samples' anomalousness, thereby generating updated anomalous data samples, determining a respective anomaly score for each of the updated anomalous data samples, determining a sum of the anomaly scores for the updated anomalous data samples, wherein the sum is a feature sum, and determining a difference between the base sum and the feature sum. The difference between the base sum and the feature sum represents a contribution of the values of the feature to the identification of the set of data samples as anomalous. Finally, the analysis method further comprises identifying, based on the determined differences for the features, one or more features that contributed most to the identification of the set of data samples as anomalous.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, obtaining respective anomaly scores for each of a plurality of data samples comprises receiving the respective anomaly scores for each of the plurality of data samples from an anomaly detection model, and determining an anomaly score for each of the updated data samples comprises determining the anomaly score for each of the updated data samples by the anomaly detection model.

In some embodiments, the set of anomalous data samples comprises a fraction of the plurality of data samples having the greatest anomaly scores. The fraction of the plurality of data samples comprises an expected outlier fraction. In some embodiments, the expected outlier fraction comprises 10%.

In some embodiments, adjusting the respective value of the feature for each of the anomalous data samples to neutralize the feature's impact on assessment of the data samples' anomalousness comprises replacing the respective value of the feature for each of the anomalous data samples with a constant value, and the actions of the analysis method further comprise determining the constant value based on the values of the feature for the anomalous data samples. For instance, in some embodiments, determining the constant value comprises determining a data type of the feature. Responsive to determining that the data type of the feature is numerical, determining the constant value can further comprise replacing the respective value of the feature for each of the anomalous data samples with a median of the values of the feature for the anomalous data samples. Otherwise, responsive to determining that the data type of the feature is categorical or free text, determining the constant value can further comprise replacing the value of the respective feature for each of the anomalous data samples with the value of the feature occurring at the highest frequency in the anomalous data samples.

In some embodiments, the actions of the analysis method further comprise, for each feature in the set of features, determining a normalized difference between the base sum and the respective feature sum. In such embodiments, the features that contributed most to the identification of the data samples as anomalous are identified based on the normalized differences for the features.

In some embodiments, the actions of the analysis method further comprise ranking the features in the set of features based on the differences. In such embodiments, a higher ranking indicates a greater contribution of the feature to the identification of the set of data samples as anomalous.

In some embodiments, the plurality of data samples is a first plurality of data samples associated with a first time point, the set of anomalous data samples is a first set of anomalous data samples, the anomaly scores for the first plurality of data samples are first anomaly scores, and a second plurality of data samples is associated with a second time point after the first time point. In such embodiments, the actions of the analysis method further comprise obtaining a respective second anomaly score for each of the second plurality of data samples. Each of the second plurality of data samples is associated with respective values for the set of features. The actions of the analysis method may further comprise identifying, based on the second anomaly scores, a second set of anomalous data samples from the second plurality of data samples, determining a first quantity of data samples of the first set of anomalous data samples having respective first anomaly scores greater than a threshold anomaly score, determining a second quantity of data samples of the second set of anomalous data samples having respective second anomaly scores greater than the threshold anomaly score, and determining a quantity difference between the first and second quantities of data samples. Responsive to an absolute value of the quantity difference being greater than a threshold difference, the actions of the analysis method further comprise performing one or more actions associated with updating an anomaly detection model from which the first and second anomaly scores were obtained.

In certain embodiments, the one or more actions associated with updating the anomaly detection model include providing a message to a user of the anomaly detection model, the message recommending that the anomaly detection model be updated. In certain embodiments, the one or more actions associated with updating the anomaly detection model include generating a new anomaly detection model based on the second plurality of data samples associated with the second time point.

In some embodiments, the first plurality of data samples and the second plurality of data samples are associated with the same entity. In alternative embodiments, the first plurality of data samples and the second plurality of data samples are associated with different entities.

In some embodiments, the actions of the analysis method further comprise determining business rules for identifying future anomalous data samples based on the features identified as contributing most to the identification of the data samples as anomalous.

In general, another innovative aspect of the subject matter described in this specification can be embodied in a feature engineering method for a supervised machine learning process comprising determining, by an unsupervised anomaly detection model, respective anomaly scores for each of a plurality of data samples. Each of the plurality of data samples is associated with respective values for a set of features. The respective anomaly score for each data sample indicates a predicted extent to which the data sample is anomalous. The feature engineering method further comprises adding a new feature to the set of features, where the respective value of the new feature for each data sample is based on the respective anomaly score of each data sample, thereby generating an updated plurality of data samples. In some embodiments, the feature engineering method further comprises training a first machine learning model to predict a respective value of a label for each of another updated plurality of data samples based on respective values of the set of features for each of the other updated plurality of data samples. In such embodiments, each of the updated plurality of data samples is further associated with a respective value for the label. Additionally, in such embodiments, training the first machine learning model comprises training the first machine learning model using a supervised machine learning process using the updated plurality of data samples as training data and/or validation data. In alternative embodiments, the feature engineering method further comprises using a second machine learning model to predict a respective value of the label for each of the plurality of updated data samples.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

In general, another innovative aspect of the subject matter described in this specification can be embodied in a data pre-processing method for a supervised machine learning process. The method comprises obtaining respective anomaly scores for each of a plurality of training data samples for training a supervised machine learning model. Each of the plurality of training data samples is associated with respective values for a set of features and with a respective value of a label. The respective anomaly score for each training data sample indicates a predicted extent to which the data sample is anomalous. The method further comprises identifying, based on the anomaly scores, a set of anomalous training data samples from the plurality of training data samples and determining a correlation between the respective anomaly score or the respective anomaly classification and the respective value of the label for each of the plurality of training data samples. Responsive to the correlation being less than a threshold correlation, the method further comprises removing the set of anomalous training data samples from the plurality of training data samples for training the supervised machine learning model. Otherwise, responsive to the correlation being at least the threshold correlation, the method further comprises retaining the set of anomalous training data samples in the plurality of training data samples for training the supervised machine learning model.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, obtaining respective anomaly scores for each of a plurality of training data samples comprises receiving the respective anomaly scores for each of the plurality of training data samples from an anomaly detection model. In such embodiments, the anomaly detection model can be an unsupervised machine learning model.

In some embodiments, the set of anomalous training data samples can comprise a fraction of the plurality of training data samples having the greatest anomaly scores. The fraction of the plurality of training data samples comprises an expected outlier fraction. In some embodiments, the expected outlier fraction can comprise 10%.

In some embodiments, responsive to the correlation being less than a threshold correlation, the actions of the method further comprise determining a sum of the anomaly scores for the set of anomalous training data samples. The determined sum is a base sum. The actions of the method may further comprise, for each feature in the set of features, adjusting the respective value of the feature for each of the anomalous training data samples to neutralize the feature's impact on assessment of the training data samples' anomalousness, thereby generating updated anomalous training data samples, determining a respective anomaly score for each of the updated anomalous training data samples, determining a sum of the anomaly scores for the updated anomalous training data samples, wherein the sum is a feature sum, and determining a difference between the base sum and the feature sum. The difference between the base sum and the feature sum represents a contribution of the values of the feature to the identification of the set of training data samples as anomalous. The actions of the method may further comprise identifying, based on the determined differences for the features, one or more features that contributed most to the identification of the set of training data samples as anomalous.

In certain embodiments in which one or more features that contributed most to the identification of the set of training data samples as anomalous are identified, the actions of the method can further comprise providing a message to a user indicating the one or more features that contributed most to the identification of the set of training data samples as anomalous. In some additional embodiments in which one or more features that contributed most to the identification of the set of training data samples as anomalous are identified, determining an anomaly score for each of the updated anomalous training data samples can comprise determining the anomaly score for each of the updated anomalous training data samples by an anomaly detection model that was used to determine the respective anomaly scores for each of the plurality of training data samples.

In some additional embodiments in which one or more features that contributed most to the identification of the set of training data samples as anomalous are identified, adjusting the respective value of the feature for each of the anomalous training data samples to neutralize the feature's impact on assessment of the training data samples' anomalousness can comprise replacing the respective value of the feature for each of the anomalous training data samples with a constant value, and the actions of the method can further comprise determining the constant value based on the values of the feature for the anomalous training data samples. In such embodiments, determining the constant value can comprise determining a data type of the feature. Responsive to determining that the data type of the feature is numerical, the actions of the method can further comprise replacing the respective value of the feature for each of the anomalous training data samples with a median of the values of the feature for the anomalous training data samples. Otherwise, responsive to determining that the data type of the feature is categorical or free text, the actions of the method can further comprise replacing the value of the respective feature for each of the anomalous training data samples with the value of the feature occurring at the highest frequency in the anomalous training data samples.

In some additional embodiments in which one or more features that contributed most to the identification of the set of training data samples as anomalous are identified, the actions of the method can further comprise, for each feature in the set of features, determining a normalized difference between the base sum and the respective feature sum. In such embodiments, the features that contributed most to the identification of the training data samples as anomalous are identified based on the normalized differences for the features.

In some additional embodiments in which one or more features that contributed most to the identification of the set of training data samples as anomalous are identified, the actions of the method can further comprise ranking the features in the set of features based on the differences. A higher ranking indicates a greater contribution of the feature to the identification of the set of training data samples as anomalous.

By taking the special nuances of anomaly detection into account as described above and throughout the remainder of this disclosure, the invention can enable more efficient and more accurate anomaly detection.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

These and other features, aspects, and advantages of the present invention will become better understood with regard to the following description, and accompanying drawings, where:

FIG. 7 depicts an image of an input/output interface of an anomaly detection system, in accordance with an embodiment.

FIGS. 14A, 14B, 14C, 14D, 14E, 14F, 14G, 14H, 14I, 14J, 14K, 14L, and 14M show screen shots of examples of user interfaces, in accordance with some embodiments.

FIGS. 15A, 15B, 15C, 15D, 15E, 15F, 15G, 15H, 15I, 15J, and 15K show screen shots of examples of user interfaces, in accordance with some embodiments.

Figure 1:
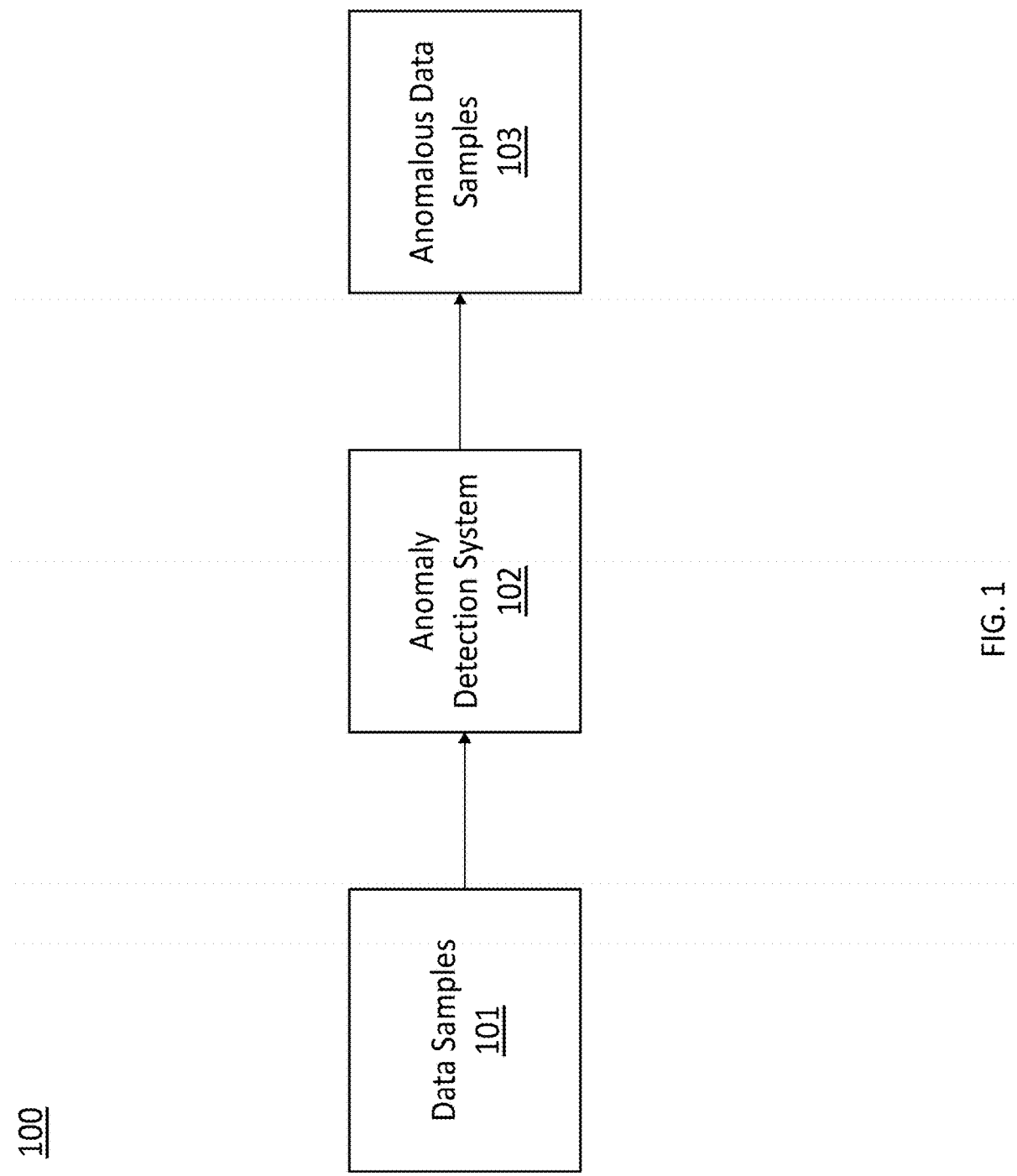
FIG. 1 is a block diagram of a system environment for an anomaly detection system configured to predict anomalous data samples, in accordance with an embodiment.

The figures depict various embodiments for purposes of illustration only. One skilled in the art will readily recognize from the following discussion that alternative embodiments of the structures and methods illustrated herein can be employed without departing from the principles of the invention described herein.

DETAILED DESCRIPTION

I. Terms

In general, terms used in the claims and the specification are intended to be construed as having the plain meaning understood by a person of ordinary skill in the art. Certain terms are defined below to provide additional clarity. In case of conflict between the plain meaning and the provided definitions, the provided definitions are to be used.

Any terms not directly defined herein shall be understood to have the meanings commonly associated with them as understood within the art of the invention. Certain terms are discussed herein to provide additional guidance to the practitioner in describing the compositions, devices, methods and the like of aspects of the invention, and how to make or use them. It will be appreciated that the same thing can be said in more than one way. Consequently, alternative language and synonyms can be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples, including examples of terms, is for illustrative purposes only and does not limit the scope and meaning of the aspects of the invention herein.

The term "approximately" and other similar phrases as used in the specification and the claims, should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

II. Anomaly Detection System Overview

FIG. 1 is a block diagram of a system environment 100 for an anomaly detection system 102 configured to predict anomalous data samples, in accordance with an embodiment. Specifically, as shown in FIG. 1, the anomaly detection system 102 obtains (e.g., receives) a plurality of data samples 101, and predicts anomalous data samples 103 from the received plurality of data samples 101.

Each data sample 101 received by the anomaly detection system 102 is associated with values for a set of features. A feature of a data sample may be a measurable property of an entity (e.g., person, thing, event, activity, etc.) represented by or associated with the data sample. For example, a feature can be the age of a person. In some cases, a feature of a data sample is a description of (or other information regarding) an entity represented by or associated with the data sample. A value of a feature may be a measurement of the corresponding property of an entity or an instance of information regarding an entity. For instance, in the above example in which a feature is the age of a person, a value of the feature can be 30 years. As referred to herein, a value of a feature can also refer to a missing value (e.g., no value). For instance, in the above example in which a feature is the age of a person, the age of the person can be missing.

Features can also have data types. For instance, a feature can have a numerical data type, a free text data type, a categorical data type, or any other kind of data type. In the above example, the feature of age can be a numerical data type. In general, a feature's data type is categorical if the set of values that can be assigned to the feature is finite.

An anomalous data sample is a data sample that deviates from normal and/or expected data samples. Specifically, an anomalous data sample is a data sample that is associated with one or more feature values that deviate from normal and/or expected feature values of other data samples. For example, again using the above example, in a plurality of data samples describing 9 people of age 26 years, and 1 person of age 70 years, the data sample describing the person of age 70 years may be identified as an anomalous data sample.

As discussed above, in many circumstances, it can be desirable to flag anomalous data samples for further review and/or processing. For example, anomalous insurance claims can be flagged for further review to determine whether the anomalous claims are fraudulent and should be denied. As another example, anomalous credit card charges can be flagged for further review to determine whether the charges are fraudulent and whether credit card activity should be suspended to prevent further fraudulent charges. As yet another example, anomalous occurrences of network access can be flagged for further review to determine whether the access is fraudulent and whether an alert should be raised.

As shown in FIG. 1, the anomalous data samples 103 are predicted from the data samples 101 by the anomaly detection system 102. The anomaly detection system 102 is configured to predict anomalous data samples from a plurality of data samples by executing an anomaly detection blueprint. An anomaly detection blueprint is a machine-executable (e.g., a computer-executable) module that encodes an anomaly detection procedure that includes tasks (e.g., steps). More specifically, an anomaly detection blueprint is a machine-executable (e.g., a computer-executable) module that orchestrates execution of an anomaly detection procedure that includes a plurality of selected tasks (e.g., steps) to identify anomalous data samples from a plurality of data samples.

An anomaly detection procedure can include any suitable set (e.g., series) of tasks. In some embodiments, one or more tasks of an anomaly detection procedure can be automatically selected by the anomaly detection system 102, based on qualities of the data samples 101 received. For example, tasks of an anomaly detection procedure can be automatically selected based on data types of one or more of the features of the data samples 101 and/or based on a size of the data samples 101. Such automation is beneficial because it reduces of the amount of time and human resources spent in specifying a procedure for anomaly detection, thereby rendering anomaly detection more efficient and less costly. Additionally, a user can select one or more tasks of the anomaly detection procedure.

As discussed in detail below with regard to FIG. 2, the tasks of an anomaly detection procedure can include inputting the data samples 101 into one or more anomaly detection models of the anomaly detection system 102 and/or processing the data samples 101 before and/or after they are analyzed by the one or more anomaly detection models.

Figure 2:
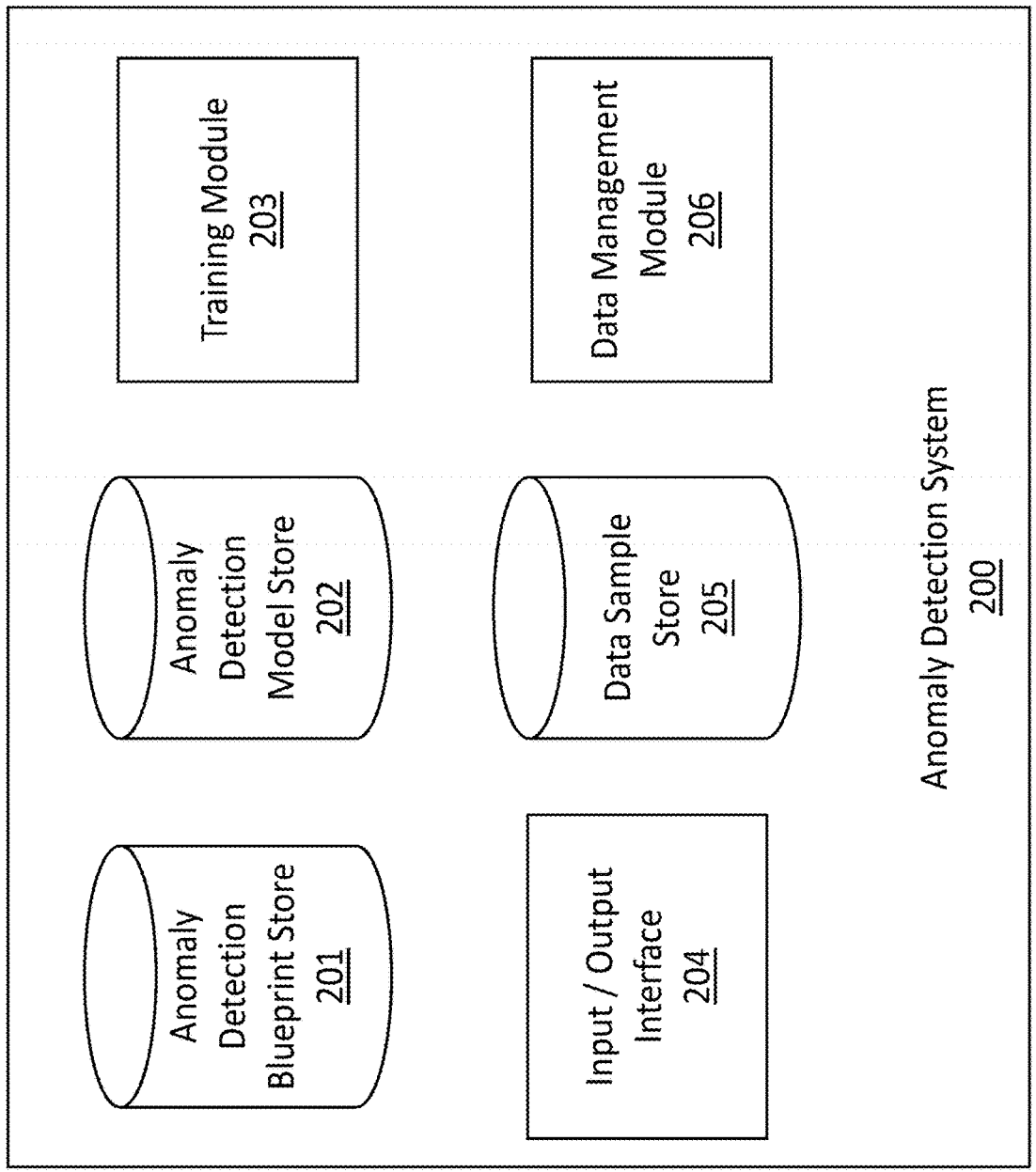
FIG. 2 is a block diagram of an architecture of an anomaly detection system configured to predict anomalous data samples, in accordance with an embodiment.

FIG. 2 is a block diagram of an architecture of an anomaly detection system 200 configured to predict anomalous data samples, in accordance with an embodiment. As shown in FIG. 2, the anomaly detection system 200 includes an anomaly detection blueprint store 201, an anomaly detection model store 202, a training module 203, an input/output interface 204, a data sample store 205, and a data management module 206. In other embodiments, the anomaly detection system 200 may include additional, fewer, or different components for various applications. Similarly, the functions can be distributed among the modules in a different manner than is described here. Conventional components such as network interfaces, security functions, load balancers, failover servers, management and network operations consoles, and the like are not shown so as to not obscure the details of the system architecture.

Turning the components of the anomaly detection system 200, the anomaly detection blueprint store 201 stores one or more anomaly detection blueprints configured to be executed by the anomaly detection system 200 to predict anomalous data samples. As discussed above, an anomaly detection blueprint is a machine-executable module that encodes an anomaly detection procedure that includes tasks to predict anomalous data samples from a plurality of data samples. Tasks of an anomaly detection procedure encoded by an anomaly detection blueprint can include one or more data processing steps, including but not limited to data processing steps performed by one or more anomaly detection models. Various non-limiting examples of anomaly detection blueprints are discussed below.

The anomaly detection model store 202 stores one or more anomaly detection models that are configured to predict anomalous data samples from a plurality of data samples. As briefly mentioned above, one or more anomaly detection models from the anomaly detection model store 202 can be included in, generated by, and/or used by the anomaly detection blueprints stored in the anomaly detection blueprint store 201.

An anomaly detection model can be a machine learning model. A machine learning model is any predictive model that is learned by a computer system based on a training dataset. Anomaly detection models are learned by computer systems because, in general, it would be too difficult or too inefficient for the models to be constructed by a human, at least due to the size and/or complexity of the training dataset.

An anomaly detection model can be an unsupervised machine learning model or a supervised machine learning model. Unsupervised and supervised machine learning models differ from one another based on their training datasets. Specifically, a training dataset used to train an unsupervised machine learning model generally does not include labels for the individual training samples, while a training dataset used to train a supervised machine learning model generally does include labels for the individual training samples. The value of a label for a training sample may indicate a known classification of the training sample or a known value of an output variable of the training sample. For example, a label for a training sample used to train a supervised anomaly detection model to detect anomalous data samples can be an indication of whether or not the training sample is an anomaly.

Following training, a machine learning model is configured to generate predictions based on a test dataset. Labels are generally not known in advance for samples in a test dataset, and therefore a machine learning model generates predictions for the test dataset based on prior training. For example, following training, an anomaly detection model may be configured to predict anomalous data samples from a plurality of test data samples.

In some embodiments, an anomaly detection model simply provides a binary prediction of anomalousness of a data sample. For example, in some embodiments, an anomaly detection model can output a prediction of a data sample as anomalous or non-anomalous. In alternative embodiments, an anomaly detection model can generate an anomaly score for a data sample. An anomaly score for a data sample may indicate an extent to which the data sample is anomalous. In certain embodiments the extent to which a data sample is anomalous can be a probability that the data sample is anomalous and/or a degree to which the data sample is anomalous. For example, an anomaly detection model may generate an anomaly score of 0.9 for a data sample, thereby predicting that there is a 90% chance that the data sample is anomalous.

In such embodiments in which an anomaly detection model generates anomaly scores for data samples, anomaly detection blueprints can include steps of identifying anomalous data samples based on the anomaly scores. For instance, in some embodiments, to identify anomalous data samples based on anomaly scores, a fraction of data samples having the most extreme (e.g., greatest) anomaly scores can be identified as the anomalous data samples. This fraction can comprise an expected outlier fraction. In other words, this fraction can comprise a fraction of the data samples that are expected to be anomalous. The expected outlier fraction can range, for example, from 0% to 25%, but in some embodiments, the expected outlier fraction is 10%.

In some further embodiments in which an anomaly detection model generates anomaly scores for data samples, anomaly detection blueprints can include steps of ranking the data samples based on their anomaly scores. By ranking data samples according to their predicted anomalousness, users can prioritize data samples for further review and processing, such that data samples exhibiting the greatest extent predicted anomalousness can be acted upon the soonest.

The training module 203 constructs the anomaly detection models stored in the anomaly detection model store 202 based on training datasets. As discussed above, the training datasets that are used to construct an anomaly detection model may depend on the type of the model. Specifically, the training datasets used to construct an anomaly detection model may depend on whether the model is a supervised machine learning model or an unsupervised machine learning model.

In general, to construct an anomaly detection model, each training sample from a training dataset is input into the anomaly detection model. The anomaly detection model processes these inputs as if the model were being routinely used to generate predictions of anomalous data samples. However, depending on the type of the anomaly detection model, each training sample in the training dataset may include additional components. In unsupervised anomaly detection models, the training samples generally do not include additional components.

In contrast, in supervised anomaly detection models, each training sample of the training dataset may further include an anomaly label. After one or more iterations of the anomaly detection model using a training sample from the training dataset, the difference between the anomaly prediction(s) output by the model and the anomaly labels of the training sample(s) are determined. Then the training module 203 seeks to reduce (e.g., minimize) this difference between the anomaly prediction output by the model and the anomaly label.

When an anomaly detection model achieves a threshold level of prediction accuracy, the model may be ready for use. To determine when an anomaly detection model has achieved the threshold level of prediction accuracy sufficient for use, validation of the anomaly detection model can be performed by the training module 203. Validation of an anomaly detection model is similar to training of an anomaly detection model, except that during training, anomaly labels of the training samples are input into the model, whereas during validation, anomaly labels of the validation samples are not input into the model to improve the model, but rather are simply compared to the predictions output by the model to determine whether the model has been sufficiently trained.

The input/output interface 204 is configured to receive data samples (e.g., training data samples and/or test data samples), and to output predictions of anomalous data samples generated by the anomaly detection system 200. In some embodiments, the input/output interface 204 can also receive instructions from users specifying one or more anomaly detection blueprints from the anomaly detection blueprint store 201 and/or one or more anomaly detection models from the anomaly detection model store 202 to be used by the anomaly detection system 200 to predict anomalous data samples.

The data sample store 205 is configured to store data samples received by the input/output interface 204. Specifically, the data sample store 205 can store training data samples to be used by the training module 203 to train one or more anomaly detection models and/or test data samples for prediction of anomalous data samples by the anomaly detection system 200.

As discussed above, in some embodiments, one or more training samples from a training dataset can be held out from training an anomaly detection model, and used to validate the anomaly detection model. In alternative embodiments, validation samples other than training samples from a training dataset can be used to validate an anomaly detection model prior to use on the test dataset.

The data management module 206 is configured to select and execute anomaly detection blueprints to predict anomalous data samples from a plurality of data samples. As discussed above, anomaly detection blueprints are stored in the anomaly detection blueprint store 201, and can include any series of tasks, including use of one or more anomaly detection models stored by the anomaly detection model store 202, as well as one or more data processing steps.

The data management module 206 can select anomaly detection blueprints from the anomaly detection blueprint store 201 automatically, and/or based on user input. For example, anomaly detection blueprints can be automatically selected by the data management module 206 based on qualities of the data samples undergoing anomaly detection, such as data types of one or more of the features of the data samples and/or size of the data samples. As another example, anomaly detection blueprints can be selected based on user instructions received at the input/output interface 204. Furthermore, anomaly detection models from the anomaly detection model store 202 for use in the anomaly detection blueprints can also be automatically selected by the data management module 206 and/or by users.

In addition to selecting anomaly detection blueprints, the data management module 206 is further configured to execute the steps of the selected anomaly detection blueprints, to predict anomalous data samples from a plurality of data samples. Execution of the steps of an anomaly detection blueprint involves execution of any data processing steps, and input of data samples into selected anomaly detection models.

Briefly, data processing steps of anomaly detection blueprints can include removing unwanted data samples, such as duplicate and/or irrelevant data samples, from datasets. Duplicate data samples can occur, for example, when data samples are collected from multiple sources. Irrelevant data samples can occur, for example, when filters used during data sample collection fail to screen data samples that are not relevant to the prediction problem of interest. Data processing can include correction of structural errors in the data samples. For example, typographical errors, inconsistent capitalization, and inconsistent use of abbreviations in the values of features can be detected and corrected. Data processing can include anomaly detection and handling. For example, if a data sample is anomalous or includes an anomalous value for a feature, the data sample may be removed, or the anomalous value may be replaced. In some embodiments, data processing can include addressing feature values missing from data samples. For example, if a feature value is missing from a data sample, the data sample can be removed, or the feature value can be replaced. Data processing can include modifying feature values for data samples by, for example, value binning (e.g., reducing the number of unique feature values by grouping the unique feature values into a smaller number of bins), log transform (e.g., replacing feature values with their logarithms), one-hot encoding, grouping, splitting, scaling (e.g., normalization), and/or any other modification. Specific embodiments of data processing are discussed throughout this disclosure.

Figure 3:
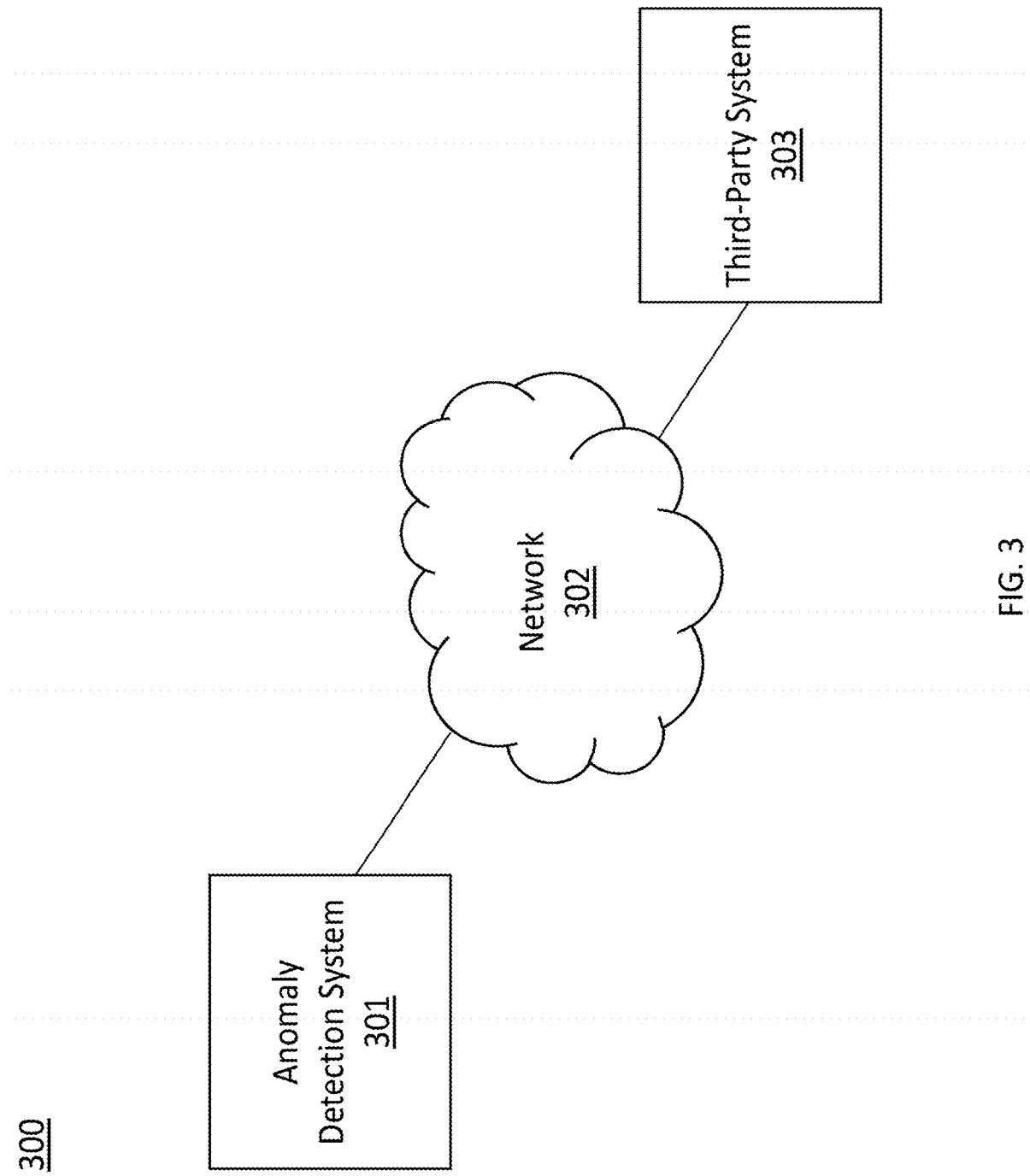
FIG. 3 is a block diagram of a system environment in which an anomaly detection system operates, in accordance with an embodiment.

FIG. 3 is a block diagram of a system environment 300 in which an anomaly detection system 301 operates, in accordance with an embodiment. The system environment 300 shown in FIG. 3 includes the anomaly detection system 301, a network 302, and a third-party system 303. In alternative configurations, different and/or additional components may be included in the system environment 300.

The anomaly detection system 301 and the third-party system 303 are coupled to the network 302 such that the anomaly detection system 301 and the third-party system 303 are in communication with one another via the network 302. The anomaly detection system 301 and/or the third-party system 303 can each comprise a computing system capable of transmitting and/or receiving data via the network 302. For example, the third-party system 303 can transmit data samples and/or instructions for selecting an anomaly detection blueprint for prediction of anomalous data samples to the anomaly detection system 301. Similarly, the anomaly detection system 301 can transmit predictions of anomalous data samples to the third-party system 303. Transmission of data over the network 302 can include transmission of data via the internet, wireless transmission of data, non-wireless transmission of data (e.g., transmission of data via ethernet), or any other form of data transmission. In one embodiment, the anomaly detection system 301 and/or the third-party system 303 can each include (1) one or more conventional computer systems, such as a desktop computers, laptop computers, or servers, and/or (2) one or more virtualized machines or containers, such as cloud-enabled virtual machines or docker images, running on one or more conventional computer systems.

Alternatively, the anomaly detection system 301 and/or the third-party system 303 each can be a device having computer functionality, such as a personal digital assistant (PDA), a mobile telephone, a smartphone, or another suitable device. In further embodiments, the anomaly detection system 301 and/or the third party system 303 can be a non-transitory computer-readable storage medium storing computer program instructions that when executed by a computer processor, cause the computer processor to operate in accordance with the methods discussed throughout this disclosure. In even further embodiments, the anomaly detection system 301 and/or the third-party system 303 can be cloud-hosted computing systems (e.g., computing systems hosted by Amazon Web Services™ (AWS)).

In some embodiments, the third-party system 303 can execute an application allowing the third-party system 303 to interact with the anomaly detection system 301. For example, the third-party system 303 can execute a browser application to enable interaction between the third-party system 303 and the anomaly detection system 301 via the network 302. In another embodiment, the third-party system 303 can interact with the anomaly detection system 301 through an application programming interface (API) running on native operating systems of the third-party system 303, such as IOS® or ANDROID™ in one embodiment, the third-party system 303 can communicate data to the anomaly detection system 301.

The network 302 can comprise any combination of local area and/or wide area networks, using both wired and/or wireless communication systems. In one embodiment, the network 302 uses standard communications technologies and/or protocols. For example, the network 302 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 302 include multiprotocol label switching (MPLS), transmission control protocol/Internet protocol (TCP/IP), hypertext transport protocol (HTTP), simple mail transfer protocol (SMTP), file transfer protocol (FTP), and voice over internet protocol (VoIP). Data exchanged over the network 302 may be represented using any suitable format, such as hypertext markup language (HTML), extensible markup language (XML), or audio. In some embodiments, all or some of the communication links of the network 302 may be encrypted using any suitable technique or techniques.

III. Automated Prediction of Anomalous Data Samples

As discussed above, in some embodiments, anomaly detection blueprints can be automatically selected and/or dynamically constructed to automatically predict anomalous data samples from a plurality of received data samples. Such automation of anomaly detection blueprint selection/construction and subsequent anomalous data sample prediction is beneficial because it reduces of the amount of time and human resources spent in specifying and creating blueprints for anomaly detection, thereby rendering anomaly detection more efficient and less costly. Furthermore, the anomaly detection blueprints can enable anomaly detection systems to quickly respond to changes in data sets, so that new types of anomalies are quickly and reliably detected even as the data sets rapidly evolve. In practice, such rapid adaptation of anomaly detection technology is generally not possible if human intervention in the process of selecting and constructing anomaly detection models is required.

Figure 4:
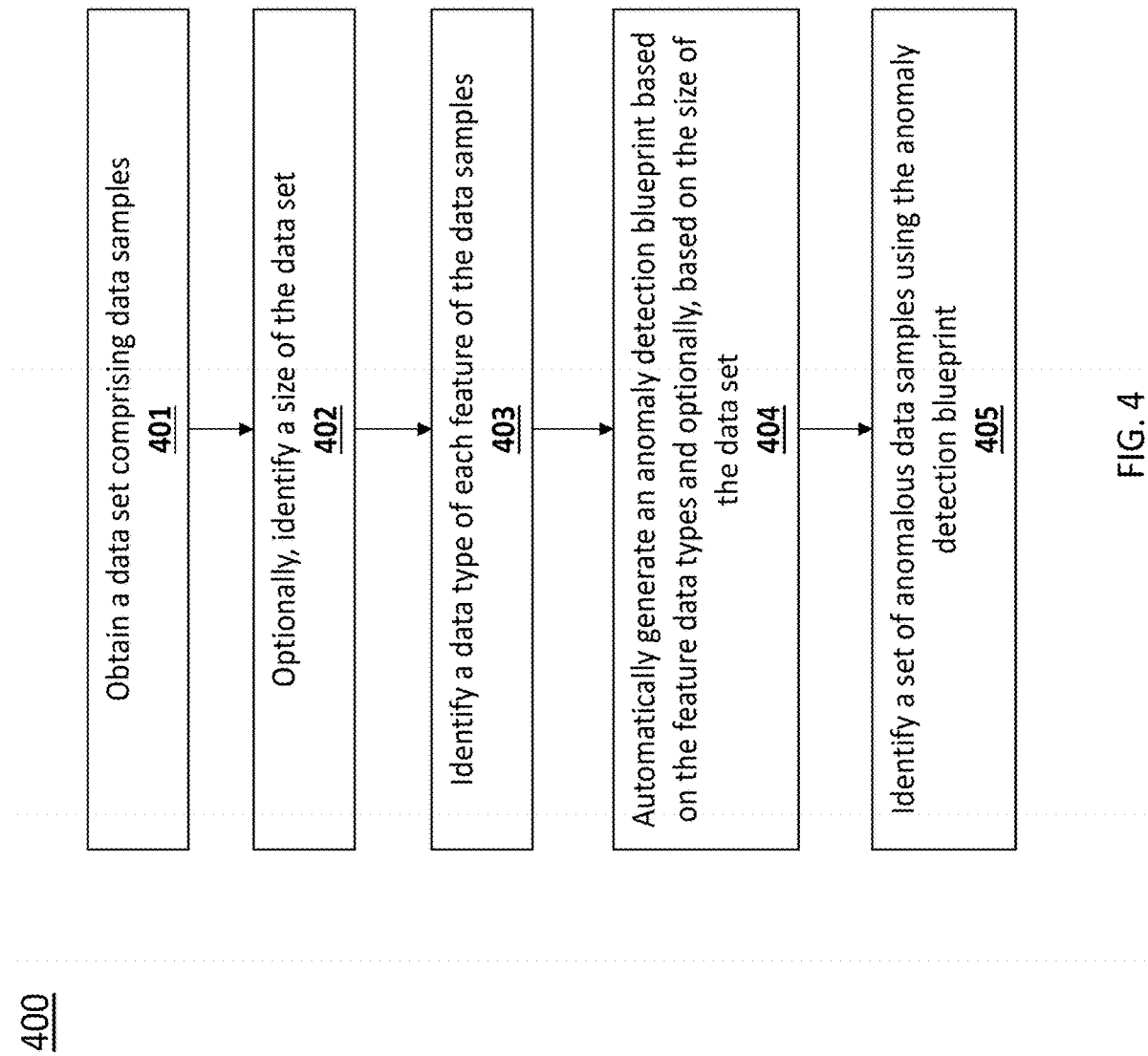
FIG. 4 is a flow chart of a method for automatically predicting anomalous data samples from a plurality of data samples, in accordance with an embodiment.

FIG. 4 is a flow chart of a method 400 for automatically predicting anomalous data samples from a plurality of data samples, in accordance with an embodiment. In other embodiments, the method may include different and/or additional steps than those shown in FIG. 4. Additionally, steps of the method may be performed in different orders than the order described in conjunction with FIG. 4.

As shown in FIG. 4, a data set comprising a plurality of data samples is obtained 401. Each data sample of the plurality of data samples is associated with values for a set of features. Some characteristics of features and feature values are described above.

In some embodiments of the method 400, a size of the obtained data set is identified 402. A size of the data set can be, for example, a number of the data samples in the plurality of data samples and/or a storage size of the data set.

For each feature in the set of features associated with each data sample of the plurality of data samples, a data type of the feature is identified 403. As discussed above, a feature can have a numerical data type, a free text data type, a categorical data type, or any other suitable kind of data type.

An anomaly detection blueprint to predict anomalous data samples from the plurality of data samples received in step 401 is automatically generated 404 based on the data type(s) of one or more of the features of the set of features identified in step 403. In some embodiments, the generation of the anomaly detection blueprint may also be based on the size of the data set. As discussed above, an anomaly detection blueprint comprises a machine-executable module that encodes an anomaly detection procedure. The anomaly detection procedure includes a plurality of tasks. One or more of the tasks may be selected based on the size of the data set and/or the data type of one or more of the features of the set of features.

For instance, in some embodiments in which the data type of a feature of each of the plurality of data samples is identified in step 403 as a numerical data type, the anomaly detection procedure corresponding to the anomaly detection blueprint generated in step 404 may not include a task of performing normalization, standardization, or ridit transformation of the values of the feature having the numerical data type.

In some additional embodiments in which the data type of a feature of each of the plurality of data sample is identified in step 403 as a numerical data type, a value for the feature of one or more of the plurality of data samples may be missing. Specifically, in some embodiments, one or more first data samples of the plurality of data samples can be missing a value for the feature, while one or more second data samples of the plurality of data samples is not missing a value for the feature. In such embodiments, the anomaly detection procedure corresponding to the anomaly detection blueprint generated in step 404 may include a missing value imputation task. The missing value imputation task can include replacing the missing value for the feature for each of the first data samples with a value representative of or otherwise based on the non-missing values of the feature for the second data samples (e.g., the mean or median of the non-missing values).

In some alternative embodiments in which a value for a feature of one or more of the plurality of data samples is missing, the anomaly detection procedure corresponding to the anomaly detection blueprint generated in step 404 can include a feature engineering task of adding a new feature to the set of features, where a value of the new feature for each data sample comprises an indicator of whether the data sample is missing a value for the feature.

In some embodiments, the data samples include labels, and the anomaly detection procedure includes obtaining an anomaly score for each of the plurality of updated data samples. The anomaly score for a data sample indicates a predicted extent to which the data sample is anomalous. The anomaly detection procedure may identify the set of anomalous data samples based on the anomaly scores. Specifically, a set of anomalous data samples comprising a fraction of the plurality of updated data samples having the greatest anomaly scores can be identified. The fraction of the plurality of updated data samples can be the expected outlier fraction discussed above. Then, the extent of any correlation between the anomaly scores and the values of the label may be determined. Responsive to the correlation being less than a threshold correlation, the anomalous data samples can be determined to arise from a data quality issue. As a result, in some embodiments, the set of anomalous data samples may be removed from the plurality of data samples. Alternatively, responsive to the determined correlation being at least the threshold contribution, the factors that contribute to the data samples being characterized as anomalous can be determined to be correlated with the values of the label. As a result, the set of anomalous data samples can be retained in the data set.

In some embodiments in which the data type of a feature of each of the plurality of data samples is identified in step 403 as a categorical data type, the anomaly detection procedure corresponding to the anomaly detection blueprint generated in step 404 can include a feature engineering task of, for each data sample of the plurality of data samples, replacing the value of the feature having the categorical data type with a frequency (e.g., number or rate of occurrences) of the value of the feature in the plurality of data samples. As an example, consider ten data samples, each data sample describing an occurrence of network access. Each data sample is associated with a categorical feature describing receipt of an alert. A value of the alert feature is either 'yes' or 'no.' Eight of the ten data samples have a value of 'yes' for the alert feature, and two of the ten data samples have a value of 'no' for the alert feature. In the embodiment described above, the value of 'yes' for each of the eight samples is replaced with the frequency of occurrence of the 'yes' value—'8'. Similarly, in the embodiment described above, the value of 'no' for each of the two samples is replaced with the frequency of occurrence of the 'no' value—'2'.

In some embodiments, the data type of one or more features of each of the plurality of samples is identified in step 403 as a free text data type. In such embodiments, the anomaly detection procedure corresponding to the anomaly detection blueprint generated in step 404 can include specific tasks to process these one or more free text features of each of the plurality of data samples. These free text feature processing steps are discussed in detail below with regard to FIG. 5.

A set of anomalous data samples is identified 405 using the anomaly detection blueprint generated in step 404. Specifically, the machine-executable module corresponding to the anomaly detection blueprint generated in step 404 is executed, thereby performing the anomaly detection procedure encoded by the machine-executable module. By performing the anomaly detection procedure, the set of anomalous data samples is identified from the plurality of data samples. As discussed above, by automatically generating anomaly detection blueprints to identify anomalous data samples from a plurality of received data samples, anomaly detection can both be more efficient, and require fewer resources.

In some embodiments, the set of anomalous data samples can be identified 405 using an anomaly detection process that is selected from a group of anomaly detection processes based at least in part on a size of the data set as identified in step 402. As mentioned above, a size of the data set can be, for example, a number of the data samples in the plurality of data samples and/or a storage size of the data set.

In some embodiments in which the number of data samples in the data set is identified in step 402 to be less than a first sample number threshold, and the storage size of the data set is identified in step 402 to be less than a storage size threshold, the group of anomaly detection processes can include an isolation forest process, a double median absolute deviance (MAD) process, a one class support vector machine (SVM) process, a local outlier factor (LOF) process, and a Mahalanobis distance process. In such embodiments, the first sample number threshold may be 300,000 data samples, and the storage size threshold may be 500 megabytes.

Alternatively, in some embodiments in which the number of data samples in the data set is identified in step 402 to be greater than or equal to the first sample number threshold and less than a second sample number threshold, and the storage size of the data set is identified in step 402 to be less than the storage size threshold, the group of anomaly detection processes can include a double median absolute deviance (MAD) process and a Mahalanobis distance process. In such embodiments, the first sample number threshold can be 300,000 data samples, the second sample number threshold can be 2 million data samples, and the storage size threshold can be 500 megabytes.

Alternatively, in some embodiments in which the number of data samples in the data set is identified in step 402 to be greater than the first sample number threshold and greater than or equal to the second sample number threshold, or the storage size of the data set is identified in step 402 to be greater than the storage size threshold, the group of anomaly detection processes can include a double median absolute deviance (MAD) process and a Mahalanobis distance process. In such embodiments, the first sample number threshold can be 300,000 data samples, the second sample number threshold can be 2 million data samples, and the storage size threshold can be 500 megabytes. The sample number threshold(s) and/or the storage size threshold may depend on the data storage capacity of the computer system on which the anomaly detection method is implemented. In some embodiments, the sample number thresholds and storage size threshold mentioned above may be suitable for an anomaly detection system having 64 GB of RAM.

In certain embodiments, the anomaly detection blueprint generated in step 404 can include tasks for adapting the data set for use by a supervised anomaly detection model to identify 405 the set of anomalous data samples. Specifically, an anomaly score can be determined for each of the plurality of data samples using an unsupervised anomaly detection process (e.g., an unsupervised anomaly detection model). Then, the anomaly scores can be added to the data set as values of a label of the plurality of data samples, thereby generating a labeled data set. A supervised anomaly detection model can be applied to this labeled data set to identify 405 the set of anomalous data samples.

In another embodiment, the set of anomalous data samples identified in step 405 can be used to train a supervised anomaly detection model to predict future anomalous data samples. Specifically, an anomaly score can be determined for each of the plurality of data samples using an unsupervised anomaly detection process (e.g., an unsupervised anomaly detection model). Then, the set of anomalous data samples is identified 405 as a fraction of the plurality of data samples having greatest anomaly scores. A label is assigned to each of the plurality of data samples based on the identified set of anomalous data samples. The label for a data sample indicates whether the data sample is anomalous. Finally, the labeled data samples are used to train a supervised anomaly detection model to infer whether future data samples are anomalous.

Conversion of unsupervised anomaly detection problems to supervised anomaly detection problems is discussed in greater detail below with regard to FIG. 11.

IV. Anomaly Detection with Multivariate Data

As briefly mentioned above with regard to FIG. 4, in some embodiments in which anomalous data samples are predicted from a plurality of data samples, a data type of one or more features of each of the plurality of data samples is a free text data type. In such embodiments, an anomaly detection procedure corresponding to an anomaly detection blueprint can include specific tasks to process these one or more free text features of each of the plurality of data samples, prior to input of the plurality of data samples into an anomaly detection model for prediction of anomalous data samples.

Figure 5:
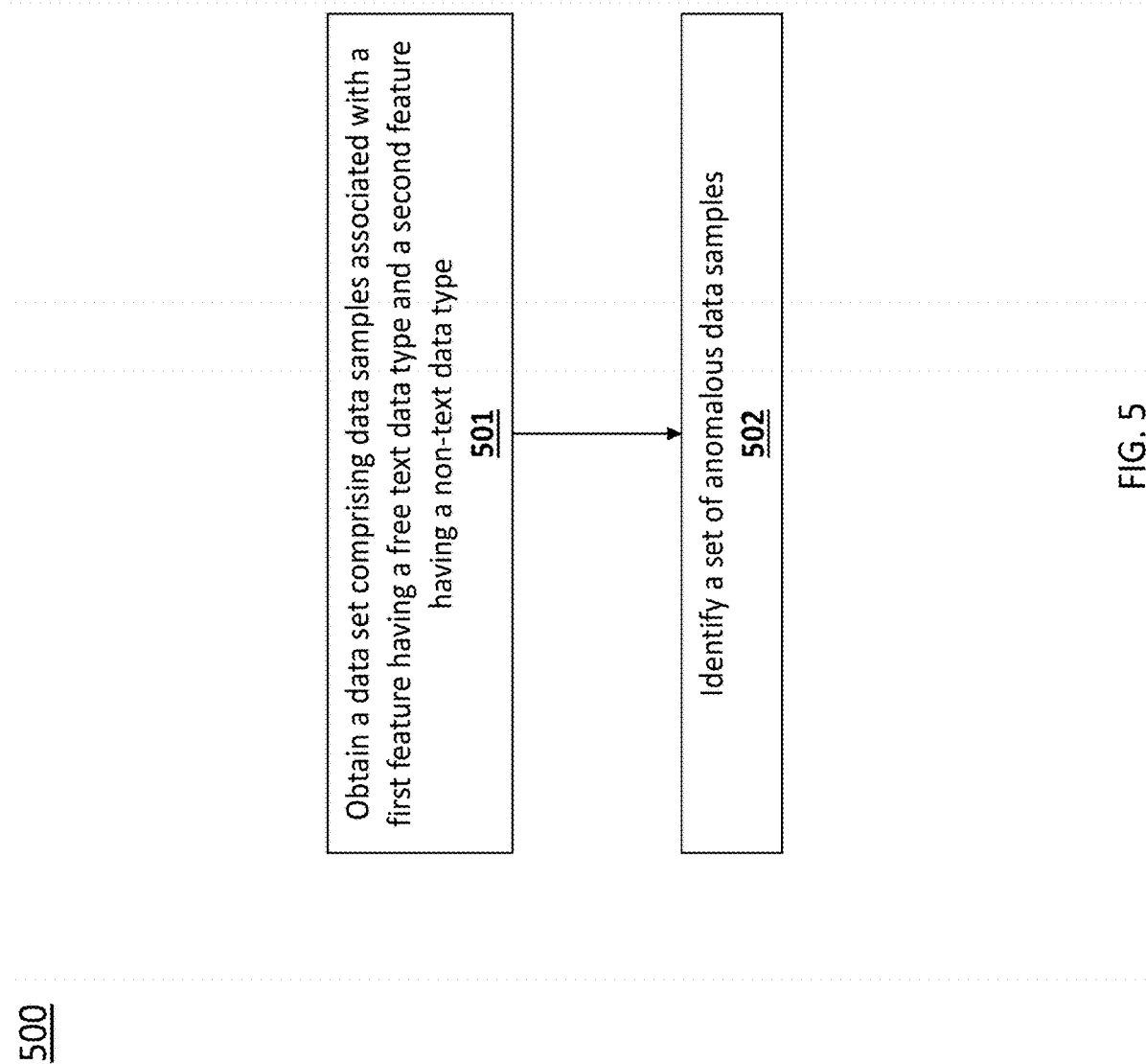
FIG. 5 is a flow chart of a method for predicting anomalous data samples from a plurality of data samples, where each data sample is associated with one or more features having a free text data type and one or more features having a non-text data type, in accordance with an embodiment.

FIG. 5 is a flow chart of a method 500 for predicting anomalous data samples from a plurality of data samples, where each data sample is associated with one or more features having a free text data type and one or more features having a non-text data type, in accordance with an embodiment. In other embodiments, the method may include different and/or additional steps than those shown in FIG. 5. Additionally, steps of the method may be performed in different orders than the order described in conjunction with FIG. 5.

As shown in FIG. 5, a data set comprising a plurality of data samples is obtained 501. Each data sample of the plurality of data samples is associated with values for a set of features. Furthermore, the set of features includes at least one feature having a free text data type and at least one feature having a non-text data type.

In some embodiments, a number of terms that occur most frequently within a combined free text corpus are identified. The combined free text corpus may include values for each feature having the free text data type for the plurality of data samples. Then, a sample-term matrix can be generated. Each row (or column) of the sample-term matrix corresponds to one of the plurality of data samples, and each column (or row) of the sample-term matrix corresponds to one of the identified terms that occur most frequently. Each element of the sample-term matrix indicates whether the term corresponding to the column of the element occurs in the values of the free text features of the data sample corresponding to the row of the element. For example, an element of the sample-term matrix may be a value of '1' to indicate that the term corresponding to the column of the element occurs in the values of the free text features of the data sample corresponding to the row of the element. Alternatively, an element of the sample-term matrix may indicate a number of times (e.g., a frequency) that the term corresponding to the column of the element occurs in the values of the free text features of the data sample corresponding to the row of the element. As another example, an element of the sample-term matrix may comprise a term frequency-inverse sample frequency value for the term corresponding to the column of the element (similar to a term frequency-inverse document frequency (TF-IDF) value, but with each sample's text values collectively treated as a separate "document"). Like the TF-IDF metric, the term frequency-inverse sample frequency (TF-ISF) metric indicates how 'important' a term is to the text of a sample (document) in the sample set. As yet another example, an element of the sample-term matrix may be a value of '0' to indicate that the term corresponding to the column of the element does not occur in the values of the free text features of the data sample corresponding to the row of the element.

In some embodiments, the combined free text corpus can include more than 5,000 unique terms, the number of identified terms that occur most frequently within the combined free text corpus can be 5,000 unique terms, and the sample-term matrix can include 5,000 columns.

Then, in some further embodiments, the features in the set of features having the free text data type can be replaced with an engineered feature. A value of the engineered feature for each of the plurality of data samples can be set to the row of the sample-term matrix corresponding to the data sample. This method of free text data processing may be preferred for high-dimensional and/or sparse data samples, and enables identification of unusual and/or compound (e.g., bigram) text terms.

In alternative embodiments, values of the free text features are not replaced with rows of the sample-term matrix as described above. Rather, in alternative embodiments, a compact matrix can be generated by performing Singular-Value Decomposition (SVD) factorization on the sample-term matrix. In such embodiments, the number of columns in the compact matrix is less than the number of columns in the sample-term matrix. Each row of the compact matrix corresponds to one of the plurality of data samples. Then, the features in the set of features having the free text data type can be replaced with an engineered feature, where a value of the engineered feature for each of the plurality of data samples is set to the row of the compact matrix corresponding to the data sample. By performing SVD factorization to generate a compact matrix, and replacing values for the free text features with rows of the compact matrix, the quantity and complexity of the values of the free text features can be significantly reduced, thereby enabling more efficient anomaly detection.

In some alternative embodiments, a single, combined free text corpus including values for all free text features from each of the plurality of data samples is not generated. Rather, in alternative embodiments, a combined free text corpus is generated for each feature in the set of features having the free text data type. In other words, for each free text feature, a combined free text corpus including values for the free text feature for each of the plurality of data samples may be generated. A number of terms that occur most frequently within the combined free text corpus for each free text feature are identified. Then, a sample-term matrix can be generated for each free text feature, using any of the techniques described above. For a given free text feature, each row of a sample-term matrix corresponds to one of the plurality of data samples, and each column of the sample-term matrix corresponds to one of the identified terms that occur most frequently for the feature. Each element of the sample-term matrix may indicate whether the term corresponding to the column of the element occurs in the value of the free text feature for the data sample corresponding to the row of the element, the frequency with which the term occurs in the value of the free text feature for the data sample, the TF-ISF value for the term with respect to the value of the sample, etc.

In some further embodiments, each feature in the set of features having the free text data type can be replaced with an engineered feature. For a given free text feature, a value of the engineered feature for each of the plurality of data samples can be set to the row of the free text feature's sample-term matrix corresponding to the data sample. As mentioned above, this method of free text data processing may be preferred for high-dimensional and/or sparse data samples, and enables identification of unusual and/or compound (e.g., bigram) text terms.

In alternative embodiments, values of the free text features are not replaced with rows of the sample-term matrices as described above. Rather, in alternative embodiments, for the sample-term matrix corresponding to each free text feature, a compact matrix can be generated by performing Singular-Value Decomposition (SVD) factorization on the sample-term matrix. In such embodiments, the number of columns in the compact matrix is less than the number of columns in the sample-term matrix. Each row of the compact matrix corresponds to one of the plurality of data samples. Then, each free text feature in the set of features can be replaced with an engineered feature, where a value of the engineered feature for each of the plurality of data samples is set to the row of the free text feature's compact matrix corresponding to the data sample. By performing SVD factorization to generate compact matrices, and replacing values for each free text feature with rows of the corresponding compact matrix, the quantity and complexity of the values of the free text features can be significantly reduced, thereby enabling more efficient anomaly detection.

Finally, a set of anomalous data samples are identified 502 based at least in part on the values for the free text features (or the engineered features that replace the free text features) and non-text features for each of the plurality of data samples. In embodiments in which the plurality data samples are input into an anomaly detection model to identify 502 the set of anomalous data samples, the anomaly detection model may perform an anomaly detection process suitable for detecting anomalies in high-dimensional data samples, such as the anomaly detection process performed by the Isolation Forest model. Furthermore, in such embodiments in which the plurality data samples are input into an anomaly detection model to identify 502 the set of anomalous data samples, the anomaly detection model may be an unsupervised anomaly detection model, rather than a supervised anomaly detection model, because unsupervised anomaly detection models have been experimentally determined to more accurately identify anomalous data samples based on high-dimensional matrices, relative to supervised anomaly detection models.

As discussed in further detail below with regard to FIG. 11, in some embodiments, the method 500 can include additional steps to adapt the plurality of data samples for use by a supervised anomaly detection model to identify 502 the set of anomalous data samples, or to adapt the plurality of data samples to train a supervised anomaly detection model to predict future anomalous data samples.

Specifically, in some embodiments, to adapt the plurality of data samples for use by a supervised anomaly detection model to identify 502 the set of anomalous data samples, an anomaly score can be determined for each of the plurality of data samples using an unsupervised anomaly detection process (e.g., an unsupervised anomaly detection model). As discussed throughout this disclosure, an anomaly score for a data sample indicates an extent to which the data sample is anomalous. These determined anomaly scores can then be added to the data set as values of a label of the plurality of data samples, thereby generating a labeled data set. A supervised anomaly detection model can be applied to the labeled data set to identify 502 the set of anomalous data samples.

In alternative embodiments, the plurality of data samples can be converted to train a supervised anomaly detection model to predict future anomalous data samples. Specifically, an anomaly score can be determined for each of the plurality of data samples using an unsupervised anomaly detection process (e.g., an unsupervised anomaly detection model). The set of anomalous data samples can then be identified 502 as a fraction of the plurality of data samples having the greatest anomaly scores. This fraction can comprise an expected outlier fraction. In some further embodiments, a label can be assigned to each of the plurality of data samples based on the identified set of anomalous data samples, where the label for a given data sample is an indication of anomalousness of the data sample. Thus, data samples in the set of anomalous data samples are labeled as anomalous, while data samples not in the set of anomalous data samples are labeled as non-anomalous. Then, a supervised anomaly detection model can be trained to predict future anomalous data samples using each of the plurality of data samples and the associated label.

V. Blending Anomaly Detection Blueprints

As discussed in detail above with regard to FIG. 4, an anomaly detection blueprint can be used to predict anomalous data samples from a plurality of data samples. In certain further embodiments, multiple different anomaly detection blueprints can be used to predict anomalous data samples from a plurality of data samples. The anomalousness predictions determined by the multiple different anomaly detection blueprints can be used to predict anomalous data samples from the plurality of data samples. In other words, the predictions of multiple different anomaly detection blueprints can be "blended" to predict anomalous data samples from the plurality of data samples.

Using multiple different anomaly detection blueprints to predict anomalous data samples can be advantageous because anomaly detection blueprints can vary in ability to accurately predict anomalous data samples across different circumstances. For example, one anomaly detection blueprint may be able to accurately predict one type of anomaly (e.g., network access anomalies), while another anomaly detection blueprint may be able to accurately predict another type of anomaly (e.g., fraudulent credit card purchases). As another example, one anomaly detection blueprint may be able to predict a given type of anomaly with high specificity, while another anomaly detection blueprint may be able to predict a given type of anomaly with high sensitivity. However, it is often difficult, or even impossible, to determine which anomaly detection blueprint will be able to most accurately predict anomalous data samples for a particular plurality of data samples. Therefore, multiple different anomaly detection blueprints can be used to generate predictions, and these predictions can be compared and/or combined to enable more accurate prediction of anomalous data samples.

Furthermore, a desired level of anomaly detection rigor can vary across different circumstances. For example, when predicting anomalous data samples under circumstances in which security is a high priority (e.g., when predicting anomalous data samples describing unauthorized network intrusions), it may be desirable to employ a high level of anomaly detection rigor to predict anomalous data samples. In other words, it may be desirable to flag more, rather than fewer, data samples as anomalous to avoid missing detection of any anomalous data samples. On the other hand, when predicting anomalous data samples under circumstances in which security is not a high priority, it may be desirable to employ a lower level of anomaly detection rigor to predict anomalous data samples. In other words, it may be desirable to flag fewer, rather than more, data samples as anomalous to avoid flagging many false positive anomalies. For example, when predicting anomalous data samples describing fraudulent credit card purchases, it may be desirable to employ a low level of anomaly detection rigor to avoid flagging false positives, thereby avoiding unnecessary credit card suspension and unhappy customers. As discussed in detail below, by using multiple anomaly detection blueprints to predict anomalous data samples, a level of anomaly detection rigor can be controlled and adjusted according to the circumstance and/or the user's preference.

Figure 6:
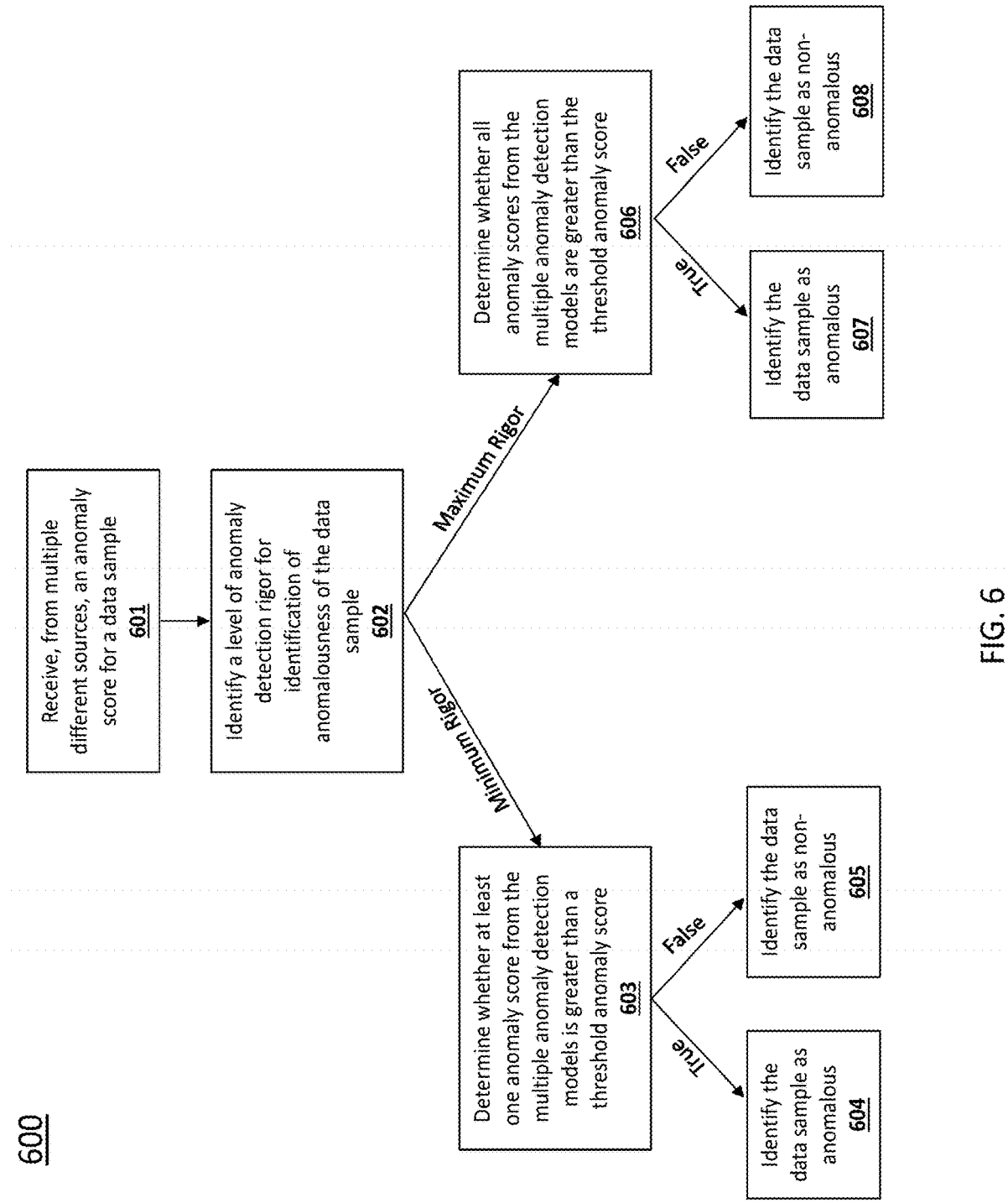
FIG. 6 is a flow chart of a method for predicting anomalous data samples from a plurality of data samples, using multiple different sources, in accordance with an embodiment.

FIG. 6 is a flow chart of a method 600 for predicting anomalous data samples from a plurality of data samples, using multiple different anomaly detection sources, in accordance with an embodiment. In other embodiments, the method may include different and/or additional steps than those shown in FIG. 6. Additionally, steps of the method may be performed in different orders than the order described in conjunction with FIG. 6.

As shown in FIG. 6, anomaly scores for a data sample are obtained 601 from multiple different sources. The multiple different sources that provide the anomaly scores can include, for example, any quantity and any type of anomaly detection blueprints, anomaly detection processes, and/or anomaly detection models.

A level of anomaly detection rigor for identification of anomalousness of the data sample is identified 602. In some embodiments, the level of anomaly detection rigor can be specified by a user. In alternative embodiments, the level of anomaly detection rigor can be automatically determined by the anomaly detection system.

In the embodiment depicted in FIG. 6, the level of anomaly detection rigor that is identified 602 is either maximum rigor or minimum rigor. As described in further detail below, maximum anomaly detection rigor sets a higher threshold for identifying anomalous data samples than minimum anomaly detection rigor. However, while the embodiment depicted in FIG. 6 identifies 602 either maximum anomaly detection rigor or minimum anomaly detection rigor, in alternative embodiments, a level of medium anomaly detection rigor can also be identified in step 602. Medium anomaly detection rigor sets a lower threshold for identifying anomalous data samples than maximum anomaly detection rigor, but sets a higher threshold for identifying anomalous data samples than minimum anomaly detection rigor. Furthermore, while the embodiment depicted in FIG. 6 identifies 602 a single level of anomaly detection rigor, in alternative embodiments, multiple levels of anomaly detection rigor may be selected, and the resulting anomalous data samples identified according to the multiple levels of anomaly detection rigor can be compared.

Turning back to FIG. 6, in embodiments in which minimum anomaly detection rigor is identified 602 as the level of anomaly detection rigor for identification of anomalousness of the data samples, the method 600 further includes determining 603 whether at least one of the anomaly scores obtained from the multiple different sources is greater than a threshold anomaly score. The threshold anomaly score can be determined by a user and/or by the anomaly detection system. Responsive to determining that at least one anomaly score from the multiple different sources is greater than the threshold anomaly score, the data sample may be identified 604 as anomalous. Conversely, responsive to determining that none of the anomaly scores from the multiple different sources are greater than the threshold anomaly score, the data sample may be identified 605 as non-anomalous.

In embodiments in which maximum anomaly detection rigor is identified 602 as the level anomaly detection rigor for identification of anomalousness of the data samples, the method 600 further includes determining 606 whether all anomaly scores obtained from the multiple different sources are greater than the threshold anomaly score. Responsive to determining that at least one anomaly from the multiple different sources is less than the threshold anomaly score, the data sample may be identified 607 as non-anomalous. Conversely, responsive to determining that all the anomaly scores from the multiple different sources are greater than the threshold anomaly score, the data sample may be identified 608 as anomalous.

As discussed above, although not depicted in FIG. 6, in some embodiments, a level of medium anomaly detection rigor can also be identified in step 602. In such embodiments in which a medium anomaly detection rigor is identified 602 as the level of anomaly detection rigor for identification of anomalousness of the data sample, the method 600 can further include determining whether a mean anomaly score of all anomaly scores from the multiple different sources is greater than the threshold anomaly score. Responsive to determining that the mean anomaly score is greater than the threshold anomaly score, the data sample can be identified as anomalous. Conversely, responsive to determining that the mean anomaly score is less than the threshold anomaly score, the data sample can be identified as non-anomalous.

In another embodiment in which a medium anomaly detection rigor is identified 602 as the level of anomaly detection rigor for identification of anomalousness of the data sample, the method 600 can further include determining whether a majority of the anomaly scores from the multiple different sources are greater than the threshold anomaly score. Responsive to determining that the majority of the anomaly scores are greater than the threshold anomaly score, the data sample can be identified as anomalous. Conversely, responsive to determining that the majority of the anomaly scores are less than the threshold anomaly score, the data sample can be identified as non-anomalous.

FIG. 7 depicts an image 700 of an input/output interface of an anomaly detection system, in accordance with an embodiment. In the image 700 depicted in FIG. 7, the input/output interface has received a selection of a "mean blend type" for an anomaly detection blender. In other words, the input/output interface has received a selection of a medium level of anomaly detection rigor from a user for anomalous data sample prediction by multiple different sources. In alternative embodiments, the user may alternatively or additionally select a maximum and/or a minimum level of anomaly detection rigor.

VI. Anomaly Detection Feature Impact

In some embodiments, following identification of anomalous data samples, it may be useful to provide an explanation as to why a particular data sample is flagged as an anomaly. Specifically, it may be useful to identify which values of which features of a data sample impact identification of the data sample as anomalous. In other words, it may be useful to identify which feature values of a data sample contribute to (e.g., contribute most to) identification of the data sample as anomalous.

Identification of feature impact on anomaly detection is advantageous because such insights can be used to inform the creation and optimization of business rules, which can be used to direct future anomaly identification and proactive anomaly response. Such business rules are discussed in further detail below. Identification of feature impact on anomaly detection can also be used to identify and account for data drift across data samples, thereby avoiding inaccurate anomaly detection. Data drift is also discussed in further detail below.

Figure 8:
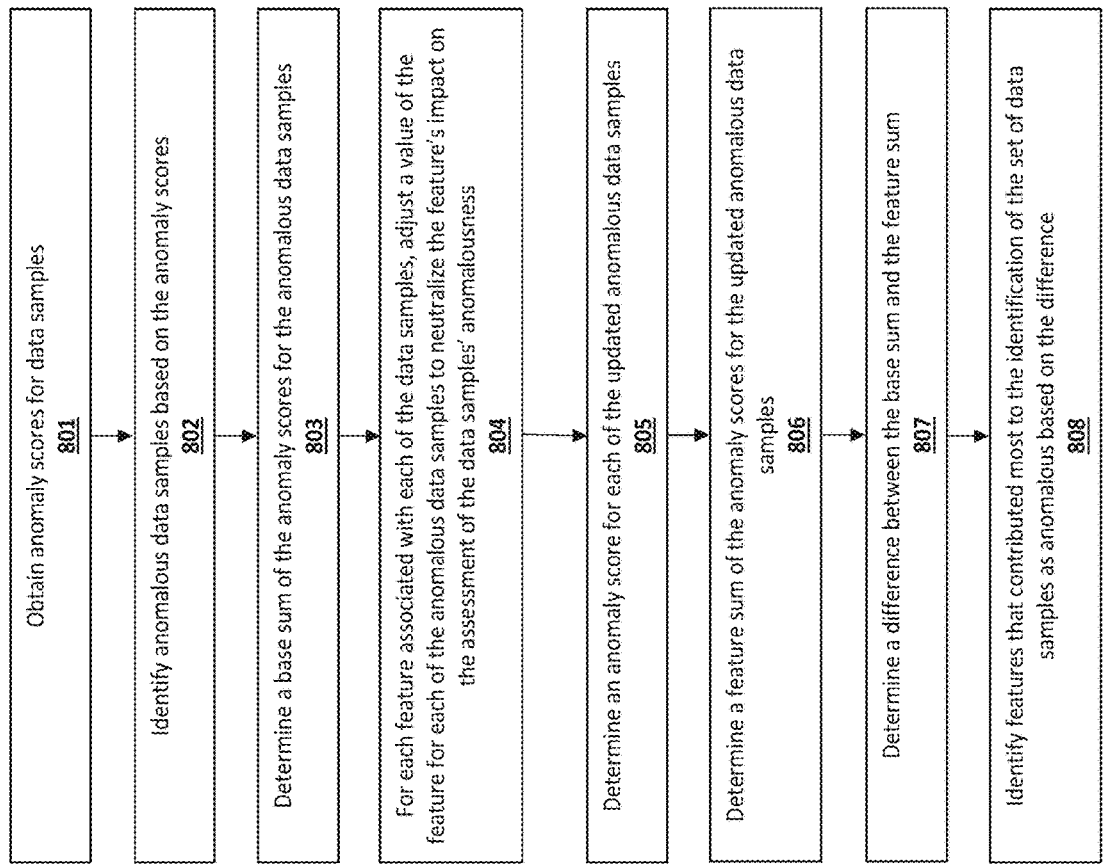
FIG. 8 is a flow chart of a method for identifying features of data samples that contribute most to identification of the data samples as anomalous, in accordance with an embodiment.

FIG. 8 is a flow chart of a method 800 for identifying features of data samples that contribute to identification of the data samples as anomalous, in accordance with an embodiment. In other embodiments, the method may include different and/or additional steps than those shown in FIG. 8. Additionally, steps of the method may be performed in different orders than the order described in conjunction with FIG. 8.

As shown in FIG. 8, an anomaly score for each of a plurality of data samples is obtained 801. Each of the plurality of data samples is associated with values for a set of features. An anomaly score for a data sample indicates an extent to which the data sample is anomalous.

In some embodiments, obtaining 801 an anomaly score for each of a plurality of data samples includes receiving the anomaly score for each of the plurality of data samples from an anomaly detection model. In such embodiments, the anomaly detection model can be a supervised model or an unsupervised model. Unlike conventional techniques for assessing feature importance (e.g., Permutation Importance), feature impact can be determined for an unsupervised anomaly detection model because labels are not necessary to determine feature impact using the method 800.

A set of anomalous data samples is identified 802 from the plurality of data samples based on the obtained anomaly scores. In certain embodiments, the set of anomalous data samples is identified as a fraction of the plurality of data samples having the most extreme (e.g., greatest) anomaly scores. This fraction can comprise an expected outlier fraction. In some embodiments, the expected outlier fraction can be 10%.

A sum of the anomaly scores is determined 803 for the set of anomalous data samples. This determined sum may be referred to herein as a "base sum."

For each feature in the set of features, a value of the feature for each of the anomalous data samples is adjusted 804 to neutralize the feature's impact on the assessment of the sample's anomalousness. A feature value's impact on the assessment of a data sample's anomalousness may be neutralized using any suitable technique, including but not limited to replacing the feature value with a constant value. This adjustment generates updated anomalous data samples. The constant value can be any value. In some embodiments, the constant value can be a missing value (e.g., no value). By making the values of the feature constant across the anomalous data samples, the contribution of the feature to the identification of the data samples as anomalous can be determined as described below.

In some embodiments, the method 800 includes a further step of determining the constant value to replace the values of the feature for each of the anomalous data samples in step 804. In such embodiments, the constant value is determined based on the values of the feature for the anomalous data samples that the constant value is to replace. Specifically, in some embodiments, to determine the constant value, a data type of the feature is determined.

The constant value used to neutralize a feature may be selected in any suitable way. For example, responsive to determining that the data type of the feature is numerical, the value of the feature for each of the anomalous data samples may be replaced 805 with a mean or median of the values of the feature for the anomalous data samples. As an example, consider five anomalous data samples, each data sample associated with a numerical feature describing a cost of a transaction. Values of the numerical cost feature for the five anomalous data samples are $4, $10, $23, $56, and $100. In the embodiment described above, the value of the feature for each of the five anomalous data samples is replaced with $23, a median of the values of the feature for the five anomalous data samples.

On the other hand, responsive to determining that the data type of the feature is categorical or free text, the value of the feature for each of the anomalous data samples is replaced 806 with the value of the feature occurring at the highest frequency in the anomalous data samples. As an example, consider five anomalous data samples, each data sample associated with a free text feature describing a location of a transaction. Values of the categorical location feature for the five anomalous data samples are "gas station", "retail store", "gas station", "gas station", and "airline". In the embodiment described above, the value of the feature for each of the five anomalous data samples is replaced with "gas station", the value of the feature occurring at the highest frequency in the anomalous data samples.

Turning back to FIG. 8, an anomaly score is determined 805 for each of the updated anomalous data samples. Specifically, an anomaly score is determined 805 for each of the updated anomalous data samples having the neutralized value for the feature. In embodiments in which the anomaly scores obtained in step 801 are received from an anomaly detection model, the anomaly scores determined in step 805 can also be determined by the same anomaly detection model.

A sum of the anomaly scores for the updated anomalous data samples is determined 806. The determined sum may be referred to herein as a "feature sum."

A difference between the base sum and the feature sum is determined 807. This determined difference between the base sum and the feature sum represents a contribution of the values of the feature to the identification of the set of data samples as anomalous. A greater difference between the base sum and the feature sum represents a greater contribution.

While not depicted in the method 800 of FIG. 8, in some embodiments, a normalized difference between the base sum and the feature sum is determined. In some embodiments, this normalized difference may be determined by performing a min/max normalization of the difference determined in step 807.

Steps 804-807 described above may be performed for each feature in the set of features. In other words, a difference representing a contribution of each feature to the identification of the set of data samples as anomalous may be determined.

Based on the difference determined in step 807 for each feature, one or more features that contribute most to the identification of the set of data samples as anomalous are identified 808. Alternatively, in embodiments in which a normalized difference is determined for each feature as described above, one or more features that contribute most to the identification of the set of data samples as anomalous can be identified based on these normalized differences.

In some further embodiments, the method 800 can further include ranking the features in the set of features based on the difference determined for each feature in step 807, or alternatively based on the normalized difference determined for each feature. By ranking the features based on the normalized difference determined for each feature, the contributions of the features to the identification of the set of data samples as anomalous can be compared as ranked percentages. A higher ranking of a feature indicates a greater contribution of the feature to the identification of the set of data samples as anomalous.

Figure 9:
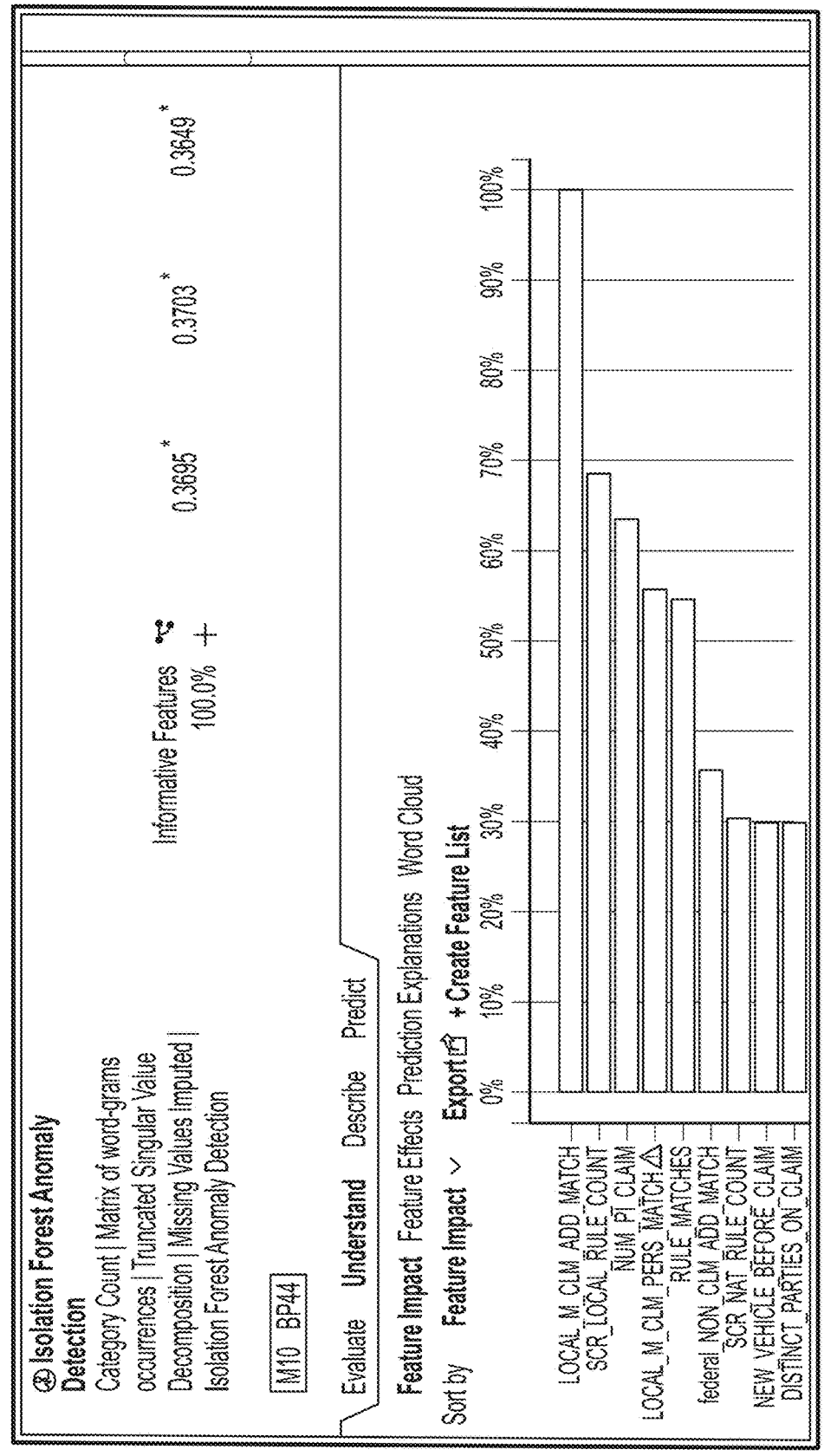
FIG. 9 depicts an image of an input/output interface of an anomaly detection system, in accordance with an embodiment.

FIG. 9 depicts an image 900 of an input/output interface of an anomaly detection system, in accordance with an embodiment. The input/output interface in the image 900 depicts a bar graph ranking features in order of contribution to identification of anomalous data samples by an anomaly detection model. In the embodiment depicted in FIG. 9, the anomaly detection model at least in part comprises an Isolation Forest model.

Figure 10:
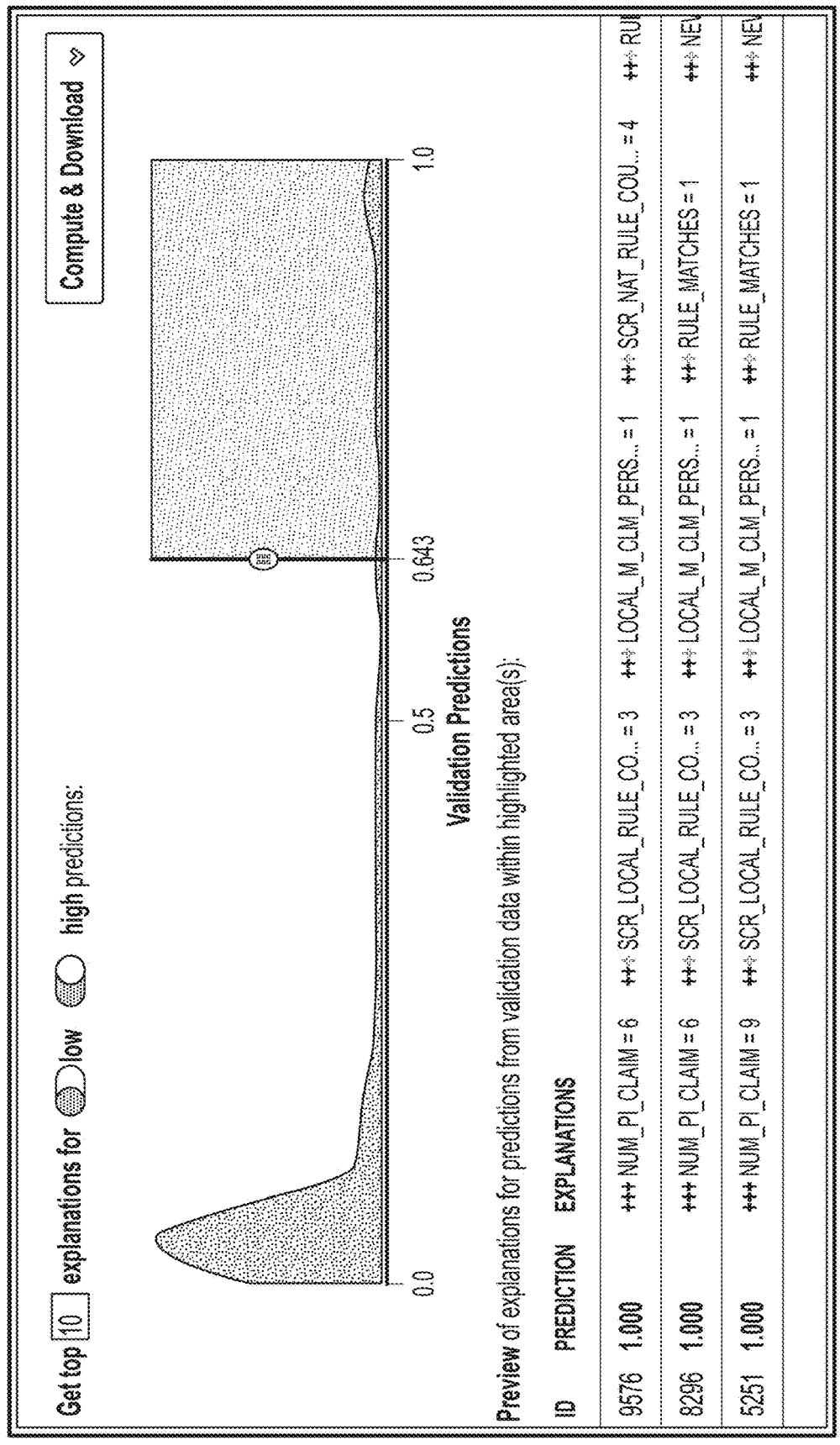
FIG. 10 depicts an image of an input/output interface of an anomaly detection system, in accordance with an embodiment.

FIG. 10 depicts an image 1000 of an input/output interface of an anomaly detection system, in accordance with an embodiment. The input/output interface in the image 1000 depicts explanations for identification of data samples as anomalous. In the embodiment depicted in FIG. 10, the explanations for identification of the data samples as anomalous include identifications of features of the data samples that have been determined to contribute to the identification of the data samples as anomalous.

As discussed in detail above, the method 800 of FIG. 8 can be used to determine the impact of features on anomaly detection. However, the method 800 can also be similarly used to determine the impact of features on any type of predictions made by any machine learning model, including both supervised and unsupervised machine learning models.

VI.A. Data Drift

In many predictive modeling applications, natural data drift can occur within a data set over time. As used herein, data drift refers to changes in the properties of a data set over time. As an example, consider a plurality of data samples describing credit card transactions made by a user over time. Data drift can occur across these data samples as the user increases the average amount spent on each transaction over time.

Despite the benignity of natural data drift, when an anomaly detection model does not account for this data drift, the anomaly detection model can incorrectly identify data samples exhibiting the data drift as anomalous. For instance, in the above example, if an anomaly detection model does not adapt to take into account the increase in average transaction amount over time, the anomaly detection model may incorrectly identify the data samples having increased transaction amounts as anomalous data samples representing fraudulent transactions.

To avoid inaccurate identification of anomalous data samples by an anomaly detection model, data drift can be identified, and the anomaly identification model can be updated to take this identified data drift into account when predicting future anomalous data samples. In other words, the anomaly detection model can be updated to consider new norms when predicting future anomalous data samples. For instance, in the above example, the anomaly detection model can be updated to consider the recent increases in transaction amounts when predicting future anomalous data samples. By taking this data drift into account, the anomaly detection model can avoid flagging benign future transactions having similarly increased transaction amounts as anomalous. In other words, by taking this data drift into account, the anomaly detection model can avoid flagging false positive anomalies. In other examples, taking data draft into account can enable an anomaly detection model to avoid false negative data samples (e.g., to avoid failing to identify true anomalous data samples).

To identify data drift across a plurality of data samples, a change in the feature impact of one or more features on anomaly detection over time can be determined. To determine a change in feature impact on anomaly detection over time, initially, a change in the quantity (or rate) of anomalies identified over time can be determined. If the change in quantity (or rate) of anomalies identified over time surpasses a threshold change, it can be determined that the features and/or the values of the features that contribute to the identification of data samples as anomalous have changed, and accordingly that the anomaly detection model should be updated to take this change in contribution into account when predicting future anomalous data samples.

To identify data drift between the plurality of data samples discussed above with regard to the method 800 of FIG. 8 and a second plurality of data samples, the method 800 can include the additional steps. For clarity, assume that the plurality of data samples discussed above with regard to the method 800 of FIG. 8 comprises a first plurality of data samples associated with a first time point, that the set of anomalous data samples comprises a first set of anomalous data samples, and that the anomaly scores for the first plurality of data samples are first anomaly scores. Furthermore, assume that the second plurality of data samples is associated with a second time point after the first time point. Each data sample of the first plurality of data samples and the second plurality of data samples is associated with values for the same set of features. The first plurality of data samples and the second plurality of data samples can be associated with the same entity or with different entities. As an example in which the first plurality of data samples and the second plurality of data samples are associated with the same entity, each data sample in both the first plurality of data samples and the second plurality of data samples can be associated with a particular user (e.g., a particular customer ID).

To identify data drift between the first plurality of data samples from the first time point and the second plurality of data samples from the second time point, the method 800 can further include obtaining a second anomaly score for each of the second plurality of data samples. In embodiments in which the first anomaly scores were received from an anomaly detection model in step 801, the second anomaly scores are also received from the same anomaly detection model.

Then, similar to step 802 above, a second set of anomalous data samples can be identified from the second plurality of data samples based on the received second anomaly scores. In some embodiments, the second set of anomalous data samples can be identified as a fraction of the second plurality of data samples having the greatest second anomaly scores. As described above, this fraction can comprise an expected outlier fraction. In some embodiments, the expected outlier fraction can be 10%.

A first quantity of data samples of the first set of anomalous data samples having first anomaly scores greater than a threshold anomaly score is determined. Additionally, a second quantity of data samples of the second set of anomalous data samples having second anomaly scores greater than the threshold anomaly score is determined. Then a difference between the first quantity of data samples and the second quantity of data samples is determined. In other words, a change in the quantity of anomalies identified between the first time point and the second time point is determined.

Responsive to an absolute value of the quantity difference being greater than a threshold difference, one or more actions associated with updating an anomaly detection model from which the first and second anomaly scores were obtained are performed. In some embodiments, the one or more actions can include determining that the features and/or the values of the features identified as contributing to the identification of data samples as anomalous in step 808 have changed between the first and second time points. In additional embodiments, the one or more actions can include providing a message to a user of the anomaly detection model, recommending that the anomaly detection model be updated. In additional embodiments, the one or more actions can include generating a new anomaly detection model based on the second plurality of data samples associated with the second time point. By generating the new anomaly detection model based on the second plurality of data samples, the new anomaly detection model can learn updated features that contribute to the identification of data samples as anomalous. By updating the anomaly detection model, the anomaly detection model can reduce (or avoid) flagging false positive anomalies or mistakenly identifying data samples as non-anomalous.

VI.B. Business Rules

As mentioned above with regard to FIG. 8, features determined to contribute most to the identification of data samples as anomalous can be used to inform the creation and optimization of business rules, which can be used to direct future anomaly identification and proactive anomaly response. Business rules can be identified automatically by the anomaly detection system and/or by a user based on the features identified as contributing most to the identification of anomalous data samples. For example, identification of features contributing most to the identification of unauthorized or threatening network access can be used to inform strategies for improving network firewalls and virus sensors to prevent future intrusions. As another example, identification of features contributing most to the identification of system malfunctioning can be used to determine which parts of the system require repair, thereby reducing system downtime and associated monetary losses. As yet another example, identification of features contributing most to the identification of system malfunctioning can be used to determine under which conditions the system malfunctions, thereby enabling avoidance of such conditions and future occurrences of malfunction.

VII. Conversion of Unsupervised Anomaly Detection to Supervised Machine Learning In some embodiments, unsupervised anomaly detection can be used to convert a data set for supervised machine learning. Specifically, an unsupervised anomaly detection model can be used to convert a plurality of data samples to train a supervised machine learning model or to be used by a supervised machine learning model to generate predictions.

Figure 11:
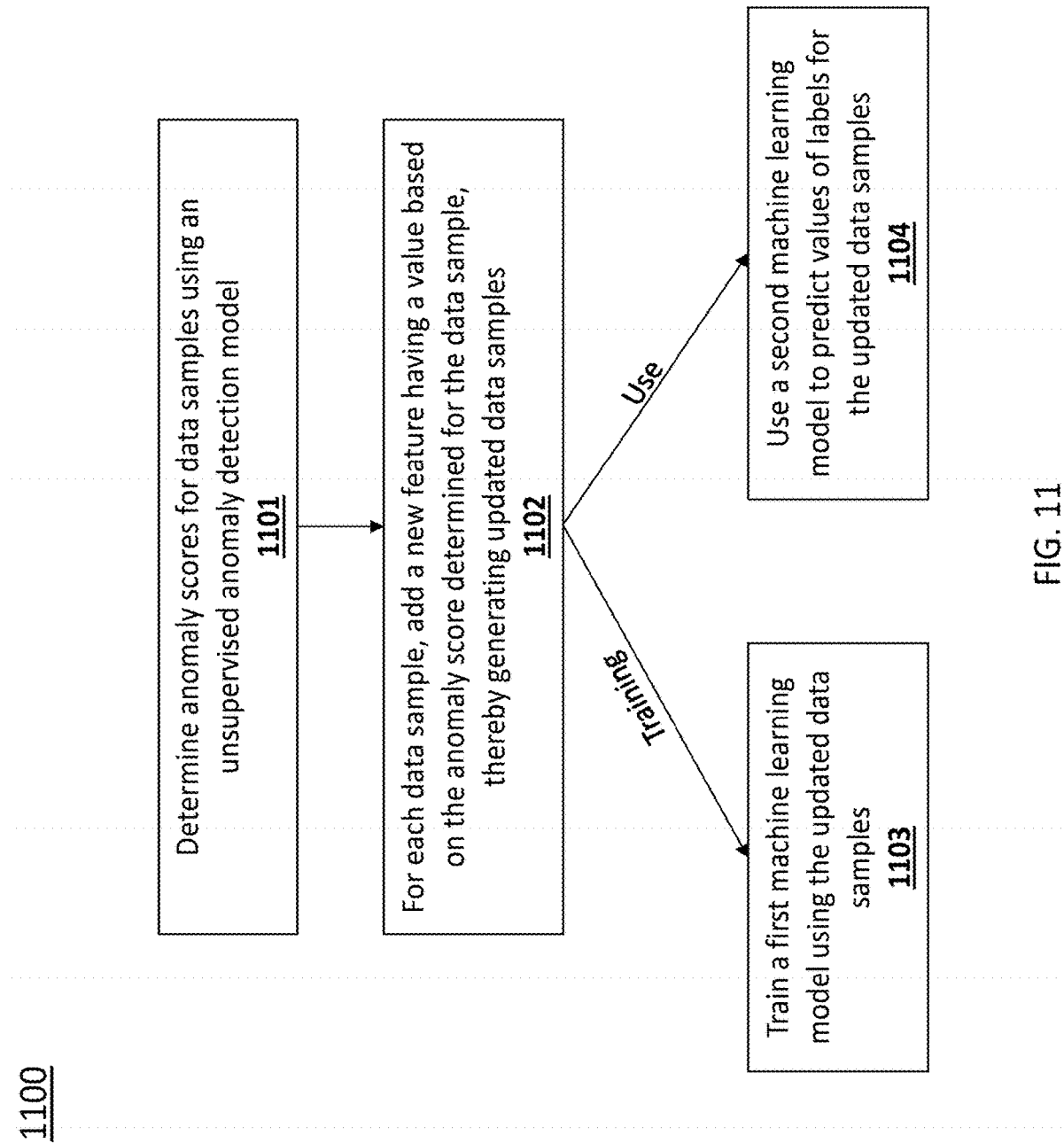
FIG. 11 is a flow chart of a method for generating a data set for a supervised anomaly detection model, in accordance with an embodiment.

FIG. 11 is a flow chart of a method 1100 for generating a data set for a supervised machine learning model, in accordance with an embodiment. In other embodiments, the method may include different and/or additional steps than those shown in FIG. 11. Additionally, steps of the method may be performed in different orders than the order described in conjunction with FIG. 11.

An anomaly score for each data sample of the plurality of data samples is determined 1101 using an unsupervised anomaly detection model. Each of the plurality of data samples is associated with values for a set of features. An anomaly score for a data sample indicates a predicted extent to which the data sample is anomalous.

A new feature is added 1102 to the set of features for each of the plurality of data samples, thereby generating an updated plurality of data samples. A value of the new feature for a data sample is based on the anomaly score determined for the data sample in step 1101. For example, in some embodiments, a value of the new feature for a data sample is the anomaly score determined for the data sample in step 1101.

Then, a machine learning model is applied to the updated plurality of data samples either to train 1103 the machine learning model using the updated plurality of data samples, or to use 1104 the machine learning model to generate predictions based on the updated plurality of data samples.

In some embodiments, the machine learning model can be an anomaly detection model configured to predict anomalous data samples. In alternative embodiments, the machine learning model can be configured to make any other type of prediction.

In embodiments in which a machine learning model is trained 1103 using the updated plurality of data samples, each of the updated plurality of data samples is further associated with a value of a label that indicates a known classification of the data sample. The classification of the data sample that is indicated by the value of the label may or may not be anomalousness of the data sample. For example, in some embodiments, the classification of the data sample that is indicated by the value of the label may be a classification of the data sample other than anomalousness of the data sample. The machine learning model is trained using a supervised machine learning process using the updated plurality of data samples as training and/or validation data. Specifically, the machine learning model is trained to predict a value of the label for each of another updated plurality of data samples, based on the values of the set of features for each of the other updated plurality of data samples.

Alternatively, a machine learning model can be used 1104 to predict a value of a label for each of the updated plurality of data samples. As mentioned above, a value of the label for a data sample may indicate a known classification of the data sample or a known value of an output variable of the data sample. The classification of the data sample that is indicated by the value of the label may or may not be anomalousness of the data sample. For example, in some embodiments, the classification of the data sample that is indicated by the value of the label may be a classification of the data sample other than anomalousness of the data sample. In such embodiments, the machine learning model may have been previously trained according to a supervised machine learning process, such as that discussed above with regard to step 1103.

In alternative embodiments not depicted in FIG. 11, rather than adding the new feature to the set of features for each of the plurality of data samples as in step 1102, a value of a label can be determined for each of the plurality of data samples based on the anomaly scores determined in step 1101. In such embodiments, a value of a label for a data sample indicates an anomalousness of the data sample. Then, a supervised anomaly detection model can be trained to predict anomalousness of future data samples using the plurality of data samples and the determined label values. In other words, the supervised anomaly detection model is trained according to a supervised machine learning process using the plurality of data samples and the associated label values.

By including anomaly scores (or classifications) as new features or labels of data samples used by machine learning models, any potential negative impact of anomalies on the accuracy of the predictions generated by the machine learning models can be reduced.

Examples have been described in which anomaly scores and/or anomaly classifications determined by an unsupervised model are added to a data set as features, and a predictive model (e.g., a supervised predictive model) is trained to predict the value of a categorical output variable based on the values of the data set's features. Some embodiments are not limited to training predictive models to predict the values of categorical output variables. In some embodiments, the predictive models may be trained to predict the values of other types of output variables (e.g., numeric output variables).

Examples have been described in which anomaly scores determined by an unsupervised model are added to a data set as features. In some embodiments, the anomaly scores may be added to a data set as output variables, and a predictive model (e.g., a supervised predictive model) may be trained to predict the anomaly scores for data samples based on the features of the data set.

VIII. Refinement of Supervised Machine Learning Model Training Datasets

In some embodiments, in addition to converting a plurality of data samples to train a supervised machine learning model as described above, a plurality of data samples used to train a supervised machine learning model can be refined to train the supervised machine learning model to generate more accurate predictions. Specifically, a training dataset that is used to train a supervised machine learning model can be refined to exclude anomalous data samples lacking at least a threshold level of correlation with values of a label of the training dataset. As discussed above, the value of a label for a data sample may indicate a known classification of the data sample or a known value of an output variable of the data sample. In some embodiments, the label value can be an indication of anomalousness. In alternative embodiments, the label value can be an indication of a classification other than anomalousness. By refining the training dataset of a supervised machine learning model to exclude anomalous training data samples lacking at least a threshold level of correlation with values of a label, any potential negative impact of irrelevant anomalies on the accuracy of future predictions generated by the supervised machine learning models can be reduced or prevented.

As an example, consider a supervised machine learning model being trained to predict whether a passenger survived the sinking of the Titanic. Each of a plurality of training data samples used to train the model describes a passenger of the Titanic, and includes a value of a label indicating whether the passenger survived the sinking.

Assume that an unsupervised anomaly detection model identifies a set of anomalous training data samples from the plurality of training data samples as training data samples describing passengers having first class tickets. As is well known, many of the Titanic passengers having first class tickets survived the sinking. Therefore, many of the values of the label for the set of anomalous training data samples indicate survival. Thus, the set of anomalous training data samples can be determined to be correlated with the value of the label being survival. As a result, the set of anomalous training data samples can be used to train the supervised machine learning model to accurately predict survival of additional Titanic passengers. Therefore, the set of anomalous training samples can remain in the training dataset.

On the other hand, assume that an unsupervised anomaly detection model identifies a set of anomalous training data samples from the plurality of training data samples as training data samples describing passengers having 4-letter surnames. Assume also that there is no correlation between passengers having 4-letter surnames and survival. Therefore, the set of anomalous training data samples can be determined not to be correlated with the label. As a result, this set of anomalous training data samples can safely be excluded from the dataset used to train the supervised machine learning model to accurately predict survival of additional Titanic passengers. Training the supervised machine learning model based on this set of anomalous data samples may cause the model to learn inaccurate correlations between anomalous data samples and values of the label, and therefore to inaccurately predict passenger survival. Therefore, this set of anomalous training data samples can be removed from the training dataset to enable more accurate training of the supervised machine learning model.

Figure 12:
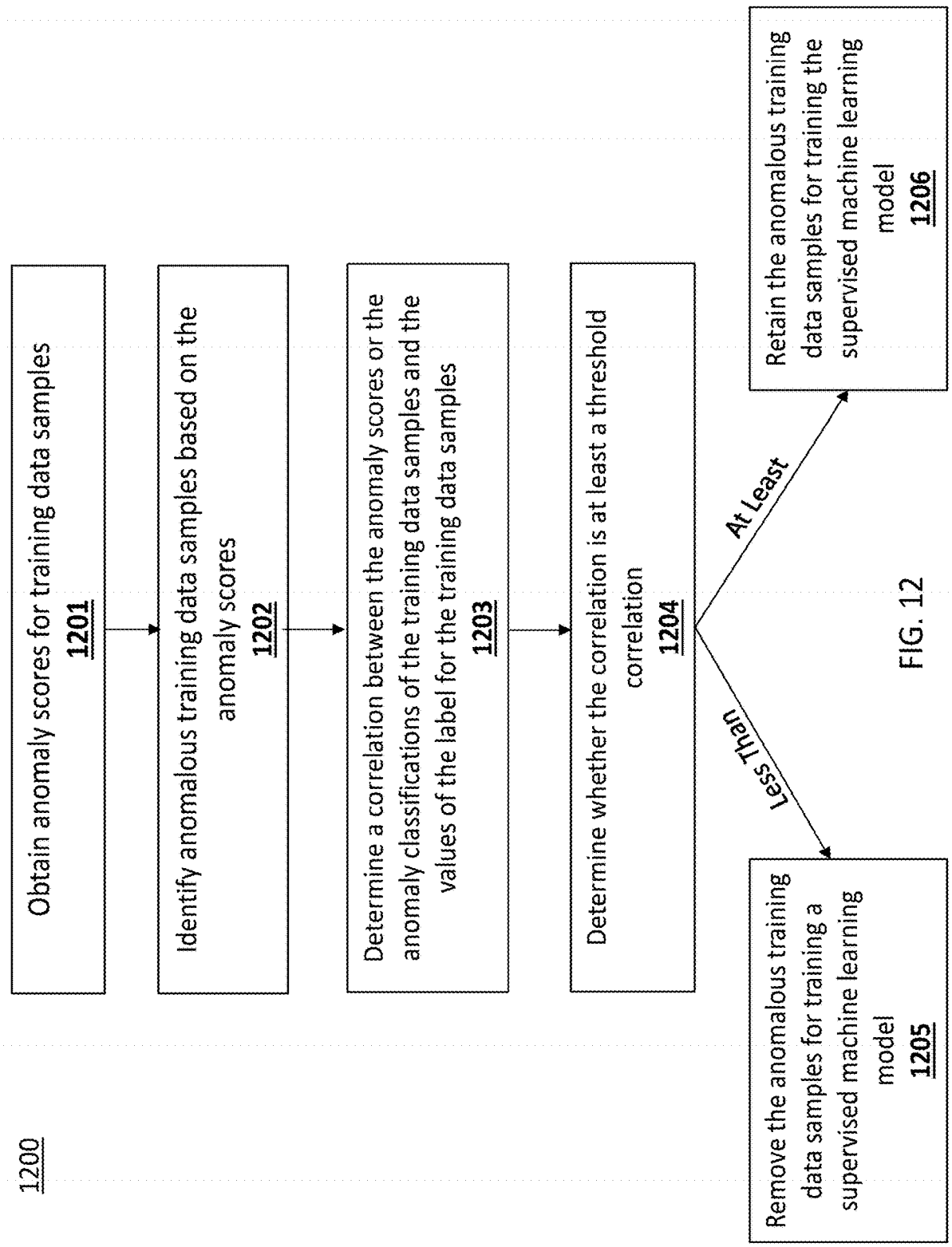
FIG. 12 is a flow chart of a method for refining a training dataset for training a supervised anomaly detection model, in accordance with an embodiment.

FIG. 12 is a flow chart of a method 1200 for refining a training dataset for training a supervised machine learning model, in accordance with an embodiment. In other embodiments, the method may include different and/or additional steps than those shown in FIG. 12. Additionally, steps of the method may be performed in different orders than the order described in conjunction with FIG. 12.

As shown in FIG. 12, an anomaly score for each of a plurality of training data samples is obtained 1201. The plurality of training data samples are for training a supervised machine learning model. Each of the plurality of training data samples is associated with values for a set of features and a value of a label. An anomaly score for a training data sample indicates a predicted extent to which the training data sample is anomalous. A value of a label for a training data sample indicates a known classification of the data sample. The classification of the data sample that is indicated by the value of the label may or may not be anomalousness of the data sample.

In some embodiments, obtaining 1201 the anomaly score for each of the plurality of training data samples includes receiving the anomaly score for each of the plurality of data training samples from an anomaly detection model. In such embodiments, the anomaly detection model can be a supervised model or an unsupervised model.

A set of anomalous training data samples is identified 1202 from the plurality of training data samples based on the received anomaly scores. In certain embodiments, the set of anomalous training data samples is identified as a fraction of the plurality of training data samples having the greatest anomaly scores. This fraction can comprise an expected outlier fraction. In some embodiments, the expected outlier fraction can be 10%.

A correlation between the anomaly scores or the anomaly classifications of the training data samples and the values of the label for the training data samples (e.g., a correlation between the set of anomalous training data samples and values of the label for the set of anomalous training data samples) is identified 1203. Any suitable technique for determining the level of correlation between the anomaly scores or the anomaly classifications of the training data samples and the values of the label may be used, including but not limited to determining Pearson's coefficient of correlation, determining Spearman's rank coefficient of correlation, or applying the method of least squares. A correlation between the set of anomalous training data samples and the values of the label for the set of anomalous training data samples can be, for example, a fraction of the set of anomalous training data samples associated with a particular value of the label.

Then, the method 1200 includes determining 1204 whether the correlation is at least a threshold correlation. Responsive to the correlation being less than the threshold correlation, the set of anomalous training data samples is removed 1205 from the plurality of training data samples for training the supervised machine learning model. On the other hand, responsive to the correlation being at least the threshold correlation, the set of anomalous training data samples is retained 1206 in the plurality of training data samples for training the supervised machine learning model. By retaining only anomalous training data samples having at least a threshold correlation to the values of label for the anomalous training data samples, the supervised machine learning model can be trained to generate accurate predictions that are not confounded (or less confounded) by uncorrelated anomalous data samples.

In some further embodiments, responsive to the correlation being less than the threshold correlation, the method 1200 can further include identifying one or more features that contributed most to the identification of the set of training data samples as anomalous. For this task, steps 803-808 of the feature impact determination method 800 may be applied to the anomalous training data samples.

In additional embodiments, a message can be provided to a user indicating the one or more features that contributed most to the identification of the set of training data samples as anomalous. By providing the message to the user, the user can understand why data samples having no correlation with values of a label were flagged as anomalous.

IX. Example Use Cases

In this section, some non-limiting examples of applications of some embodiments of anomaly detection techniques are described. In Section IX.A and FIGS. 14A-14M, an example of using anomaly detection to detect fraudulent insurance claims is described. In Section IX.B and FIGS. 15A-15K, an example of using anomaly detection to detect financial fraud is described. In Section IX.C, an example of using anomaly detection to detect cybersecurity threats is described.

IX.A. Example 1: Insurance Claim Fraud

The inventors have recognized and appreciated that some embodiments of the anomaly detection techniques described herein can be used to detect fraudulent insurance claims (e.g., vehicle insurance claims, property owners' insurance claims, medical insurance claims, etc.). Relative to conventional approaches, some embodiments provide improved accuracy, sensitivity, and/or specificity in the detection of fraudulent insurance claims. The improved sensitivity provided by some embodiments can improve the overall efficiency of the relevant insurance market, by reducing the total amount paid by insurers on fraudulent claims and discouraging unscrupulous parties from filing additional fraudulent claims. In addition, the improved specificity provided by some embodiments can greatly improve the efficiency of fraud detection and investigation systems by reducing the effort expended on investigation of claims that are ultimately determined to be non-fraudulent.

IX.A.1. Background

Contemporary approaches to evaluating insurance claims for fraudulent activity usually involve a mix of rule matching and human expert intervention. Insurance organizations generally use their own teams of fraud investigators to examine high-risk claims identified by the organizations' in-house rule match systems. In general, such rule-based systems predominantly focus on what is known about the claimant rather than on the data making up the whole of the claim. This focus on the claimant can miss valuable information, including the incident description (generally provided as free-flowing text) and other details. In some embodiments, the anomaly detection techniques described herein achieve better outcomes by analyzing not only the available information about the claimant, but also the incident description and other information provided in the claim.

In the realm of vehicle insurance claim fraud, as criminal organizations have started conducting particular "Crash for Cash" operations and utilizing drivers without any known criminal history, contemporary rule-based systems have started to become obsolete. If the criminals know the fraud detection rules, they can often file fraudulent claims without being caught. In contrast to such rule-based systems, some embodiments of fraud detection systems that use anomaly detection to identify fraudulent claims are much more effective at detecting new types of fraudulent schemes or claims as they emerge, because the system automatically adapts to distinguish between non-fraudulent ("normal") claims and new types of fraudulent ("anomalous") claims as the claims evolve and over time.

IX.A.2. Problem Statement

According to the Coalition Against Insurance Fraud, fraud costs approximately $80 billion a year across all lines of insurance and it is estimated that automobile claim fraud makes up about $6 billion of this loss.

User: In this example, the user is a company specializing in providing financial fraud software systems. Some of the major banks and insurance companies outsource their fraud detection to the company. Their fraud investigators are comfortable working with software but are not data scientists and have minimal experience with coding.

Current System: The company has been operating as a fraud detection expert for over 25 years and has developed its own software systems and database. Until 2016, the company's system used rules created by the company from the historical data. In mid-2016, the company switched to more sophisticated methods using some aspects of supervised predictive modeling.

Business Problem: Though the company has had considerable success with predictive modeling, subsequent labeling of new claims data (Fraud/Not Fraud) has become problematic. Only the claims that have been investigated by a fraud expert have the correct labels and the rest of the claims are labeled as "Not Fraud." Thus, if a claim is not investigated then it is designated as Not Fraud, which leads to inaccuracy in the labels, which leads to poor training of the supervised model. The second problem is in the timeliness of receiving the labels of the new data, especially for the cases that were fraudulent. There are few fraud investigators relative to the number of claims received and investigations can take several months to finalize. In the meantime, the most current claims (which generally provide the most important data) remain unavailable to their supervised models.

IX.A.3. Application of Some Embodiments to Detection of Insurance Claim Fraud

In this example, some embodiments of the anomaly detection techniques described herein are applied to the company's insurance claim data to assess the accuracy of the unsupervised anomaly detection (fraud detection) results using insurance claim data for which the ground truths (fraud vs. not fraud) are known. The ease-of-use of some embodiments of the fraud detection system by fraud investigators is also assessed.

The data analyzed are a set of historic vehicle automobile fraud claims. The claim records include dates, but it is a not time-series use case. The data have mixed data types including numerical features, categorical features and the textual description of the incident. The data are organized in a table and encoded in a spreadsheet file.

Figure 14A:
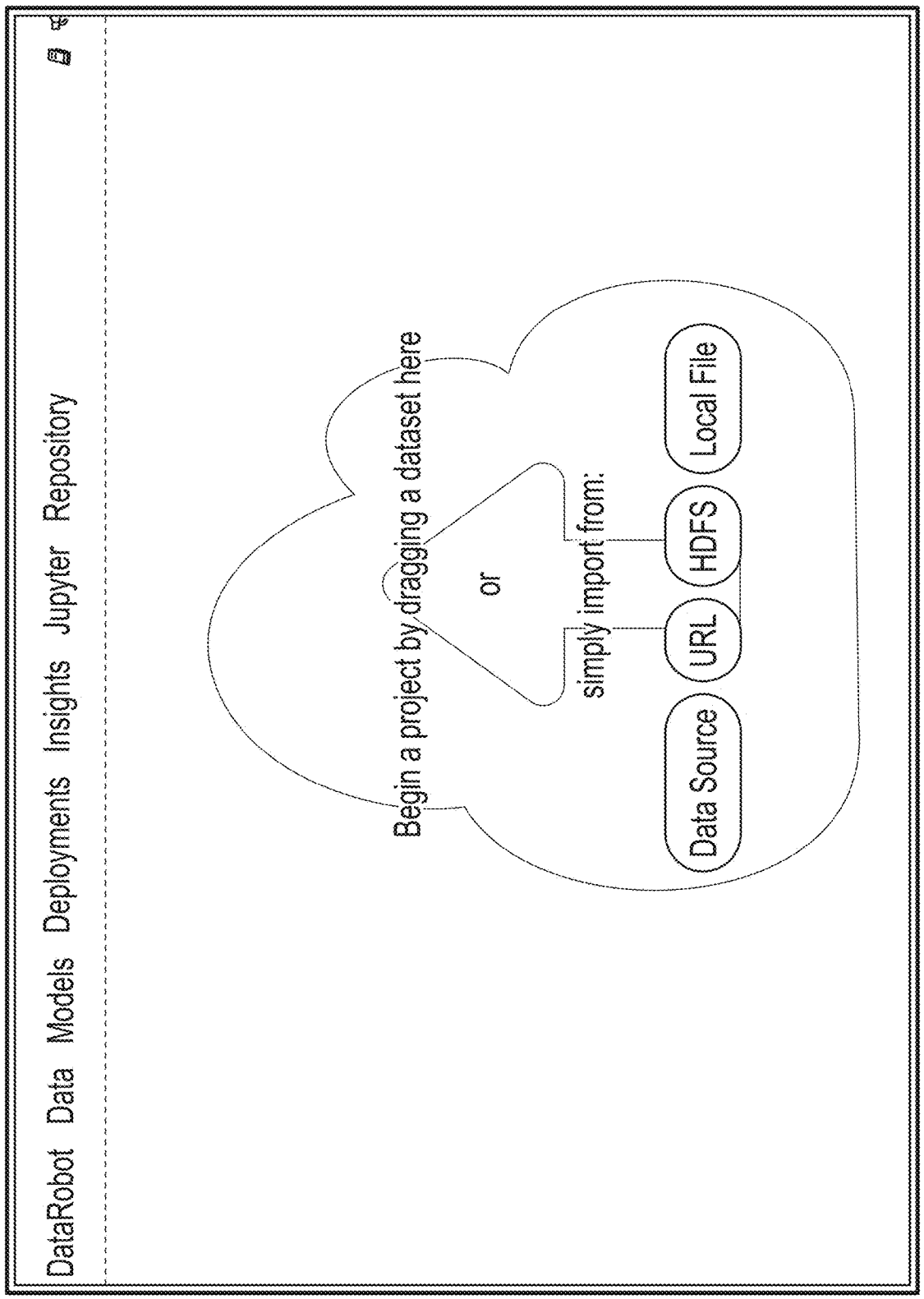

Referring to FIG. 14A, in this example, the user begins by importing the data into the anomaly detection system (e.g., by dragging an icon representing the data file into the anomaly detection system's user interface (UI).

Referring to FIG. 14B, in this example, the anomaly detection system automatically identifies the data types of the features, analyzes the values of each feature, and displays statistics describing the values of each feature. In the example of FIG. 14B, the first column of the UI shows the names (or "reference ID") of the features, the second column shows the indices assigned to the features; the third column identifies the data types of the features; the fourth column indicates, for each feature, the number of unique values of the feature found in the data set; the fifth column indicates, for each feature, the number of data samples in which the feature value is missing (not present in the data set); the six column indicates the mean value of each numeric feature; and the seventh column indicates the standard deviation of the values of each numeric feature.

Figure 14C:
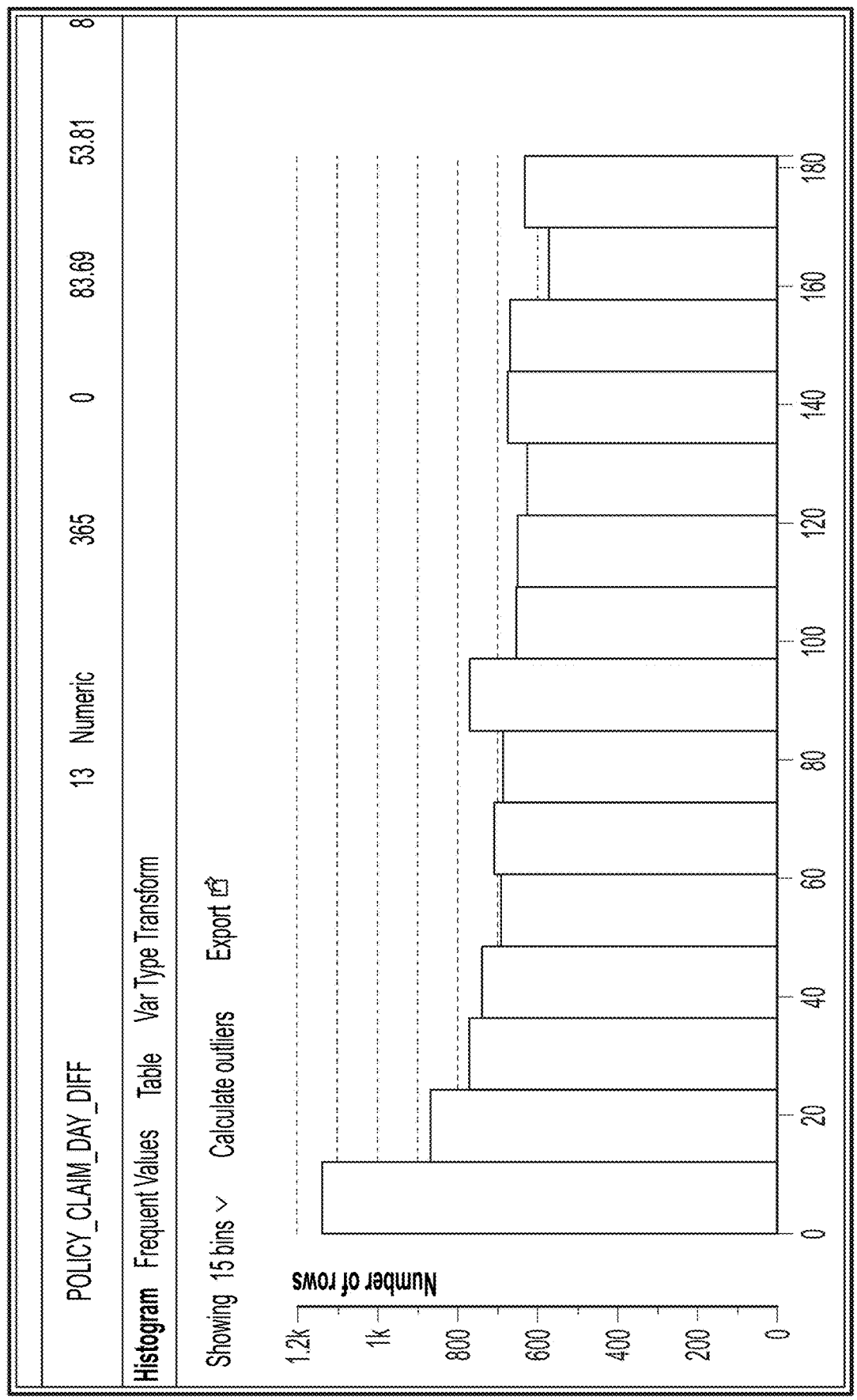

Referring to FIG. 14C, in this example, the user can select a feature of interest (e.g., the Policy_Claim_Day_Diff feature) to view a UI showing more detailed information about the distribution of the feature's values. In the example of FIG. 14C, the UI shows a histogram of the values of the selected feature. The number of histogram bins displayed may be specified by the user. In addition or in the alternative, this UI screen may display (1) values of the selected feature that occur frequently within the data set, (2) a table of the values of the selected feature, and/or (3) potential data transformations that can be performed on the feature's values.

Referring to FIG. 14D, in this example, anomaly detection blueprints to be used by the system to analyze the data set are identified. For example, the user may select one or more (e.g., all) of the anomaly detection blueprints. In some embodiments, the system identifies the suitable data preprocessing operations (e.g., the best types of data preprocessing operations for the data set) and creates a customized blueprint for the data set on-the-fly.

Referring to FIG. 14E, in this example, the system displays a UI screen showing the values of an accuracy metric (area under curve or "AUC") for the models generated by each of the anomaly detection blueprints applied to the data set. In some embodiments, the value of the accuracy metric may be calculated at different stages of the model's training and validation (e.g., after validation, after cross-validation, or in holdout testing). In some embodiments, the system may calculate and display accuracy metrics other than AUC (e.g., sensitivity, specificity, false positive rate, false negative rate, etc.). In some embodiments, information other than the values of accuracy metrics may be displayed. For example, the "importance" or "impact" of each feature (e.g., the extent to which the feature contributes to the model's determination of a data sample's anomalousness, as determined using a feature importance assessment technique or a feature impact assessment technique) may be displayed.

In this example, the data set indicates the actual ground truth of each claim (i.e. whether the claim was determined to be a fraudulent claim or a non-fraudulent claim), which facilitates scoring of the anomaly detection models by the system. Referring to FIG. 14E, in this example, the success of the results (~0.87 area under curve or "AUC") indicates that the system's classification of a claim as "anomalous" is strongly correlated with a claim's status as being fraudulent.

Figure 14F:
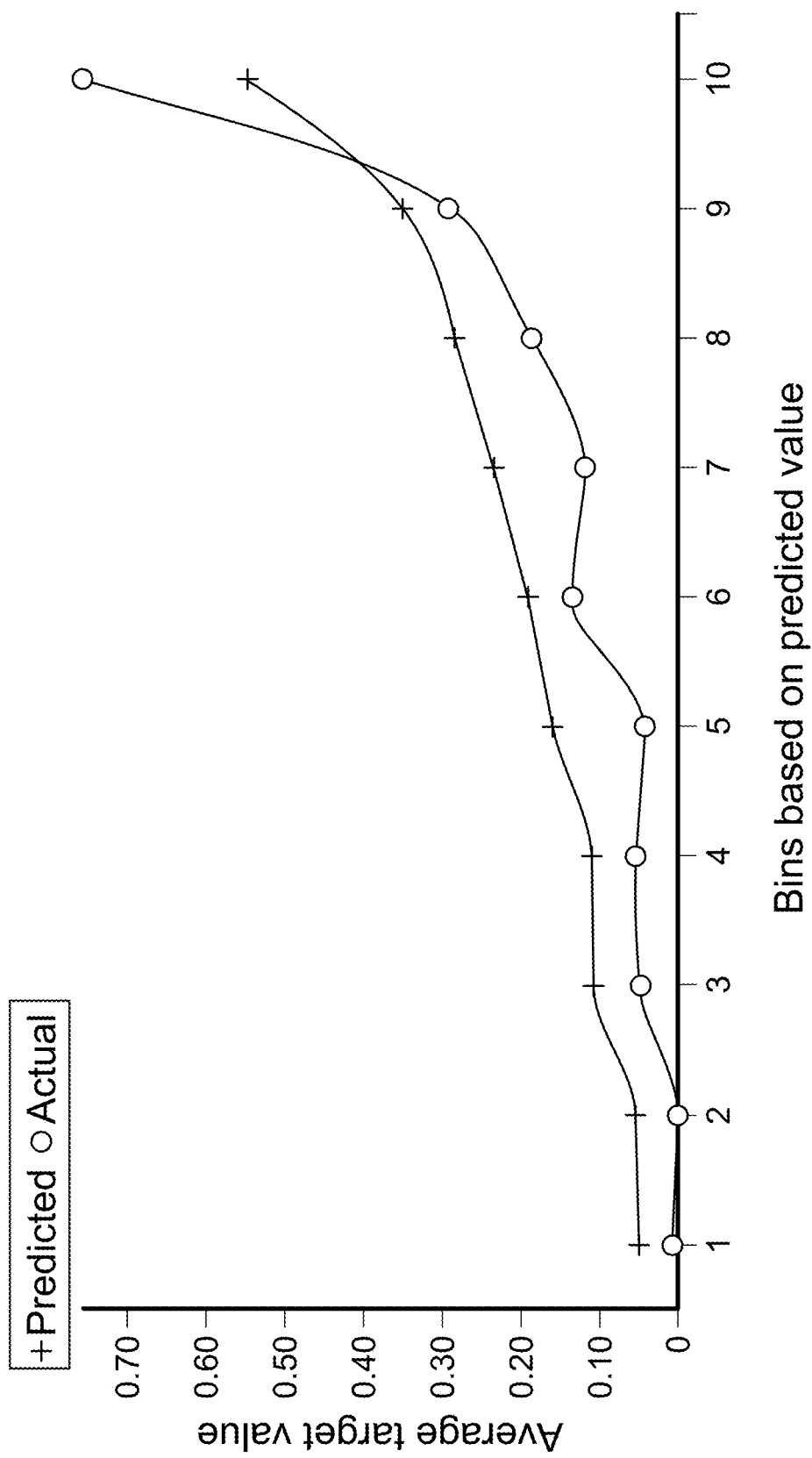

Referring to FIG. 14F, in this example, the system displays a UI screen showing a visualization that illustrates the relationship between records flagged as anomalous by the system (predictive value, represented by the '+' symbol) and claims identified as fraudulent by human experts (actual value, represented by the 'o' symbol). In the example of FIG. 14F, the visualization is a lift chart, but other types of visualizations may be used. In this example, the lift chart shows a clear correlation between anomalies detected by the model and fraudulent claims.

As discussed above, in some embodiments, the system provides an anomaly detection blender that can be used to create ensemble models from the underlying anomaly detection models or blueprints. An ensemble anomaly detection model can be tuned to be either a mean, maximum or minimum blender. In this example, a mean blender, a maximum blender, and a minimum blender all produced approximately the same results, which indicates that the underlying models were generally in agreement regarding which claims were considered anomalies.

Figure 14G:
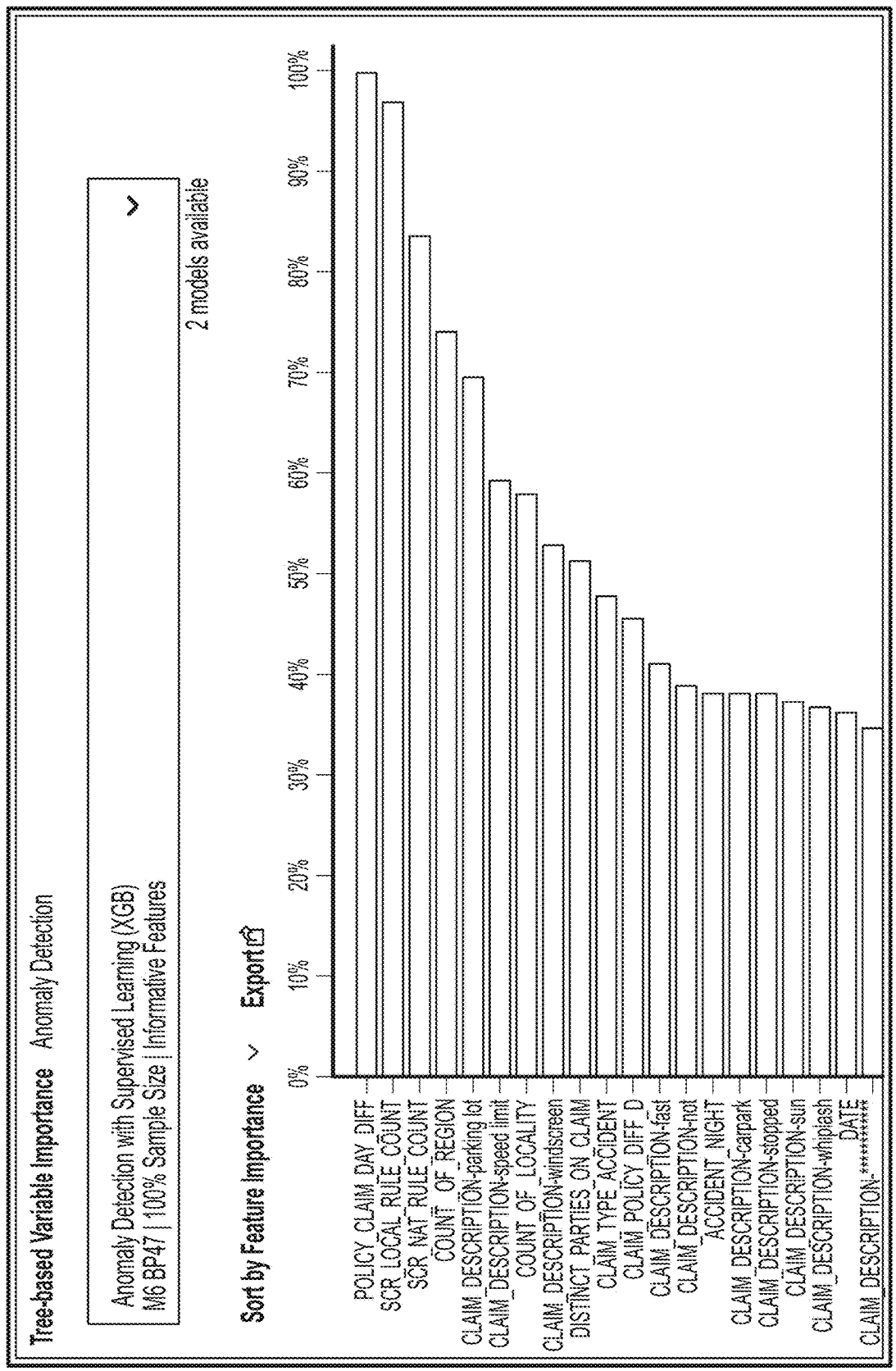

Referring to FIG. 14G, in this example, the system displays a UI screen showing information regarding the "feature importance" of the data set's features (e.g., the extent to which the respective features contribute to the model's determination of a data sample's anomalousness, as determined using a feature importance assessment technique). In this example, the feature importance information not only indicates that some non-text features are more important than others in determining whether a data sample (claim) is anomalous (fraudulent) (e.g., whether the claim related to an accident that occurred at night is less important than the type of accident), but also indicates that specific terms used in the incident description (or claim description) (e.g., the terms parking lot, speed limit, windscreen, fast, not, carpark, stopped, sun and whiplash) contribute significantly to the model's identification of the anomalous claims.

As described above, some embodiments of the anomaly detection system provides a novel feature impact assessment method to score a feature's contribution to the model's identification of data samples as anomalous. This feature impact score can help provide explanations for a particular claim's anomaly score. The feature impact assessment technique works with any of the Anomaly Detection blueprints.

Figure 14H:
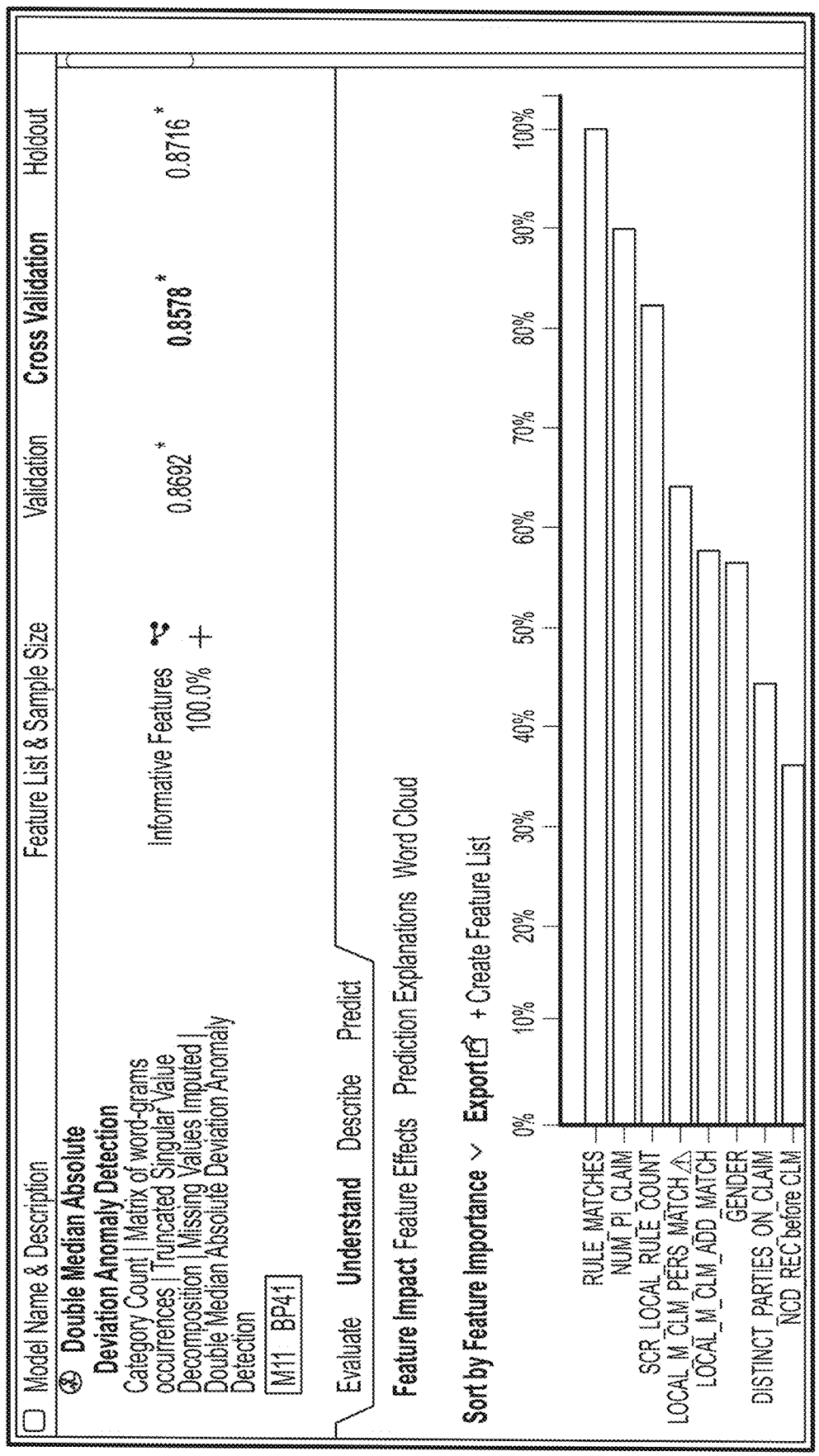
Figure 14I:
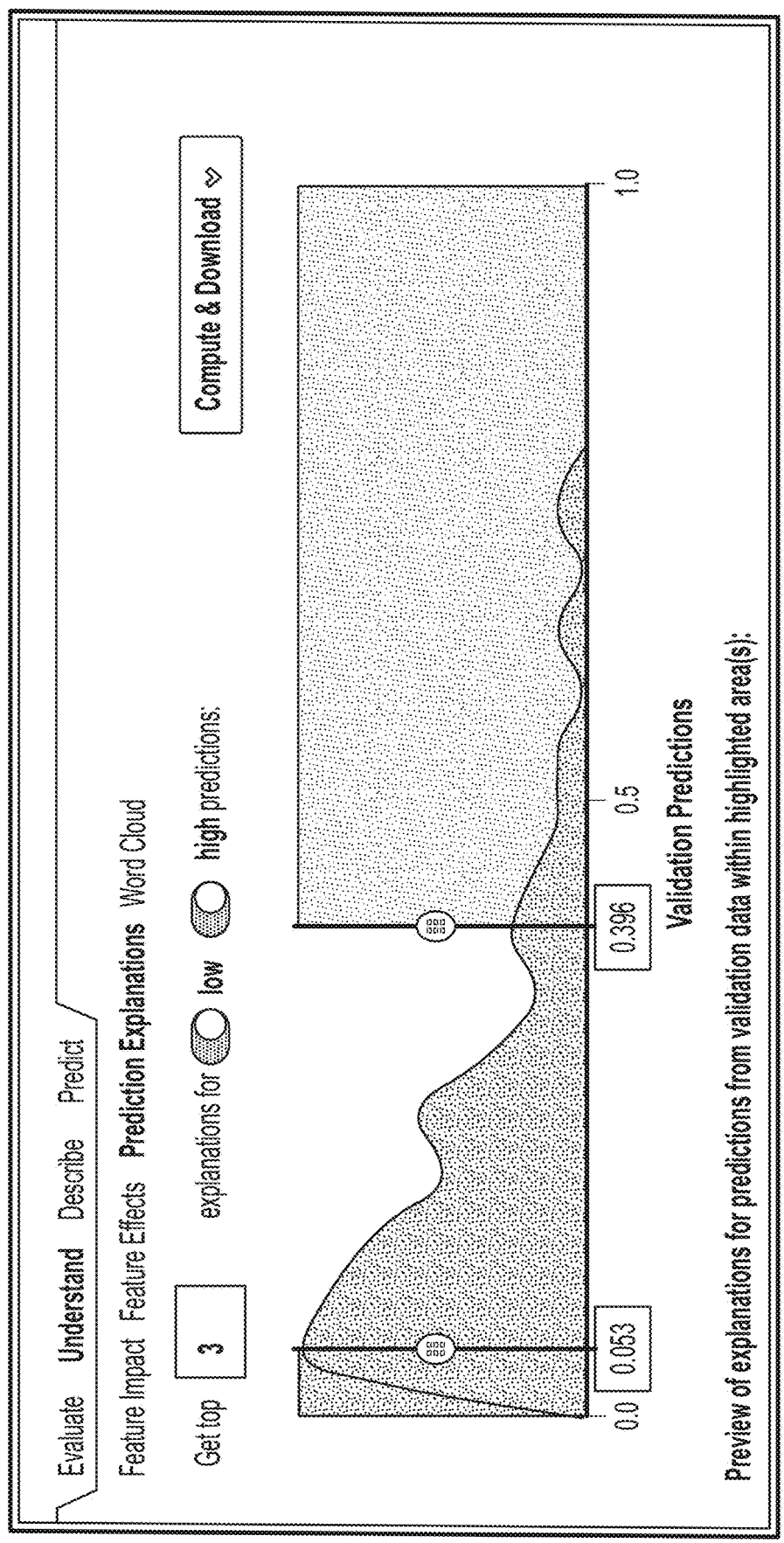

Referring to FIG. 14H, in this example, the system displays a UI screen showing that the features that contribute most to the Double MAD anomaly detection model flagging a claim as an anomaly are (1) whether the claim matches the rules provided by the user's now obsolete rule based system, (2) the number of personal injury claims the claimant has made, and (3) the gender of the claimant.

Referring to FIGS. 14L and 14J, in this example, the system displays a UI screen showing the distribution of the anomaly scores assigned to the claims by the anomaly detection model. In this example, the user can indicate the endpoints for a range of anomaly scores (e.g., 0.0 to 0.053, 0.053 to 0.396, and/or 0.396 to 1.0), and the system can provide explanations for the anomaly scores assigned to each of the claims having an anomaly score within the specified range. In the example of FIG. 14J, explanations are provided for three claims having high anomaly scores (see claim ID numbers 9576, 6398, and 7642) and for two claims having low anomaly scores (see claim ID numbers 2806 and 8428). In the example of FIG. 14J, the system identifies some factors that contribute to increasing the corresponding claim's anomaly detection score (see the explanations preceded by one or more '+' symbols) and some factors that contribute to decreasing the corresponding claim's anomaly detection score (see the explanations preceded by one or more '-' symbols).

Referring to FIG. 14K, in some embodiments, the explanations can be exported from the UI to a file (e.g., a spreadsheet). Users (e.g., fraud investigators) can use this information to gain insight into why a particular claim is considered an anomaly, and/or to support any subsequent legal proceedings involving the claimant.

Figure 14M:
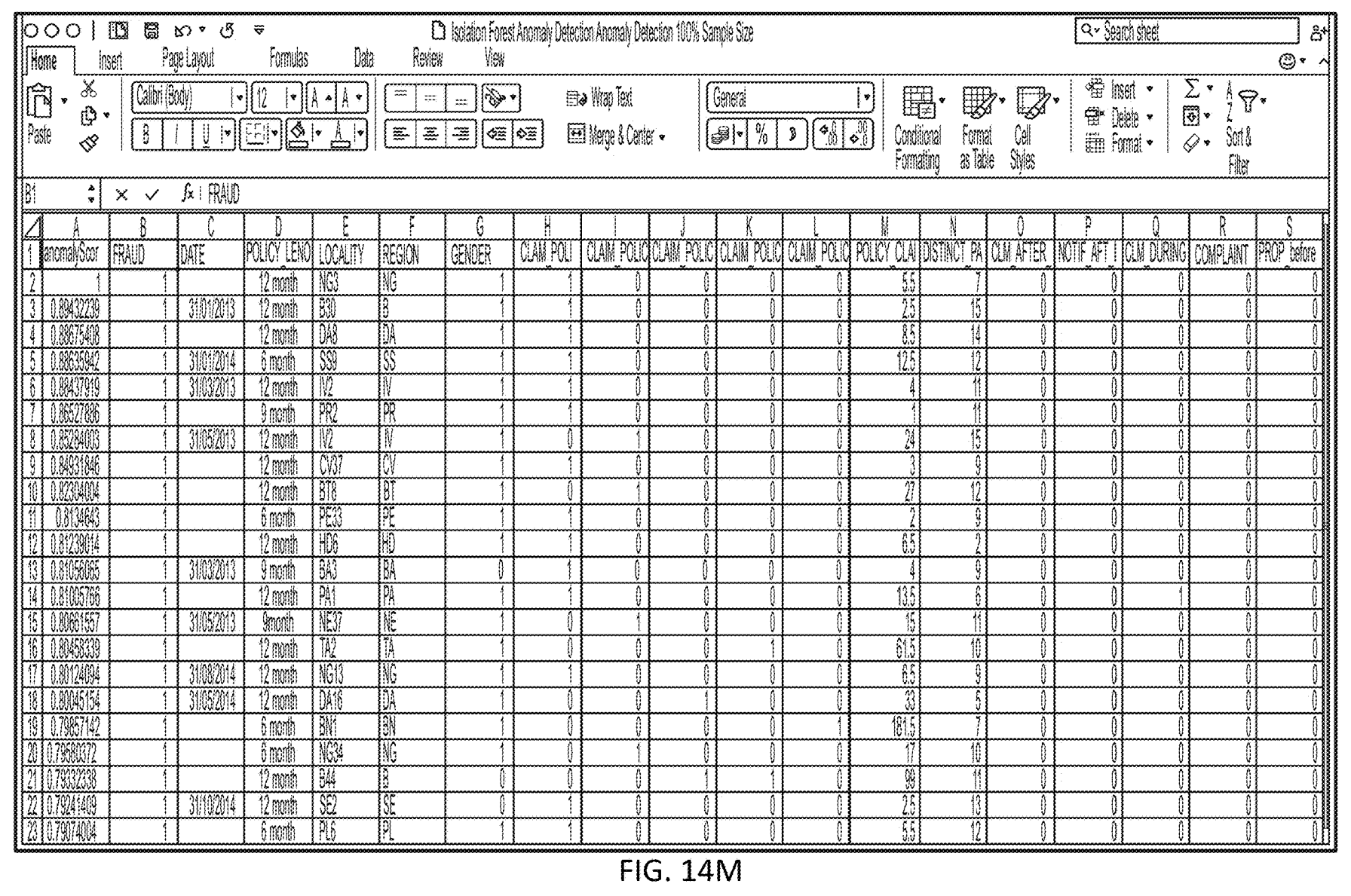

Referring to FIG. 14L, in this example, the system displays a scrollable table that shows the claims ranked by anomaly score, which can help users investigate the data corresponding to any claims of interest. For further analysis, the claim data can be exported to a file (e.g., a spreadsheet), as shown in FIG. 14M.

Outcome: In this case, the anomaly detection trial was evaluated as a success, for the following reasons: (1) the fraud investigation team were confident that the ranked lists provided by the system were more accurate than their assessments provided by their system; (2) by focusing on the claims identified as possibly fraudulent, the insurers could potentially save millions of dollars while at the same time not increasing the workload of the investigators; (3) anomalous claims have a clear relationship to fraudulent claims; (4) the unsupervised blueprints could identify fraudulent claims with a success rate of ~0.87 AUC (according to the ground truths provided); (5) novel insights and business knowledge were gained due to the prediction explanation features and the textual blueprint; (6) the simplicity of the output allowed easy translation into business rules; (7) the user had minimal involvement in the running of the trial; and (8) there were no requirements for coding by the user or even for the user to understand the underlying pre-processing steps and anomaly detection algorithms.

IX.B. Example 2: Credit Card Fraud and Money Laundering

The inventors have recognized and appreciated that some embodiments of the anomaly detection techniques described herein can be used to detect fraudulent credit card purchases and money laundering. Relative to conventional approaches, some embodiments provide improved accuracy, sensitivity, and/or specificity in the detection of fraudulent credit card purchases and money laundering. The improved sensitivity provided by some embodiments can improve the overall efficiency of the relevant financial institution, by reducing the total amount paid by the institution to recoup the costs of fraudulent credit card purchases and money laundering, and by discouraging unscrupulous parties from attempting additional fraudulent purchases or money laundering schemes. In addition, as described above, the improved specificity provided by some embodiments can greatly improve the efficiency of fraud detection and investigation systems by reducing the effort expended on investigation of transactions that are ultimately determined to be non-fraudulent.

IX.B.1. Background

Like investigation of insurance claims, contemporary approaches to evaluating financial transactions for fraudulent activity usually involve a mix of rule matching and human expert intervention. Financial institutions generally use their own teams of fraud investigators to examine high-risk transactions identified by the institutions' in-house rule match systems. In general, such rule-based systems predominantly focus on what is known about the transacting entity rather than on the data making up the whole of the transaction. As discussed above with regard to insurance fraud detection, this focus on the entity can miss valuable information. In some embodiments, the anomaly detection techniques described herein achieve better outcomes by analyzing not only the available information about the transacting entity, but also the incident description and other information provided in the claim.

While detection of fraudulent insurance claims and detection of fraudulent transactions are similar in some ways, one main difference between detection of fraudulent insurance claims and detection of fraudulent transactions is the volume of data. The volume of credit card transactions and other financial transactions is much greater than the volume of insurance claims. Furthermore, a larger proportion of financial transactions are non-fraudulent compared with insurance claims. This difference in volume of data samples and rarity of fraudulent data samples adds an additional layer of complexity to detection of fraudulent transactions. As a result, conventional solutions to credit card fraud and money laundering detection demonstrate similar shortcomings as solutions for insurance fraud detection, but in addition to these shortcomings, credit card fraud and money laundering detection also requires a large number of qualified financial fraud experts to evaluate the large volume of financial transactions.

By using some embodiments of fraud detection systems that use anomaly detection to identify fraudulent transactions, institutions can evaluate a greater quantity of (e.g., all) transactions, establishing a concept of a "normal" transaction. These insights may then be incorporated into the institution's current rule-based systems. By incorporating these insights into the institution's current-rule based systems, the expert human fraud investigators are able to prioritize evaluations of transactions having the highest probability of being fraudulent. Thus by implementing the anomaly detection systems, large volumes of financial transactions can efficiently and thoroughly be evaluated for fraud.

IX.B.2. Problem Statement

According to the United Nations Office on Drugs and Crime, the amount of money laundered globally each year is approximately 2-5% of global GDP—approximately 800 billion—2 trillion USD.

User: In this example, the user is a branch of a financial institution (e.g., bank, credit card company, etc.) specializing in providing money laundering detection to the financial institution.

Business Problem: The branch is focusing on detection of the following money-laundering scenarios:

A customer spends money using their credit card, but overpays their credit card bill and seeks a cash refund from the financial institution for the overpayment.

A customer receives a credit for a transaction from a merchant without offsetting the transaction, and either spends the received credit or requests a cash refund from the financial institution.

Current System: The branch currently relies on a rule-based system to generate alerts to detect potentially suspicious activity consistent with the above scenarios. The rule followed by the rule-based system causes the system to trigger an alert whenever a customer requests a refund from the financial institution, regardless of amount. The rationale behind triggering an alert in response to a refund request, regardless of the amount of the request, includes the following ideas:

Small refund requests may be a money launderer testing the financial institution's refund mechanism or trying to establish refund requests as a normal pattern for their account.

Small refunds might be of the residual of a money launderer's spend and fictitious merchant credits.

The downside of this vigilant rule followed by the branch's current rule-based system is flagging of non-fraudulent transactions and a need for a large number expert money laundering investigators, thereby consuming unnecessary time and money.

IX.B.3. Application of Some Embodiments to Detection of Credit Card Fraud and Money Laundering In this example, reduction of the rate of false positive anomaly detection (fraud detection) with use of some embodiments of the unsupervised anomaly detection techniques described herein, applied to the branch's financial transaction data, is evaluated using financial transaction data for which the ground truths (fraud vs. not fraud) are known. The ease-of-use of some embodiments of the fraud detection system by fraud investigators is also assessed.

The data analyzed are a set of historic transactions that adhere to one of the two money-laundering scenarios discussed above. The transaction data have been filtered to include the most complex data. Specifically, when the analyzed transaction data are evaluated by the branch's current rule-based system, the evaluation yields a 90% false positive rate. The data have mixed data types including numerical features, categorical features and the textual case notes related to the transaction. The data are organized in a table and encoded in a spreadsheet file.

The user begins by importing the data into the anomaly detection system (e.g., by dragging an icon representing the data file into the anomaly detection system's user interface (UI)).

Referring to FIG. 15A, in this example, the anomaly detection system automatically identifies the data types of the features, analyzes the values of each feature, and displays statistics describing the values of each feature. In the example of FIG. 15A, the first column of the UI shows the names (or "reference ID") of the features; the second column shows the indices assigned to the features; the third column identifies the data types of the features; the fourth column indicates, for each feature, the number of unique values of the feature found in the data set; the fifth column indicates, for each feature, the number of data samples in which the feature value is missing (not present in the data set); the six column indicates the mean value of each numeric feature; the seventh column indicates the standard deviation of the values of each numeric feature; and the eighth column indicates the median of the values of each numeric feature.

Figure 15B:
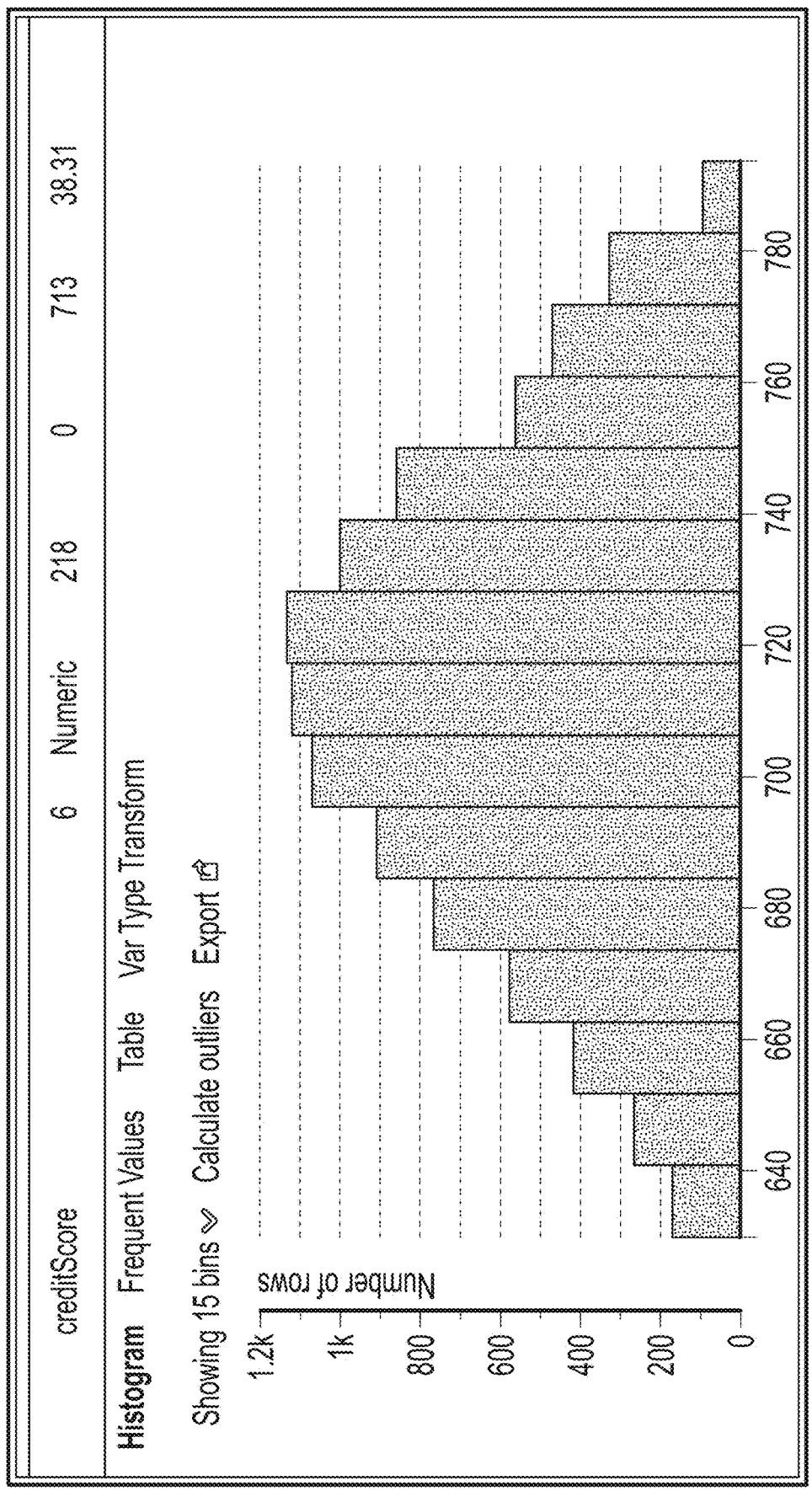

Referring to FIG. 15B, in this example, the user can select a feature of interest (e.g., the creditScore feature) to view a UI showing more detailed information about the distribution of the feature's values. In the example of FIG. 15B, the UI shows a histogram of the values of the selected feature. The number of histogram bins displayed may be specified by the user. In addition or in the alternative, this UI screen may display (1) values of the selected feature that occur frequently within the data set, (2) a table of the values of the selected feature, and/or (3) potential data transformations that can be performed on the feature's values.

Referring to FIG. 15C, in this example, anomaly detection blueprints to be used by the system to analyze the data set are identified. For example, the user may select one or more (e.g., all) of the anomaly detection blueprints. In some embodiments, the system identifies the suitable data preprocessing operations (e.g., the best types of data preprocessing operations for the data set) and creates a customized blueprint for the data set ort-the-fly.

Referring to FIG. 15D, in this example, the system displays a UI screen showing the values of an accuracy metric (area under curve or "AUC") for the models generated by each of the anomaly detection blueprints applied to the data set. In some embodiments, the value of the accuracy metric may be calculated at different stages of the model's training and validation (e.g., after validation, after cross-validation, or in holdout testing). In some embodiments, the system may calculate and display accuracy metrics other than AUC (e.g., sensitivity, specificity, false positive rate, false negative rate, etc.). In some embodiments, information other than the values of accuracy metrics may be displayed. For example, the "importance" or "impact" of each feature (e.g., the extent to which the feature contributes to the model's determination of a data sample's anomalousness, as determined using a feature importance assessment technique or a feature impact assessment technique) may be displayed.

In this example, the data set indicates the actual ground truth of each transaction (i.e. whether the transaction was determined to be associated with money laundering or not associated with money laundering), which facilitates scoring of the anomaly detection models by the system. Referring to FIG. 15D, in this example, the success of the results (~0.85 area under curve or "AUC") indicates that the system's classification of a transaction as "anomalous" is strongly correlated with a transaction's status as being fraudulent.

Referring to FIG. 15E, in this example, the system displays a UI screen showing values of various performance metrics for the model generated by the most accurate anomaly detection blueprint (the Anomaly Detection with Supervised Learning (XGB) blueprint) applied to the data set. As shown in FIG. 15E, the data set included 2000 transactions. 1794 transactions of the 2000 transactions were known to be non-fraudulent transactions. 206 transactions of the 2000 transactions were known to be fraudulent transactions. The anomaly detection model identified 1567 true negative fraudulent transactions, 227 false positive fraudulent transactions, 69 false negative fraudulent transactions, and 137 true positive transactions. The performance metrics calculated by the system include a F1 score, a true positive rate (sensitivity), a false positive rate (fallout), a true negative rate (specificity), a positive predictive value (precision), a negative predictive value, accuracy, and Matthew's correlation coefficient. In particular, the false positive rate (fallout) of the anomaly detection model is 12.65%, compared to the user's current rule-based system's false positive rate of 90%.

Referring to FIG. 15F, in this example, the system displays a UI screen showing the values of an accuracy metric (area under curve or "AUC") for the anomaly detection models of FIG. 15D as well as blended anomaly detection models. A blended anomaly detection model includes an ensemble of multiple different anomaly detection models. A blended anomaly detection model can be set to a minimum, medium, or maximum level of anomaly detection rigor for identifying fraudulent transactions. In this example, a blended anomaly detection model having a minimum, medium, and maximum level of anomaly detection rigor all yielded approximately the same accuracy metrics, which indicates that the underlying models were generally in agreement regarding which transactions were considered fraudulent. However, as shown in FIG. 15F, for this particular data set the blended anomaly detection model set to the minimum level of anomaly detection rigor was the most accurate model with 0.8556 AUC.

Figure 15G:
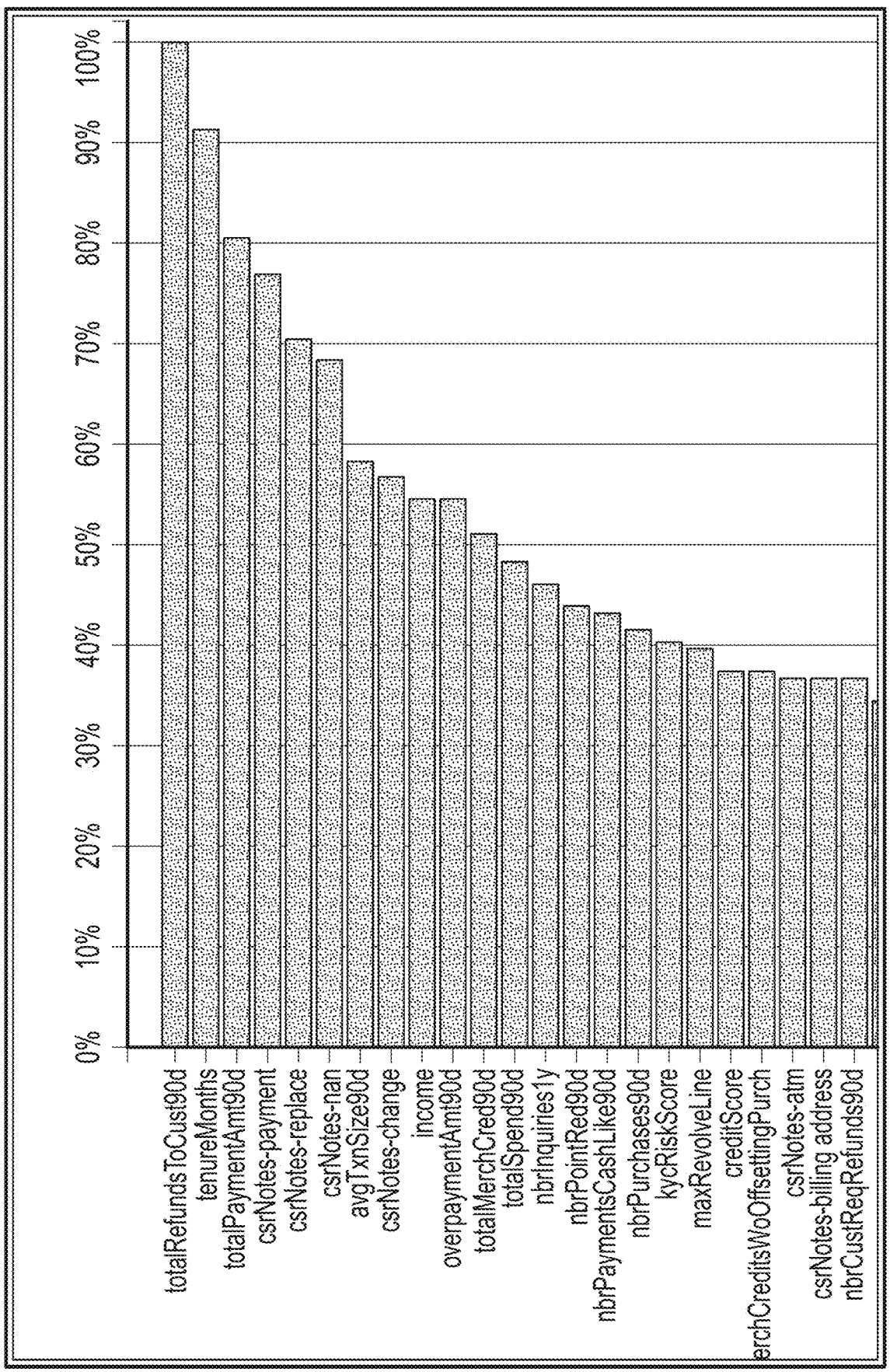

Referring to FIG. 15G, in this example, the system displays a UI screen showing information regarding the "feature importance" of the data set's features (e.g., the extent to which the respective features contribute to the model's determination of a data sample's anomalousness, as determined using a feature importance assessment technique). In this example, the feature importance information indicates that some non-text features are more important than others in determining whether a data sample (transaction) is anomalous (fraudulent) (e.g., whether the income of a customer is less important than the total number of refunds issued to a customer in the last 90 days). Furthermore, even though many transactions in the data set are not associated with values for the free text features of the data set (e.g., case notes for each transaction), the feature importance information indicates that specific terms used in the case notes (e.g., the terms payment, replace, and change) contribute significantly to the model's identification of anomalous claims. Additionally, missing values (e.g., no values) for the case notes for transactions also contribute significantly to the model's identification of anomalous claims. The fact that missing text is important to anomaly detection warrants further investigation into data quality and data leakage, as discussed in further detail below.

As described above, some embodiments of the anomaly detection system provides a novel feature impact assessment method to score a feature's contribution to the model's identification of data samples as anomalous. This feature impact score can help provide explanations for a particular transaction's anomaly score. The feature impact assessment technique works with any of the Anomaly Detection blueprints.

Figure 15H:
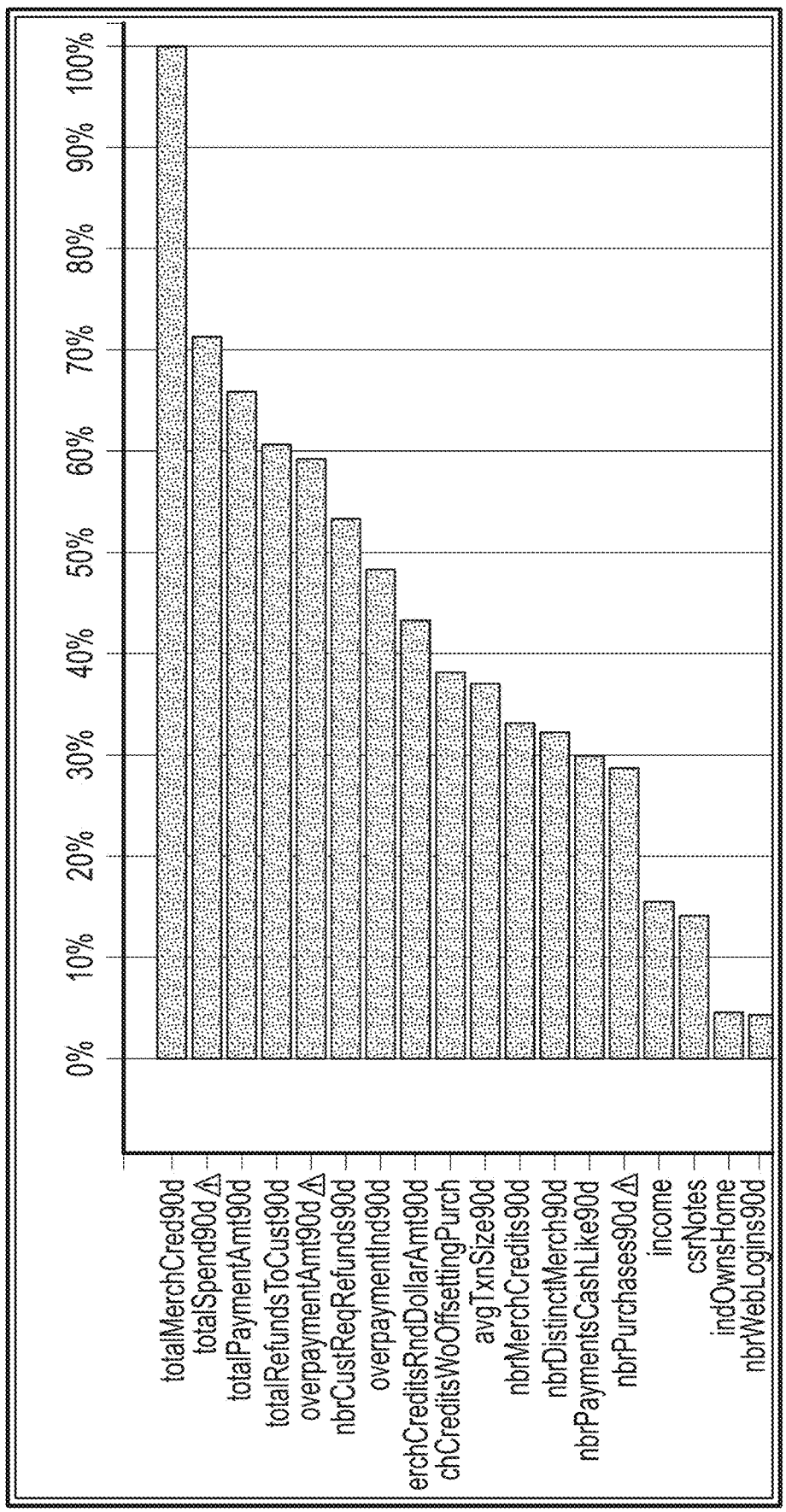

Referring to FIG. 15H, in this example, the system displays a UI screen showing that the features that contribute most to a particular anomaly detection model flagging a transaction as an anomaly are (1) the total number of merchant credits that the customer has received in the last 90 days, (2) the total spend by the customer in the last 90 days, and (3) the total payment amount by the customer in the last 90 days.

Referring to FIG. 15I, in this example, the system provides explanations for the anomaly scores assigned to each of the transactions having an anomaly score within a specified range. In the example of FIG. 15I, explanations are provided for three transactions having high anomaly scores (see transaction ID numbers 5838, 1031, and 6409) and for three transactions having low anomaly scores (see transaction ID numbers 391, 9153, and 7797). In the example of FIG. 15I, the system identifies some factors that contribute to increasing the corresponding transaction's anomaly detection score (see the explanations preceded by one or more '+' symbols) and some factors that contribute to decreasing the corresponding transaction's anomaly detection score (see the explanations preceded by one or more '−' symbols). For example, in the example of FIG. 15I, missing case notes for a transaction are associated with the transaction being non-anomalous (e.g., non-fraudulent). The missing case notes may be a data quality or leakage issue, and the system can alert the user to this potential issue.

Referring to FIG. 15J, in this example, the system displays a scrollable table that shows the transactions ranked by anomaly score, which can help users investigate the data corresponding to any transactions of interest.

Figure 15K:
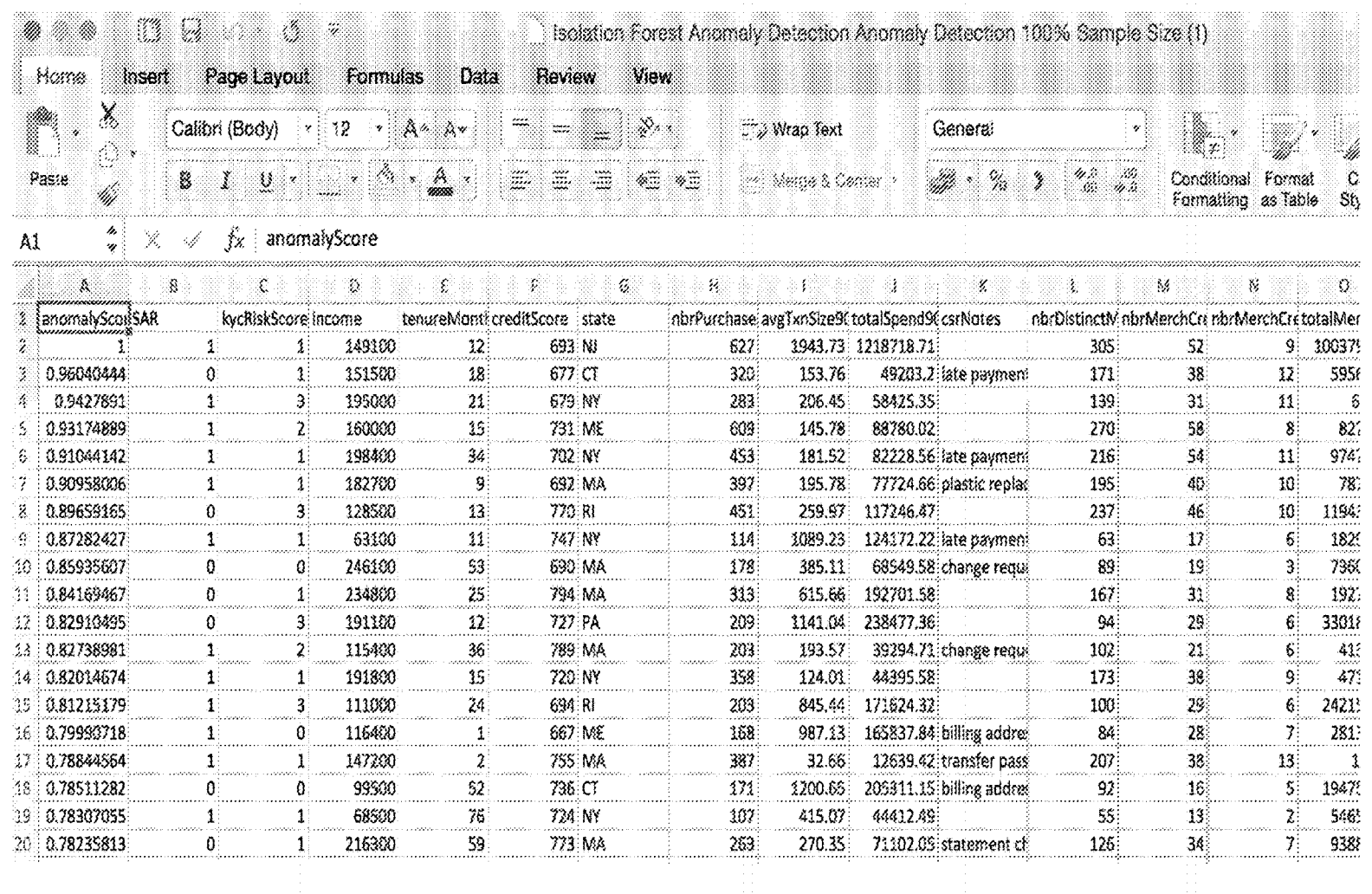

Referring to FIG. 15K, in some embodiments, the explanations can be exported from the UI to a file (e.g., a spreadsheet). Users (e.g., expert fraud investigators) can use this information to gain insight into why a particular transaction is considered an anomaly, and/or to support any subsequent legal proceedings involving the customer that engaged in the transaction.

Outcome: In this case, the anomaly detection trial was evaluated as a success, for the following reasons: (1) the ranked lists of anomalous transactions provided by the anomaly detection system were more accurate than the financial institution's current rule-based system and resulted in identification of fewer false positive fraudulent transactions; (2) by prioritizing evaluation of specific transactions identified by the anomaly detection system to be most likely associated with money laundering, the financial institution could save millions of dollars while not increasing the workload of its money laundering investigators; (3) anomalous transactions identified by the anomaly detection system have a clear relationship to fraudulent transactions; (4) the unsupervised anomaly detection models generated by the anomaly detection blueprints applied to the data set identified fraudulent transactions with a success rate of ~0.85 AUC; (5) novel insights and business knowledge were gained from the explanations provided by the anomaly detection system for identification of anomalous transactions, and the simplicity of the output explanations enabled seamless translation of the insights into business rules; (6) the user was minimally involved in the anomaly detection process due to the automation of the anomaly detection system; (7) there were no requirements for coding by the user or even for the user to understand the underlying pre-processing steps and anomaly detection algorithms; (8) the user was able to identify a data quality and leakage issue with their data set.

IX.C. Example 3: Network Access and Cybersecurity

Oftentimes it is relatively simple to detect fraudulent network access retrospectively. However, in cases in which fraudulent network access has not previously occurred according to a particular tactic (e.g., in cases in which fraudulent network access is "novel"), such novel fraudulent network access can be challenging to detect as it occurs. For instance, some supervised models are able to predict whether historical network access was fraudulent, but by the time the models have been deployed following sufficient training and validation, fraudulent network access may have begun occurring according to new tactics. In general, some supervised models cope with generating predictions based on novel network access data by assigning a majority class (e.g., normal network access). As a result, there may be several incidents of fraudulent network access before cybersecurity experts are alerted to the problem.

However, using some embodiments of the anomaly detection methods disclosed herein, a first attempt at a novel fraudulent network access would be flagged as an anomaly as it would be identified as "something not seen before", thereby enabling cybersecurity experts first to track and stop the current intrusion, and then to take measures to prevent future such intrusions.

X. Example Computer

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 13:
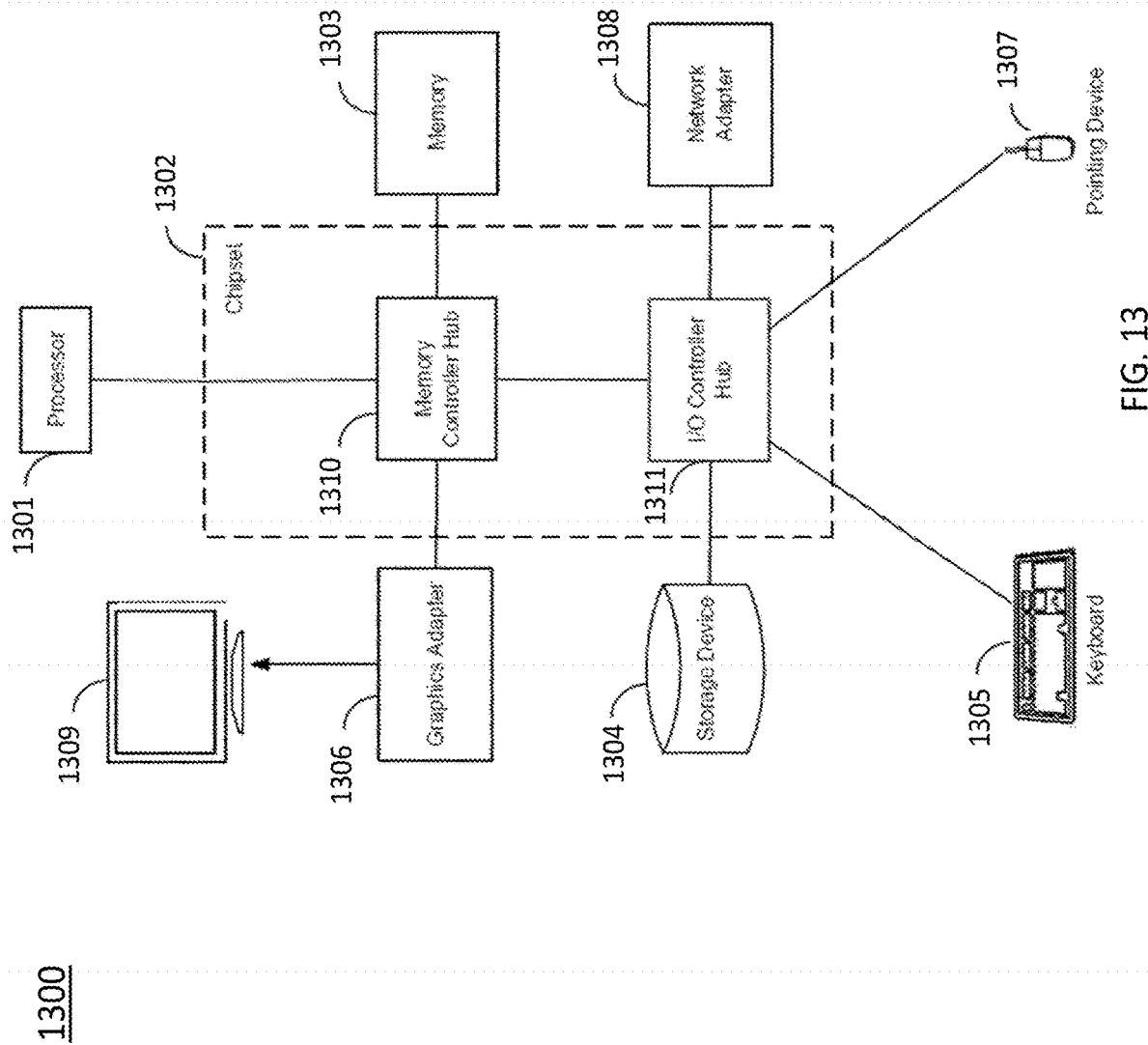
FIG. 13 illustrates an example computer for implementing the methods described herein, in accordance with an embodiment.

FIG. 13 illustrates an example computer 1300 for implementing the methods described herein (e.g., in FIGS. 1-12), in accordance with an embodiment. The computer 1300 includes at least one processor 1301 coupled to a chipset 1302. The chipset 1302 includes a memory controller hub 1310 and an input/output (I/O) controller hub 1311. A memory 1303 and a graphics adapter 1306 are coupled to the memory controller hub 1310, and a display 1309 is coupled to the graphics adapter 1306. A storage device 1304, an input device 1307, and network adapter 1308 are coupled to the I/O controller hub 1311. Other embodiments of the computer 1300 have different architectures.

The storage device 1304 is a non-transitory computer-readable storage medium such as a hard drive, compact disk read-only memory (CD-ROM), DVD, or a solid-state memory device. The memory 1303 holds instructions and data used by the processor 1301. The input interface 1307 is a touch-screen interface, a mouse, track ball, or other type of pointing device, a keyboard, or some combination thereof, and is used to input data into the computer 1300. In some embodiments, the computer 1300 can be configured to receive input (e.g., commands) from the input interface 1307 via gestures from the user. The graphics adapter 1306 displays images and other information on the display 1309. The network adapter 1308 couples the computer 1300 to one or more computer networks.

The computer 1300 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1304, loaded into the memory 1303, and executed by the processor 1301.

The types of computers 1300 used to implement the methods described herein can vary depending upon the embodiment and the processing power required by the entity. For example, the anomaly detection system can run in a single computer 1300 or multiple computers 1300 communicating with each other through a network such as in a server farm. The computers 1300 can lack some of the components described above, such as graphics adapters 1306, and displays 1309.

XI. Additional Considerations

Some embodiments of techniques for performing anomaly detection on data sets in which one or more features have a "free text" data type. In this context, "free text" refers to unstructured text. In some embodiments, the same techniques described herein as being applicable to "free text" features may be applied to other "text" features, including "structured text" features.

The foregoing description of the embodiments of the invention has been presented for the purpose of illustration—it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Any of the steps, operations, or processes described herein can be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may include information resulting from a computing process, where the information is stored on a non-transitory, tangible computer-readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. An anomaly detection method comprising:
obtaining a data set comprising plurality of data samples, each of the plurality of data samples associated with respective values for a set of features;
identifying a respective data type of each of the features;
automatically generating an anomaly detection blueprint based on the respective data types of one or more of the features, the anomaly detection blueprint comprising a machine-executable module encoding an anomaly detection procedure, the anomaly detection procedure including a plurality of tasks, wherein one or more of the tasks are selected based on a size of the data set and/or the respective data types of the one or more features; and
executing the machine-executable module, thereby performing the anomaly detection procedure, wherein performing the anomaly detection procedure includes identifying a subset of the plurality of data samples as a set of anomalous data samples.

2. The method of claim 1, wherein the one or more features include a particular feature, wherein the identified data type of the particular feature is a numerical data type, and wherein the anomaly detection procedure corresponding to the anomaly detection blueprint does not include a task of performing normalization, standardization, or ridit transformation of the respective values of the plurality of data samples for the particular feature having the numerical data type.

3. The method of claim 1, wherein:
the one or more features include a particular feature, the data type of the particular feature being a numerical data type,
the plurality of data samples include one or more first data samples and one or more second data samples, wherein the respective value of the particular feature for each of the first data samples is missing and wherein the respective value of the particular feature for each of the second data samples is non-missing, and
the tasks of the anomaly detection procedure corresponding to the anomaly detection blueprint include a missing value imputation task comprising replacing the respective missing value of the particular feature of each of the first data samples with a median of the non-missing values of the particular feature for the second data samples.

4. The method of claim 1, wherein:
the one or more features include a particular feature,
the plurality of data samples includes one or more data samples wherein the respective value for the particular feature is missing, and
the tasks of the anomaly detection procedure corresponding to the anomaly detection blueprint include a feature engineering task comprising:
adding a new feature to the set of features and determining the respective value of the new feature for each of the plurality of data samples, the respective value of the new feature for each of the plurality of data samples indicating whether the respective data sample is missing a value for the particular feature.

5. The method of claim 1, wherein:
each of the plurality of data samples is further associated with a respective value of a label;
the tasks of the anomaly detection procedure corresponding to the anomaly detection blueprint further include:
obtaining a respective anomaly score for each of the plurality of data samples, the respective anomaly score for each data sample indicating a predicted extent to which the data sample is anomalous; and
identifying, based on the anomaly scores, the set of anomalous data samples from the plurality of data samples; and
the method further includes:
determining a correlation between the respective anomaly score or the respective anomaly classification and the respective value of the label for each of the plurality of data samples;
responsive to the correlation being less than a threshold correlation, removing the set of anomalous data samples from the plurality of data samples; and
otherwise, responsive to the correlation being at least the threshold correlation, retaining the set of anomalous data samples in the plurality of data samples.

6. The method of claim 1, wherein the one or more features include a particular feature, the data type of the particular feature being a categorical data type, and wherein the tasks of the anomaly detection procedure corresponding to the anomaly detection blueprint include a feature engineering task comprising:
for each of the plurality of data samples, replacing the respective value of the particular feature having the categorical data type with a respective frequency of occurrence of the respective value of the particular feature in the plurality of data samples.

7. The method of claim 1, wherein the one or more features include one or more particular features, the data type of each of the one or more particular features being a free text data type, and wherein the tasks of the anomaly detection procedure corresponding to the anomaly detection blueprint include a feature engineering task comprising:
for each of the one or more particular features having the free text data type:
identifying a plurality of terms that occur most frequently within a combined free text corpus comprising the values for the respective particular feature for the plurality of data samples; and
generating a sample-term matrix, wherein each row of the sample-term matrix corresponds to a respective data sample in the plurality of data samples, wherein each column of the sample-term matrix corresponds to a respective term in the plurality of terms that occur most frequently, and wherein each element of the sample-term matrix indicates whether the term corresponding to the column of the element occurs in the data sample corresponding to the row of the element, within the values of the respective particular feature.

8. The method of claim 7, wherein the feature engineering task further comprises:
for each sample-term matrix corresponding to each of the one or more particular features having the free text data type:
generating a compact matrix by performing Singular-Value Decomposition (SVD) on the sample-term matrix, wherein a quantity of columns in the compact matrix is less than a quantity of columns in the sample-term matrix, and wherein each row of the compact matrix corresponds to a respective data sample in the plurality of data samples;

replacing the respective particular feature in the set of features with a respective engineered feature; and for each of the plurality of data samples, setting a respective value of the respective engineered feature to the row of the compact matrix corresponding to the respective data sample.

9. The method of claim 1, further comprising identifying a size of the data set, wherein the generating of the anomaly detection blueprint is further based on the size of the data set, wherein the set of anomalous data samples is identified using an anomaly detection process, and wherein the anomaly detection process is selected from a group of anomaly selection processes based, at least in part, on a number of data samples in the data set and/or on a storage size of the data set.

10. The method of claim 9, wherein the number of data samples in the data set is less than a first sample number threshold, wherein the storage size of the data set is less than a storage size threshold, and wherein the group of anomaly selection processes consists of an isolation forest process, a double median absolute deviance (MAD) process, a one class support vector machine (SVM) process, a local outlier factor (LOF) process, and a Mahalanobis distance process.

11. The method of claim 9, wherein the number of data samples in the data set is greater than a first sample number threshold and less than a second sample number threshold, wherein the storage size of the data set is less than a storage size threshold, and wherein the group of anomaly selection processes consists of an isolation forest process, a double median absolute deviance (MAD) process, and a Mahalanobis distance process.

12. The method of claim 9, wherein (1) the number of data samples in the data set is greater than a first sample number threshold and a second sample number threshold, or (2) the storage size of the data set is greater than a storage size threshold, and wherein the group of anomaly selection processes consists of a double median absolute deviance (MAD) process and a Mahalanobis distance process.

13. The method of claim 1, wherein the identifying the set of anomalous data samples comprises:

determining, by an unsupervised anomaly detection process, for each of the plurality of data samples, a respective anomaly score indicating an extent to which the respective data sample is anomalous;

adding the anomaly scores to the data set as respective values of a label of the plurality of data samples, thereby generating a labeled data set; and applying a supervised anomaly detection model to the labeled data set to identify the set of anomalous data samples.

14. The method of claim 1, wherein identifying the subset of the plurality of data samples as the set of anomalous data samples comprises:

determining, by an unsupervised anomaly detection process, for each of the plurality of data samples, a respective anomaly score indicating an extent to which the respective data sample is anomalous, and wherein the set of anomalous data samples comprises a fraction of the plurality of data samples having greatest anomaly scores.

15. The method of claim 14, wherein the tasks of the anomaly detection procedure corresponding to the anomaly detection blueprint further include:

assigning a respective value of a label to each of the plurality of data samples based on the identified set of anomalous data samples, the respective value of the label assigned to each data sample indicating whether the respective data sample is anomalous; and using the labeled data samples as training data to train a supervised anomaly detection model to infer whether data samples are anomalous based on the values of the features associated with the data samples.

16. An anomaly detection method comprising:

obtaining a data set comprising plurality of data samples, each of the plurality of data samples associated with respective values for a set of features;

identifying a respective data type of each of the features;

automatically generating an anomaly detection blueprint based on the respective data types of one or more of the features, the anomaly detection blueprint comprising a machine-executable module encoding an anomaly detection procedure, the anomaly detection procedure including a plurality of tasks, wherein one or more of the tasks are selected based on a size of the data set and/or the respective data types of the one or more features; and executing the machine-executable module, thereby performing the anomaly detection procedure, wherein performing the anomaly detection procedure includes identifying a subset of the plurality of data samples as a set of anomalous data samples, wherein the one or more features include one or more particular features, the data type of the one or more particular features being a free text data type, and wherein the tasks of the anomaly detection procedure corresponding to the anomaly detection blueprint include a feature engineering task comprising:

identifying a plurality of terms that occur most frequently within a combined free text corpus comprising the values for the one or more particular features having the free text data type for the plurality of data samples; and generating a sample-term matrix, wherein each row of the sample-term matrix corresponds to a respective data sample in the plurality of data samples, wherein each column of the sample-term matrix corresponds to a respective term in the plurality of terms that occur most frequently, and wherein each element of the sample-term matrix indicates whether the term corresponding to the column of the element occurs in the data sample corresponding to the row of the element, within the values of the one or more particular features having the free text data type.

17. The method of claim 7, wherein the feature engineering task further comprises:

replacing the one or more particular features in the set of features with an engineered feature, and for each of the plurality of data samples, setting a respective value of the engineered feature to the row of the sample-term matrix corresponding to the respective data sample.

18. The method of claim 17, wherein a number of unique terms in the combined free text corpus is greater than 5,000, wherein a number of unique terms in the plurality of terms that occur most frequently within the combined free text corpus is 5,000, and wherein a number of columns of the sample-term matrix is 5,000.

19. The method of claim 7, wherein the feature engineering task further comprises:

generating a compact matrix by performing Singular-Value Decomposition (SVD) on the sample-term matrix, wherein a quantity of columns in the compact matrix is less than a quantity of columns in the sample-term matrix, and wherein each row of the compact matrix corresponds to a respective data sample in the plurality of data samples;

replacing the one or more particular features in the set of features with an engineered feature; and for each of the plurality of data samples, setting a respective value of the engineered feature to the row of the compact matrix corresponding to the respective data sample.

20. A system comprising:

one or more computers and one or more storage devices storing instructions that are operable, when executed by the one or more computers, to cause the one or more computers to perform operations including:

obtaining a data set comprising plurality of data samples, each of the plurality of data samples associated with respective values for a set of features;

identifying a respective data type of each of the features;

automatically generating an anomaly detection blueprint based on the respective data types of one or more of the features, the anomaly detection blueprint comprising a machine-executable module encoding an anomaly detection procedure, the anomaly detection procedure including a plurality of tasks, wherein one or more of the tasks are selected based on a size of the data set and/or the respective data types of the one or more features; and executing the machine-executable module, thereby performing the anomaly detection procedure, wherein performing the anomaly detection procedure includes identifying a subset of the plurality of data samples as a set of anomalous data samples.

21. A computer storage device storing instructions that are operable, when executed by the one or more computers, to cause the one or more computers to perform operations including:

one or more computers and one or more storage devices storing instructions that are operable, when executed by the one or more computers, to cause the one or more computers to perform operations including:

obtaining a data set comprising plurality of data samples, each of the plurality of data samples associated with respective values for a set of features;

identifying a respective data type of each of the features;

automatically generating an anomaly detection blueprint based on the respective data types of one or more of the features, the anomaly detection blueprint comprising a machine-executable module encoding an anomaly detection procedure, the anomaly detection procedure including a plurality of tasks, wherein one or more of the tasks are selected based on a size of the data set and/or the respective data types of the one or more features; and executing the machine-executable module, thereby performing the anomaly detection procedure, wherein performing the anomaly detection procedure includes identifying a subset of the plurality of data samples as a set of anomalous data samples.

* * * * *